(12) United States Patent
Tsuchida

(10) Patent No.: US 9,930,144 B2
(45) Date of Patent: Mar. 27, 2018

(54) INFORMATION PROCESSING METHOD

(71) Applicant: Panasonic Intellectual Property Management Co., Ltd., Osaka (JP)

(72) Inventor: Yasuhiro Tsuchida, Saratoga, CA (US)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 289 days.

(21) Appl. No.: 15/002,357

(22) Filed: Jan. 20, 2016

(65) Prior Publication Data

US 2016/0227000 A1    Aug. 4, 2016

Related U.S. Application Data

(60) Provisional application No. 62/109,653, filed on Jan. 30, 2015.

(51) Int. Cl.
| | |
|---|---|
| *G06F 15/16* | (2006.01) |
| *H04L 29/06* | (2006.01) |
| *H04L 29/08* | (2006.01) |
| *H04W 12/12* | (2009.01) |
| *H04W 4/02* | (2018.01) |

(52) U.S. Cl.
CPC .............. *H04L 67/42* (2013.01); *H04L 67/02* (2013.01); *H04L 67/18* (2013.01); *H04L 67/38* (2013.01); *H04W 4/023* (2013.01); *H04W 12/12* (2013.01); *H04L 63/1425* (2013.01)

(58) Field of Classification Search
CPC ......... H04L 67/42; H04L 67/02; H04L 67/38; H04L 67/18; H04W 12/12; H04W 4/023
USPC ................................. 709/203, 220, 224, 230
See application file for complete search history.

(56) References Cited

U.S. PATENT DOCUMENTS

| | | | | |
|---|---|---|---|---|
| 8,738,027 | B2* | 5/2014 | Edge | H04W 4/023 455/404.2 |
| 2007/0243925 | A1* | 10/2007 | LeMay | G07F 17/32 463/20 |
| 2007/0243934 | A1* | 10/2007 | Little | G07F 17/32 463/40 |
| 2015/0350820 | A1* | 12/2015 | Son | H04W 4/008 455/41.2 |

(Continued)

FOREIGN PATENT DOCUMENTS

| | | |
|---|---|---|
| JP | 10-226315 | 8/1998 |
| JP | 2006-279854 | 10/2006 |
| JP | 2013-247417 | 12/2013 |

*Primary Examiner* — Michael Y Won
(74) *Attorney, Agent, or Firm* — Greenblum & Bernstein, P.L.C.

(57) ABSTRACT

An information processing method is an information processing method executable by a server device. The information processing method includes obtaining first position information from a first portable terminal that has received a beacon signal from a first beacon device, the first position information being information indicating a current position of the first portable terminal, calculating a probability of abnormal condition of the first beacon device by comparing the obtained first position information with second position information indicating an installation position of the first beacon device, the second position information being managed in advance by the server device, and performing a process corresponding to the calculated probability of abnormal condition.

12 Claims, 72 Drawing Sheets

(56) References Cited

U.S. PATENT DOCUMENTS

2016/0227000 A1* 8/2016 Tsuchida ................ H04L 67/42
2017/0034688 A1* 2/2017 Kim ........................ H04W 4/02
2017/0229004 A1* 8/2017 Shah ........................ F41H 9/10

* cited by examiner

FIG. 10A

```
https://serverdomain.com/login.jsp?app_user_id=1234ABCD-1234-ABCD-1234-1234567890AB&app_id=app00001&action=view
```

FIG. 10B

```
https://serverdomain.com/login.jsp?app_user_id=1234ABCD-1234-ABCD-1234-1234567890AB&app_id=app00001&action=login&user_name=tarou&password=pswd
```

FIG. 10C

```
{"ERROR":"NONE"}
```

FIG. 10D

```
{"ERROR":"BAD_USERNAME_OR_PASSWORD"}
```

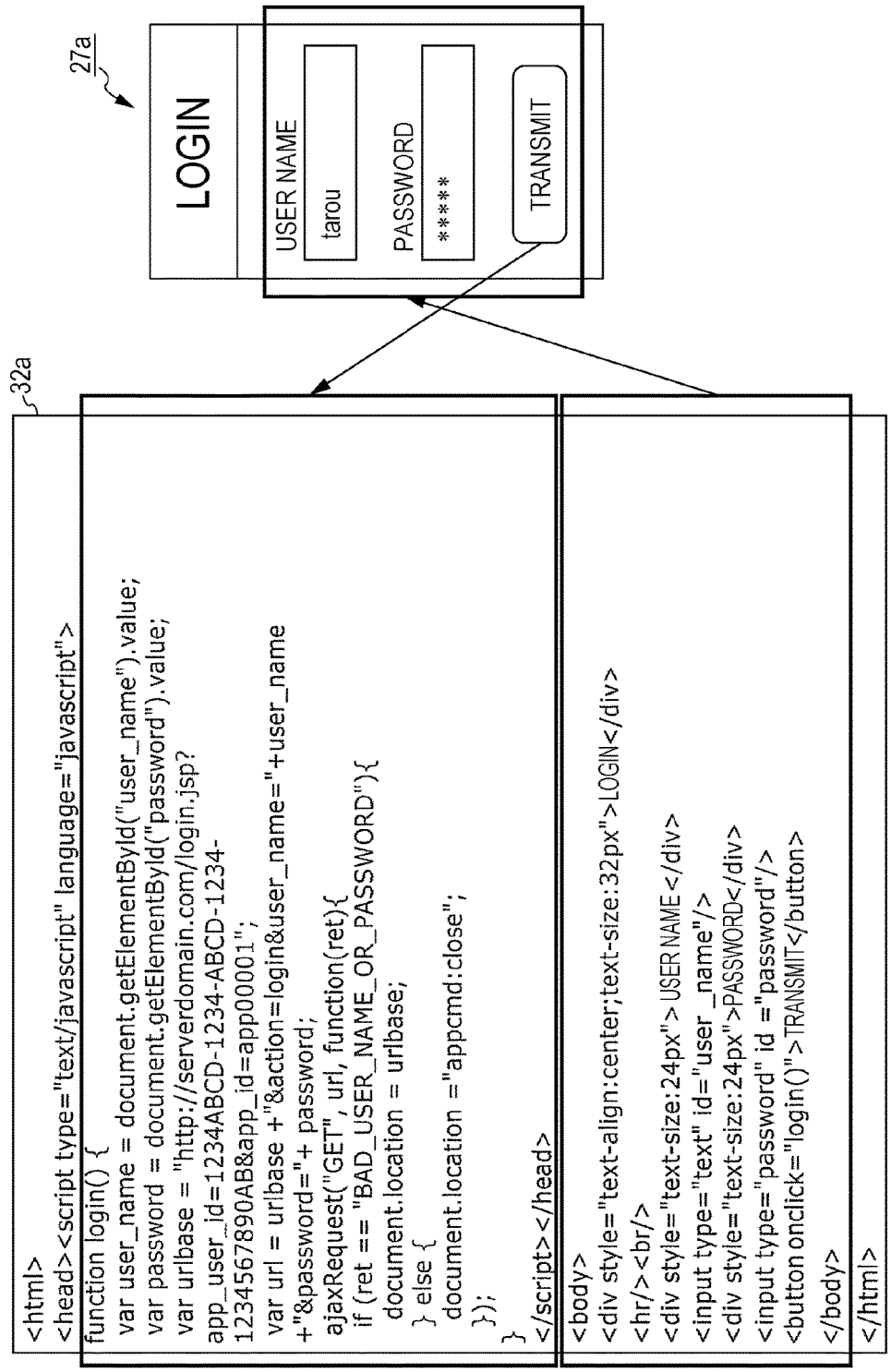

FIG. 15A

33 — https://serverdomain.com/GetCollaboEvent? app_user_id=1234ABCD-1234-ABCD-1234-1234567890AB&app_id=app00001

34 — {{"ERROR":"NONE"},{"stamp":"0/5"},{"message":"GET STAMPS AT P CENTER OSAKA FROM JAN. 20 TO 31!!"}}

34a, 34b, 34c

| NUMBER OF EARNED STAMPS | 0 |
|---|---|
| NUMBER OF GOAL STAMPS | 5 |
| MESSAGE | GET STAMPS AT P CENTER OSAKA FROM JAN. 20 TO 31!! |

35

27c

STAMP SHEET No. 2

GOAL REWARD: 3 MAGIC STONES

GOAL

FIG. 19

| STORE ID | STORE NAME | GENRE TENDENCY | DEVELOPER TENDENCY | APP TENDENCY | ADVERTISEMENT ID | VISITOR ADVERTISEMENT ID | LATITUDE | LONGITUDE | MESSAGE |
|---|---|---|---|---|---|---|---|---|---|
| str00001 | RESTAURANT A | | | App00001 (0.2) | ad00001 | ad00001a | 34.70889 | 135.4944 | 10 STAMPS ARE YOURS WITH A PURCHASE OF 500 YEN OR MORE!! |
| str00002 | FURNITURE STORE B | | CCC (0.3) | | ad00002 | ad00002a | 34.6123 | 135.1212 | SALE 10% OFF FOR ALL ITEMS ON JAN. 25 AND 26!! |
| str00003 | SPORTS STORE C | SPORTS (0.8) | | | ad00003 | ad00003a | 34.72112 | 135.3123 | DOUBLE STAMPS ON FEB. 1 AND 2!! |
| str00004 | P CENTER OSAKA | STORE MANAGEMENT (0.5) | | | ad00004 | ad00004a | 34.6657 | 135.2132 | GET STAMPS AT P CENTER OSAKA FROM JAN. 20 TO 31!! |
| str00005 | PHARMACY E | | DDD (0.2) | | ad00005 | ad00005a | 34.72101 | 135.3122 | SPORTS GAME COLLABORATION NOW UNDER WAY!! |

FIG. 20

| APP ID | REWARD ID | NUMBER OF STAMP SHEETS | NUMBER OF GOAL STAMPS |
|---|---|---|---|
| app00001 | rwd00002 | 1 | 3 |
| app00001 | rwd00002 | 2 | 5 |
| app00001 | rwd00002 | 3 | 7 |
| app00001 | rwd00002 | 4 | 10 |
| app00001 | rwd00003 | 5 | 15 |
| app00002 | rwd00002 | 1 | 3 |
| app00002 | rwd00002 | 2 | 5 |
| app00002 | rwd00002 | 3 | 7 |
| app00002 | rwd00002 | 4 | 10 |
| app00002 | rwd00003 | 5 | 15 |

FIG. 22A

| USER ID | STORE ID | APP ID | TIME |
|---------|----------|----------|------------------|
| USER 1 | str00005 | app00001 | 2/6/2014 18:12 |
| USER 1 | str00001 | app00001 | 2/5/2014 12:35 |
| USER 1 | str00002 | app00002 | 1/3/2014 16:50 |

FIG. 22B

| APP ID | GENRE | DEVELOPER |
|----------|------------------|-----------|
| app00001 | STORE MANAGEMENT | CCC |
| app00002 | SPORTS | DDD |

FIG. 23

```
select * from stores_table
where SQRT( POW( 6387.137 * (PI()/180 * (lat-LATITUDE)), 2)+
POW( COS( PI() / 180 * LATITUDE) * 6387.137 * (PI()/180 * (lng-LONGITUDE)),2))
< 0.5;
```

| USER ID | LEVEL | CONDITION | REWARD ID |
|---|---|---|---|
| app00001 | 1 | TODAY'S TOTAL SALES ARE 1000 OR MORE | rwd00008 |
| app00001 | 2 | TODAY'S TOTAL SALES ARE 10000 OR MORE | rwd00008 |
| app00001 | 3 | TODAY'S TOTAL SALES ARE 100000 OR MORE | rwd00008 |

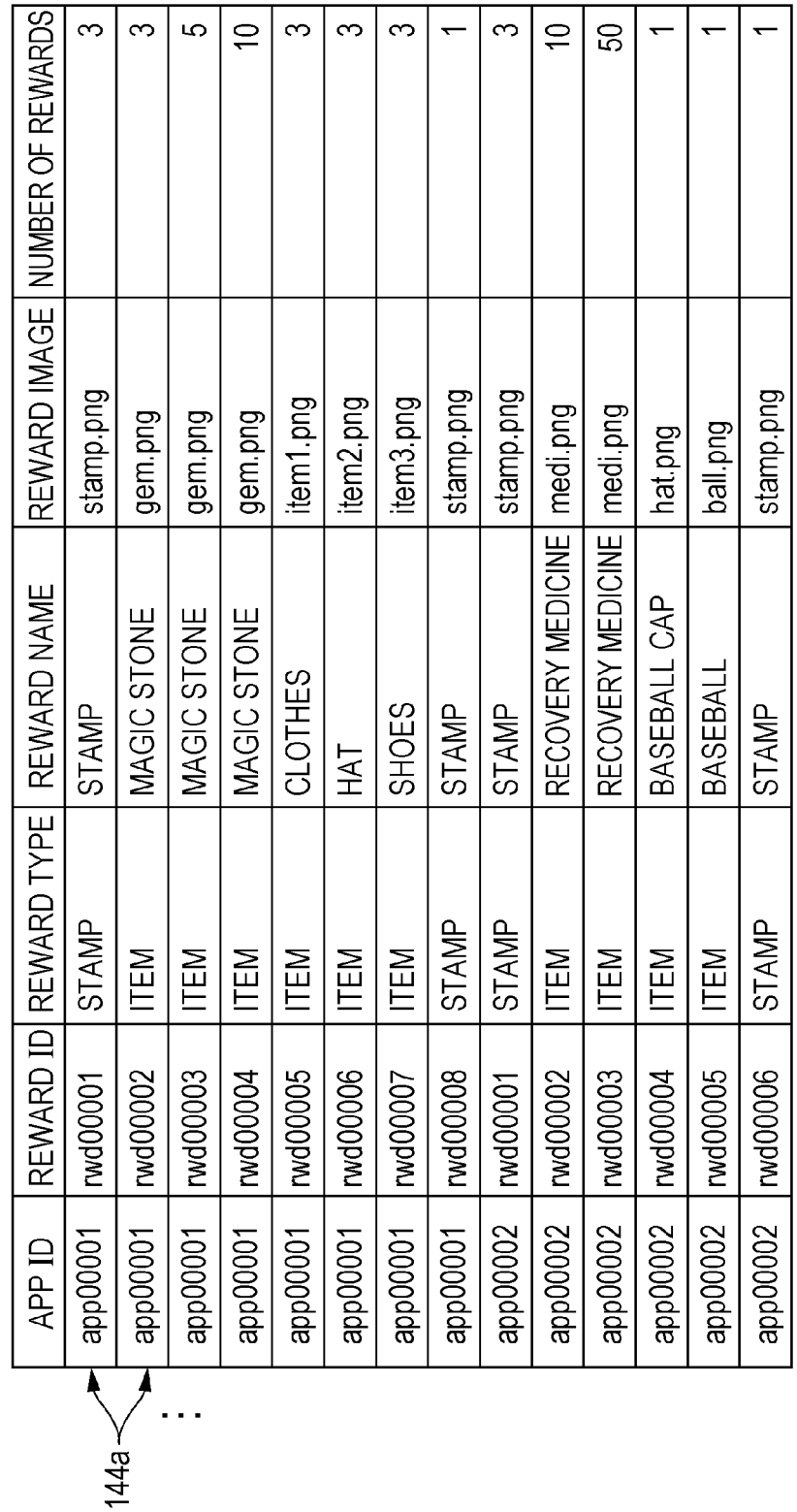

FIG. 41

| APP ID | REWARD ID | REWARD TYPE | REWARD NAME | REWARD IMAGE | NUMBER OF REWARDS |
|---|---|---|---|---|---|
| app00001 | rwd00001 | STAMP | STAMP | stamp.png | 3 |
| app00001 | rwd00002 | ITEM | MAGIC STONE | gem.png | 3 |
| app00001 | rwd00003 | ITEM | MAGIC STONE | gem.png | 5 |
| app00001 | rwd00004 | ITEM | MAGIC STONE | gem.png | 10 |
| app00001 | rwd00005 | ITEM | CLOTHES | item1.png | 3 |
| app00001 | rwd00006 | ITEM | HAT | item2.png | 3 |
| app00001 | rwd00007 | ITEM | SHOES | item3.png | 3 |
| app00001 | rwd00008 | STAMP | STAMP | stamp.png | 1 |
| app00002 | rwd00001 | STAMP | STAMP | stamp.png | 3 |
| app00002 | rwd00002 | ITEM | RECOVERY MEDICINE | medi.png | 10 |
| app00002 | rwd00003 | ITEM | RECOVERY MEDICINE | medi.png | 50 |
| app00002 | rwd00004 | ITEM | BASEBALL CAP | hat.png | 1 |
| app00002 | rwd00005 | ITEM | BASEBALL | ball.png | 1 |
| app00002 | rwd00006 | STAMP | STAMP | stamp.png | 1 |

FIG. 53

| APP ID | LEVEL | REWARD ID | REWARD INCIDENCE |
|---|---|---|---|
| app00001 | * | rwd00001 | 100% |
| app00001 | 1 | rwd00002 | 10% |
| app00001 | 1 | rwd00005 | 90% |
| app00001 | 2 | rwd00003 | 10% |
| app00001 | 2 | rwd00006 | 90% |
| app00001 | 3 | rwd00004 | 10% |
| app00001 | 3 | rwd00007 | 90% |
| app00002 | * | rwd00001 | 100% |
| app00002 | 1 | rwd00002 | 5% |
| app00002 | 1 | rwd00004 | 95% |
| app00002 | 2 | rwd00003 | 5% |
| app00002 | 2 | rwd00005 | 95% |

| ADVERTISEMENT ID | TOPIC OF ADVERTISEMENT | BANNER IMAGE |
|---|---|---|
| ad00001 | GET STAMPS AT P CENTER OSAKA FROM JAN. 20 TO 31!! | banner01.png |
| ad00001a | SPECIAL GAME ITEMS ARE NOW YOURS WITH A PURCHASE OF 1000 YEN OR MORE!! | banner02.png |

| STORE ID | PURCHASE ID | PURCHASE INFORMATION | PURCHASER PRIVILEGE ID | USED FLAG |
|---|---|---|---|---|
| str00004 | buy00001 | PURCHASE OF LESS THAN 1000 YEN | 1 | NO |
| str00004 | buy00002 | PURCHASE OF LESS THAN 1000 YEN | 1 | NO |
| str00004 | buy00003 | PURCHASE OF 1000 YEN OR MORE | 2 | NO |
| str00004 | buy00004 | PURCHASE OF 1000 YEN OR MORE | 2 | NO |

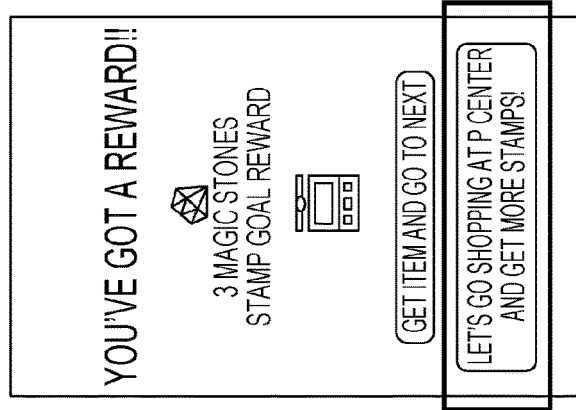

```
<html>
<head>
<script src="./lib/item_screen.js"></script>
<link rel="stylesheet" type="text/css" href="./item screeb_style.css" >
<script type="text/javascript" language="javascript" >
window.onload =function() {
  var GIFT_ID ="1";
  var args = {
    "item_name":" MAGIC STONE ",
    "item_image":"gem.png",
    "item_quantity":1,
    "AD_BANNER":"banner01.png"
  };
  var screen_show_completed = function(){
    location.href = "appcmd:gift="+GIFT_ID;
  };
  showScreen(args, GIFT_ID, show_screen_completed);
}
</script></head>
<body>
<div id="screen"/>
</body>
</html>
```

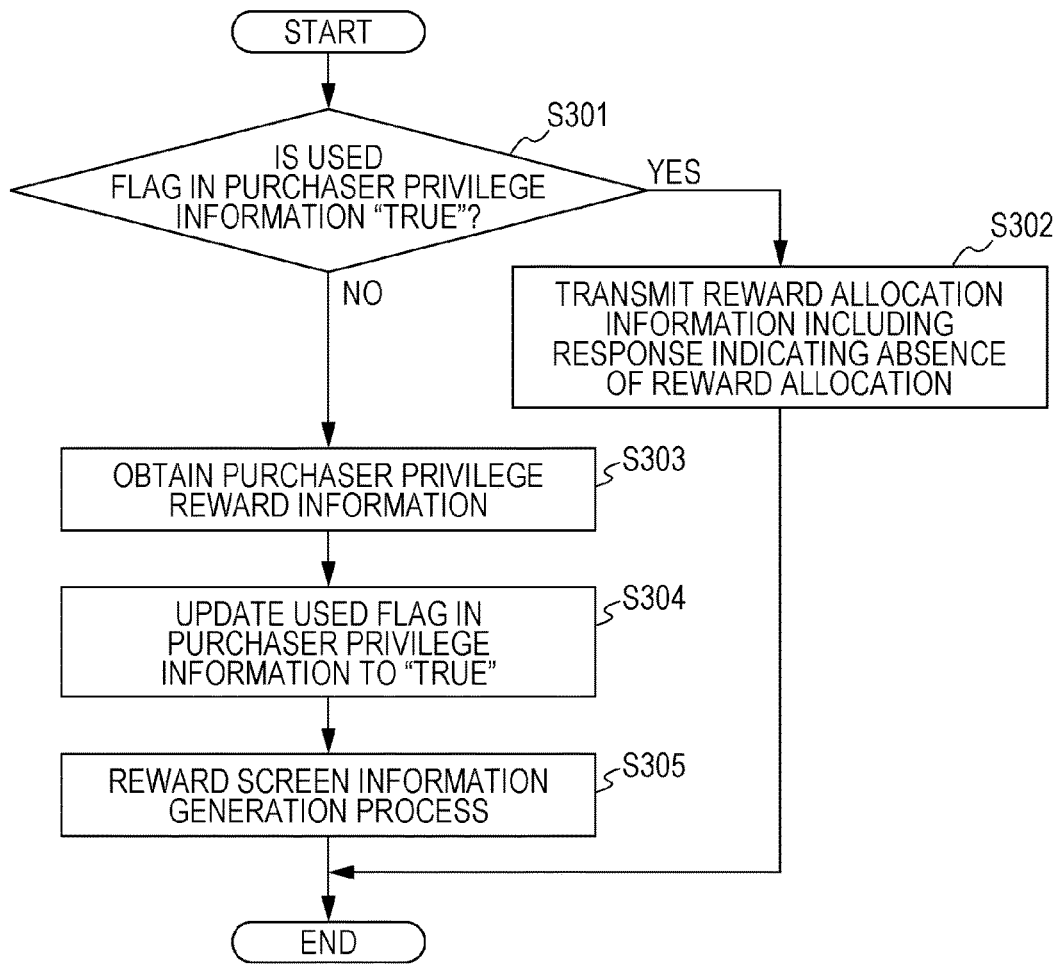

FIG. 63

| DEVICE NAME | DEVICE ID | STORE ID | INSTALLATION LOCATION | INSTALLATION POSITION INFORMATION | | RADIO FIELD INTENSITY (RSSI) | FALSE FLAG |
|---|---|---|---|---|---|---|---|
| | | | | LATITUDE | LONGITUDE | | |
| STORE 1  NO.1 | 0001 | str00001 | CASHIER | 34 | 132 | −60 | NO |
| STORE 1  NO.2 | 0002 | str00001 | LIQUOR CORNER | 34 | 132 | −60 | NO |
| STORE 1  NO.3 | 0003 | str00002 | MAGAZINE CORNER | 34 | 131 | −60 | NO |
| STORE 2  NO.1 | 0004 | str00002 | CASHIER | 35 | 131 | −40 | NO |
| STORE 2  NO.2 | 0005 | str00002 | SWEETS CORNER | 35 | 131 | −40 | NO |

| APP USER ID | DEVICE ID | CHECK-IN POSITION | | CHECK-IN DATE AND TIME |
| --- | --- | --- | --- | --- |
| | | LATITUDE | LONGITUDE | |
| 12345 | 0001 | 34 | 132 | 12/1/2014 13:10 |
| 23145 | 0001 | 34 | 132 | 12/1/2014 18:20 |
| 32143 | 0001 | 35 | 131 | 12/1/2014 19:15 |
| ... | ... | ... | ... | ... |
| 11111 | 0002 | 34 | 132 | 12/1/2014 13:11 |
| 22222 | 0002 | 34 | 132 | 12/1/2014 18:21 |
| 33333 | 0002 | 34 | 132 | 12/1/2014 19:16 |

162

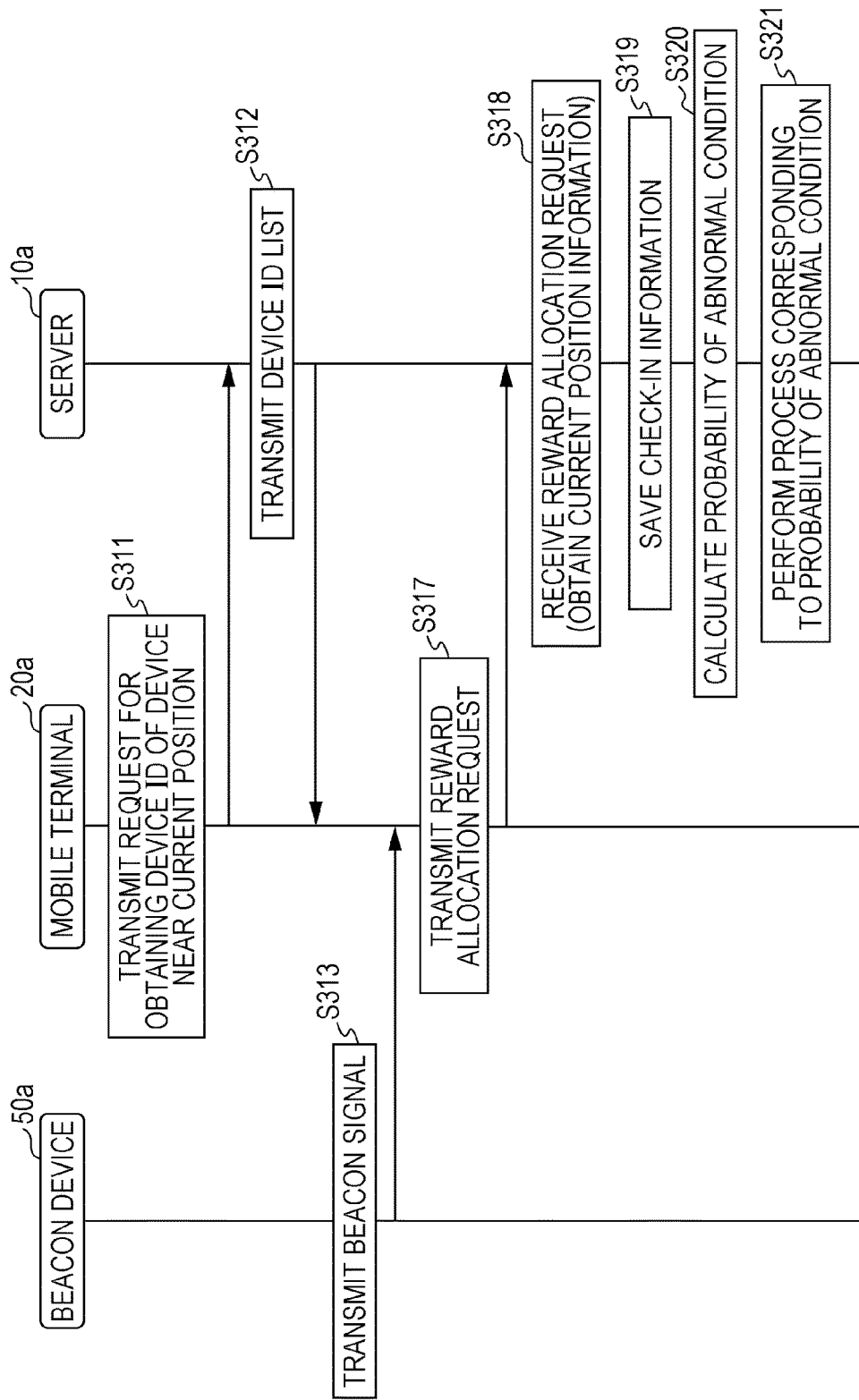

FIG. 66

| APP USER ID | DEVICE ID | CHECK-IN POSITION | | CHECK-IN DATE AND TIME |
|---|---|---|---|---|
| | | LATITUDE | LONGITUDE | |
| 12345 | 0001 | 34 | 132 | 12/1/2014 13:10 |
| 23145 | 0001 | 34 | 132 | 12/1/2014 18:20 |
| 32143 | 0001 | 35 | 131 | 12/1/2014 19:15 |
| ... | ... | ... | ... | ... |
| 9999 | 0002 | 34 | 132 | 12/2/2014 14:39 |
| 9999 | 0002 | 34 | 132 | 12/3/2014 14:30 |
| 9999 | 0002 | 34 | 132 | 12/4/2014 15:30 |
| 9999 | 0002 | 34 | 132 | 12/5/2014 14:15 |
| 9999 | 0002 | 34 | 132 | 12/6/2014 15:15 |

162a

INFORMATION PROCESSING METHOD

BACKGROUND

1. Technical Field

The present disclosure relates to an information processing method for suppressing or reducing unauthorized use of a beacon device.

2. Description of the Related Art

Japanese Unexamined Patent Application Publication No. 2006-279854 discloses an anti-theft system which determines that an equipment device has been stolen when it is detected that the equipment device is located at a position different from a predetermined position.

Japanese Unexamined Patent Application Publication No. 10-226315 discloses an anti-theft apparatus that senses the movement of an anti-theft object.

Japanese Unexamined Patent Application Publication No. 2013-247417 discloses a communication monitoring apparatus that senses the suspected theft of a relay device in accordance with the number of communication devices that use the relay device.

SUMMARY

In one general aspect, the techniques disclosed here feature an information processing method executable by a server device. The information processing method includes obtaining first position information from a first portable terminal that has received a beacon signal from a first beacon device, the first position information being information indicating a current position of the first portable terminal, calculating a probability of abnormal condition of the first beacon device by comparing the obtained first position information with second position information indicating an installation position of the first beacon device, the second position information being managed in advance by the server device, and performing a process corresponding to the calculated probability of abnormal condition.

An information processing method according to an aspect of the present disclosure may provide processing for suppressing or reducing unauthorized use of a beacon device in accordance with the probability of abnormal condition of the beacon device.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIGS. 10A to 10D illustrate an example of HTML documents of a component request, a login request, and a response to the login request;

FIG. 11 illustrates an example of an HTML document of a response to the component request;

FIGS. 15A and 15B respectively illustrate an example of a store collaboration information request and an example of store collaboration information;

FIG. 19 illustrates an example of store attribute information in the store information DB;

FIG. 20 illustrates an example of stamp information in the game app information DB;

FIGS. 22A and 22B respectively illustrate an example of a user check-in log and an example of game attribute information;

FIG. 23 illustrates a description for searching for store attribute information on a nearby store within 500 m using Structured Query Language (SQL);

FIG. 34 illustrates an example of reward allocation condition information;

FIG. 41 illustrates an example of reward list information;

FIG. 45 is a sequence diagram of reward allocation based on a check-in;

FIG. 51 illustrates an example of a two-dimensional code used for a check-in;

FIG. 53 illustrates an example of reward incidence information;

FIG. 54 illustrates an example of advertisement information;

FIG. 55 illustrates an example of purchaser privilege information;

FIG. 56 illustrates an example of reward screen information having added thereto a banner image;

FIG. 58 is a flowchart of the purchaser privilege granting process;

FIG. 59 illustrates an example of purchaser privilege reward information;

FIG. 63 illustrates an example of beacon ID information;

FIG. 64 illustrates an example of a check-in history;

FIG. 65B is a second sequence diagram of the operation of the game reward allocation system according to the second embodiment;

FIG. 66 illustrates an example of a check-in history when an abnormal event has occurred;

DETAILED DESCRIPTION

Figure 1:
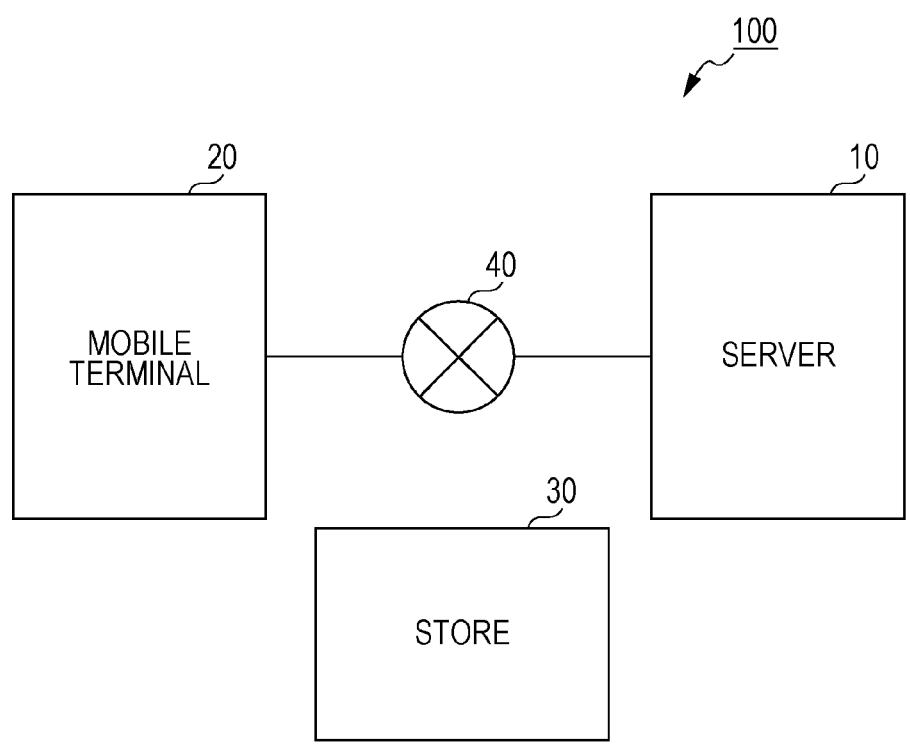
FIG. 1 illustrates a schematic configuration of a game reward allocation system according to a first embodiment.

Underlying Knowledge Forming Basis of the Present Disclosure

There are cases where a beacon device is installed in a building such as a store. The beacon device transmits information to a portable terminal such as a smartphone. In this case, if the installed beacon device were stolen, it would not be desirable for the beacon device to be used without authorization. The present disclosure provides an information processing method for suppressing or reducing unauthorized use of a beacon device.

An information processing method according to an aspect of the present disclosure is an information processing method executable by a server device. The information processing method includes obtaining first position information from a first portable terminal that has received a beacon signal from a first beacon device, the first position information being information indicating a current position of the first portable terminal, calculating a probability of abnormal condition of the first beacon device by comparing the obtained first position information with second position information indicating an installation position of the first beacon device, the second position information being managed in advance by the server device, and performing a process corresponding to the calculated probability of abnormal condition.

According to the information processing method described above, it may be possible to calculate the probability of abnormal condition of a beacon device on the basis of a deviation from the installation position of the beacon device. According to the information processing method described above, furthermore, it may be possible to perform a process to suppress or reduce unauthorized use of the beacon device in accordance with the calculated probability of abnormal condition.

The calculating may include calculating the probability of abnormal condition so that the larger a difference between the current position indicated by the first position information and the installation position indicated by the second position information, the higher the probability of abnormal condition.

In the way described above, in the information processing method described above, specifically, the probability of abnormal condition may be calculated so that the larger the deviation from the installation position of the beacon device, the higher the probability of abnormal condition.

In addition, the information processing method may further include managing, as a first check-in history, a date and time of reception of a first ID transmitted from each of the plurality of second portable terminals. The first ID may be included in a beacon signal that each of the plurality of second portable terminals receives from the first beacon device. The calculating may include calculating the probability of abnormal condition by further using the first check-in history.

According to the information processing method described above, for example, even if current position information on a portable terminal has been tampered with, it may be possible to accurately calculate a probability of abnormal condition.

For example, the calculating may include calculating the probability of abnormal condition by comparing a first check-in history obtained when the first position information is obtained with a first check-in history obtained before the first position information is obtained.

According to the information processing method described above, it may be possible to calculate a probability of abnormal condition on the basis of the comparison between current and previous check-in histories.

In addition, the managing may include managing the date and time of reception of the first ID transmitted from each of the plurality of second portable terminals, as the first check-in history, in association with a user ID of a user of the corresponding one of the second portable terminals which has transmitted the first ID. The user ID of the user may be transmitted from the one of the second portable terminals. The calculating may include calculating the probability of abnormal condition in accordance with the number of identical user IDs included in the first check-in history.

According to the information processing method described above, it may be possible to calculate a probability of abnormal condition on the basis of the imbalanced number of users who use beacon devices.

In addition, the information processing method may further include managing, as a second check-in history, a date and time of reception of a second ID transmitted from each of a plurality of third portable terminals. The second ID may be included in a beacon signal that each of the plurality of third portable terminals received from a second beacon device different from the first beacon device. The calculating may include calculating the probability of abnormal condition by comparing the first check-in history with the second check-in history.

According to the information processing method described above, it may be possible to calculate a probability of abnormal condition on the basis of the comparison between a condition of usage of a certain beacon device and a condition of usage of another beacon device.

In addition, the performing of a process may include performing, as the process, a process for instructing the first portable terminal to obtain a beacon signal from a third beacon device different from the first beacon device, in a case where the calculated probability of abnormal condition is greater than or equal to a predetermined value.

According to the information processing method described above, if the occurrence of an abnormal event in a certain beacon device is suspected, it may be possible to determine whether or not an abnormal event has occurred by using another beacon device.

In addition, the performing of a process may include performing a predetermined process for the first portable terminal in a case where the calculated probability of abnormal condition is lower than a predetermined value, and suspending the predetermined process in a case where the calculated probability of abnormal condition is greater than or equal to the predetermined value.

According to the information processing method described above, it may be possible to suspend the predetermined process in accordance with the probability of abnormal condition.

In addition, the first portable terminal may have installed thereon an application for a game for which data is managed by the server device, and the predetermined process may be a process for allocating a game reward used in the game over the data.

In the way described above, the information processing method described above may be usable for the allocation of a game reward based on, for example, communication with a beacon device.

In addition, the performing of a process may include performing, as the process, a process for transmitting information to the first beacon device via the first portable terminal, the information being information for stopping a function of the first beacon device, in a case where the calculated probability of abnormal condition is greater than or equal to a predetermined value.

According to the information processing method described above, if the probability of abnormal condition is high, it may be possible to stop the operation of a beacon device.

In addition, the first beacon device may hold key information, and the information for stopping the function of the first beacon device may be encrypted information decodable by using the key information that the first beacon device holds.

According to the information processing method described above, it may be possible to prevent communication between a beacon device and a server device from being intercepted by any other device.

In addition, the information for stopping the function of the first beacon device may include information for deleting the key information held in the first beacon device.

According to the information processing method described above, if the probability of abnormal condition is high, it may be possible to completely stop the operation of a beacon device and to delete key information to enhance safety.

In addition, the second position information may be stored in a storage unit included in the server device.

In addition, at least one of the obtaining, the calculating, and the performing of a process may be executed by a processor included in the server device.

It should be noted that these general or specific aspects may be implemented as a system, an apparatus, an integrated circuit, a computer program, or a computer-readable recording medium such as a compact disc read-only memory (CD-ROM). Alternatively, these general or specific aspects may be implemented as any combination of a system, an apparatus, an integrated circuit, a computer program, and a recording medium.

In the following, embodiments will be specifically described with reference to the drawings.

The following embodiments illustrate general or specific examples. Numerical values, shapes, materials, constituent elements, arranged positions and connection forms of the constituent elements, steps, the order of the steps, and others illustrated in the following embodiments are examples, and are not intended to limit the present disclosure. Among constituent elements described in the following embodiments, a constituent element that is not included in the independent claim which represents the most generic concept of the present disclosure is described as an optional constituent element.

The drawings are schematic and not necessarily drawn to scale. In the drawings, elements having substantially the same configuration are denoted by the same reference numerals, and a redundant description may be omitted or simplified.

First Embodiment

Underlying Knowledge Forming Basis of Information Providing Method According to First Embodiment In a first embodiment, a description will be given of an information providing method for an information device having a game application.

A user (player) is able to download a game application by using an information device such as a smartphone. Downloadable games include a game of a type in which a player can earn a game reward (game item) in accordance with the level of progress in the game.

For example, there is available a game having a rule that a user sells goods in the game and is allocated a stamp once the sales have reached the initial target. In this game, when the user's sales have reached the next target, another stamp is further allocated to the user. When the user obtains a predetermined number of stamps (for example, five stamps), the user is able to earn a game item effective for the game to proceed.

There is also available a game with a mechanism in which, for example, the time period during which a user is able to play the game is restricted and the user is not allowed to resume the same game unless a certain time period has elapsed. In this case, an effective game item has a function of reducing the certain time period described above. The effective game item allows the user to resume the same game as the game without waiting for the lapse of the certain time period described above.

The present inventor has found a method for establishing a tie-up between an application for a game of the type described above and an actual store such as a pharmacy, a grocery store, or a clothing store so that the earning of stamps or game items in the game application is linked to sales promotion for the store.

Accordingly, in the first embodiment, a description will be given of an information providing method (a game reward allocation system) for giving incentives to a player of a game to visit an actual store by utilizing the game.

Configuration

In the following, a game reward allocation system according to the first embodiment will be described. FIG. 1 illustrates a schematic configuration of a game reward allocation system 100.

As illustrated in FIG. 1, the game reward allocation system 100 includes a server 10 and a mobile terminal 20. The server 10 and the mobile terminal 20 are connected to each other via a network 40 (for example, the Internet). FIG. 1 also illustrates a store 30 that is a target for collaboration with a game executable on the mobile terminal 20.

In the game reward allocation system 100, a user downloads a game application (hereinafter also referred to simply as a "game app") from the server 10 by using the mobile terminal 20. Information on the user, such as the state of progress of the game, is stored in the server 10.

In the first embodiment, furthermore, it is assumed that a game executable on the mobile terminal 20 is a game having a rule that a user sells goods in the game and is allocated a stamp once the sales have reached the initial target. In this game, when the user's sales have reached the next target, another stamp is further allocated to the user. When the user obtains a predetermined number of stamps (for example, five stamps), the user is able to earn a game item effective for the game to proceed.

The game reward allocation system 100 has a feature in that a user is not only given a stamp in the way described above in accordance with the progress of the game but also is given a stamp by bringing the mobile terminal 20 with them to the actual store 30.

Figure 2:
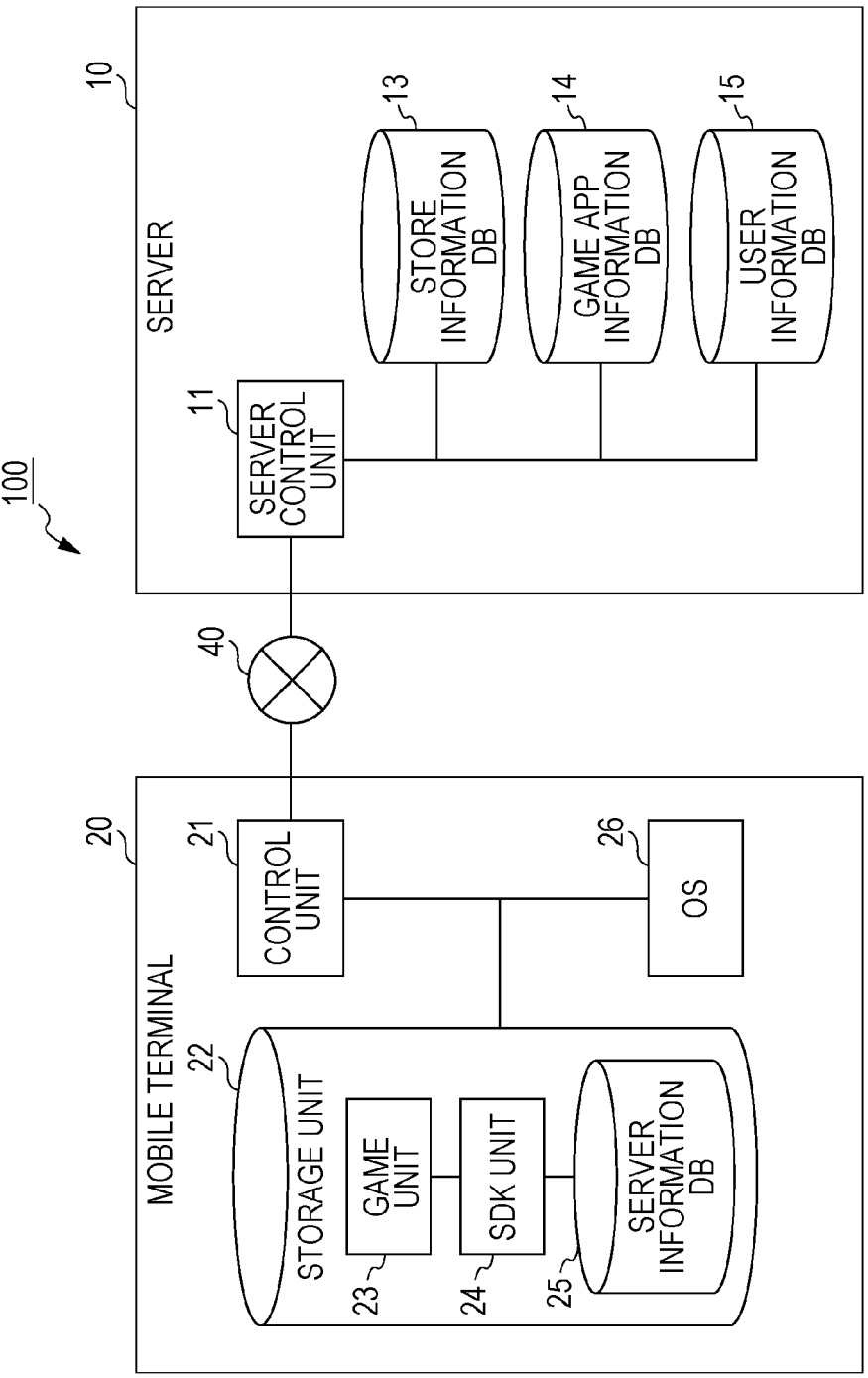
FIG. 2 is a block diagram illustrating a functional configuration of the game reward allocation system according to the first embodiment.

A specific configuration of the game reward allocation system 100 will now be described. FIG. 2 is a block diagram illustrating a functional configuration of the game reward allocation system 100. First, the server 10 will be described.

As illustrated in FIG. 2, the server 10 includes a server control unit 11, a store information database (DB) 13, a game app information DB 14, and a user information DB 15.

The server control unit 11 receives each request from the mobile terminal 20, refers to the corresponding DB (the corresponding one of the store information DB 13, the game app information DB 14, and the user information DB 15) in accordance with the request, and updates the information stored in the DB, if necessary. Further, the server control unit 11 transmits game-related information (such as screen information) to the mobile terminal 20 in accordance with the request.

Specifically, the server control unit 11 is a processor. The server control unit 11 may be of any type, such as a microcomputer or a dedicated circuit.

Next, the mobile terminal 20 will be described. The mobile terminal 20 includes a control unit 21, a storage unit 22, and an operating system (OS) 26. The storage unit 22 stores a game app, and the game app includes a game unit 23, a software development kit (SDK) unit 24, and a server information DB 25. Specifically, the mobile terminal 20 is a terminal having a display unit, such as a smartphone, a tablet terminal, or a laptop personal computer (PC). The display unit is not illustrated in FIG. 2.

The control unit 21 boots the OS 26 and executes the game app stored in the storage unit 22. The control unit 21 is a processor. The control unit 21 may be of any type, such as a microcomputer or a dedicated circuit. In the following embodiments, a process performed by the control unit 21 executing a game app is expressed simply as a verb and a corresponding subject "the game unit 23" or "the SDK unit 24".

Figure 3:
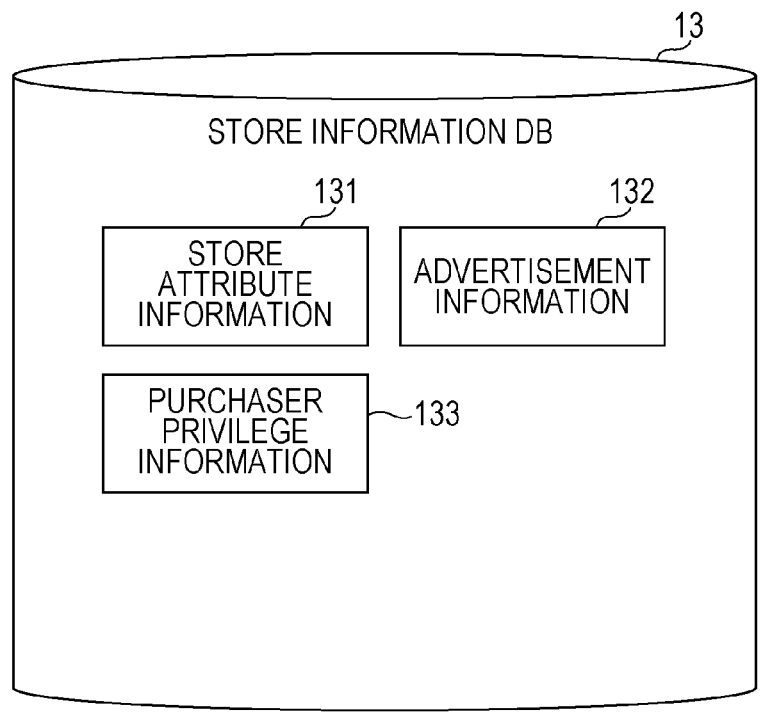
FIG. 3 illustrates information stored in a store information database (DB)
Figure 4:
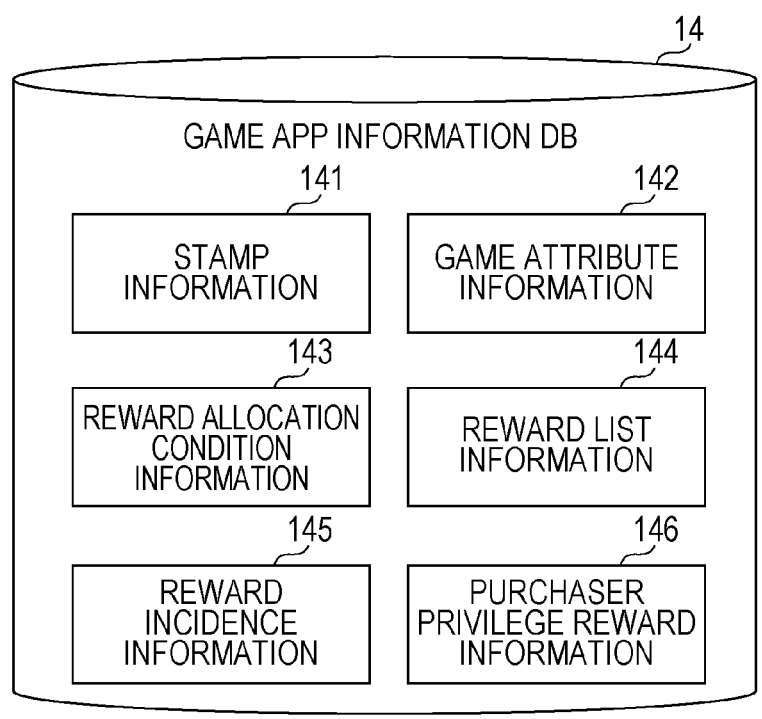
FIG. 4 illustrates information stored in a game app information DB.
Figure 5:
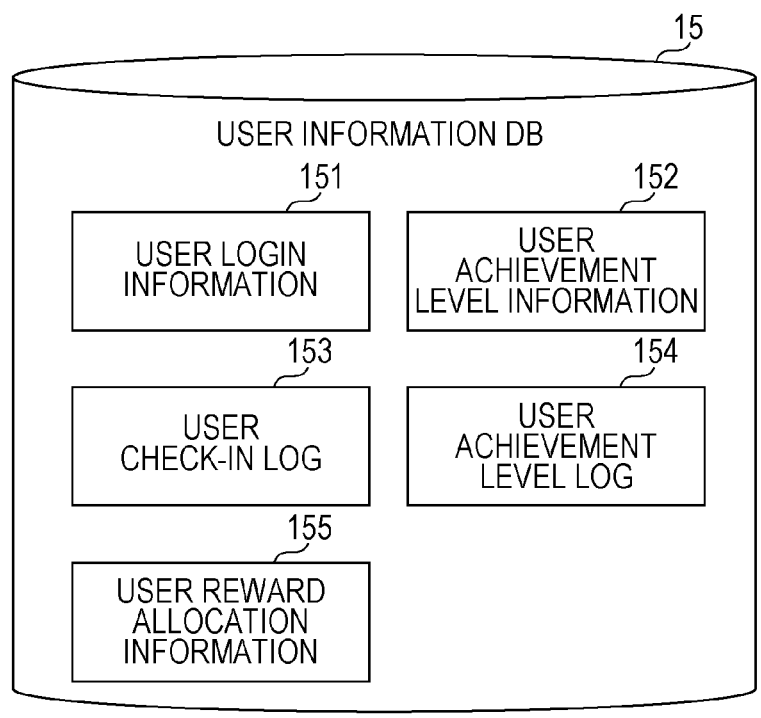
FIG. 5 illustrates information stored in a user information DB.

Next, information stored in each of the DBs described above will be briefly described. FIG. 3 illustrates information stored in the store information DB 13. FIG. 4 illustrates information stored in the game app information DB 14. FIG. 5 illustrates information stored in the user information DB 15.

As illustrated in FIG. 3, the store information DB 13 stores store attribute information 131, advertisement information 132, and purchaser privilege information 133.

As illustrated in FIG. 4, the game app information DB 14 stores stamp information 141, game attribute information 142, reward allocation condition information 143, reward list information 144, reward incidence information 145, and purchaser privilege reward information 146.

As illustrated in FIG. 5, the user information DB 15 stores user login information 151, user achievement level information 152, a user check-in log 153, a user achievement level log 154, and user reward allocation information 155.

Initialization Process

Figure 6:
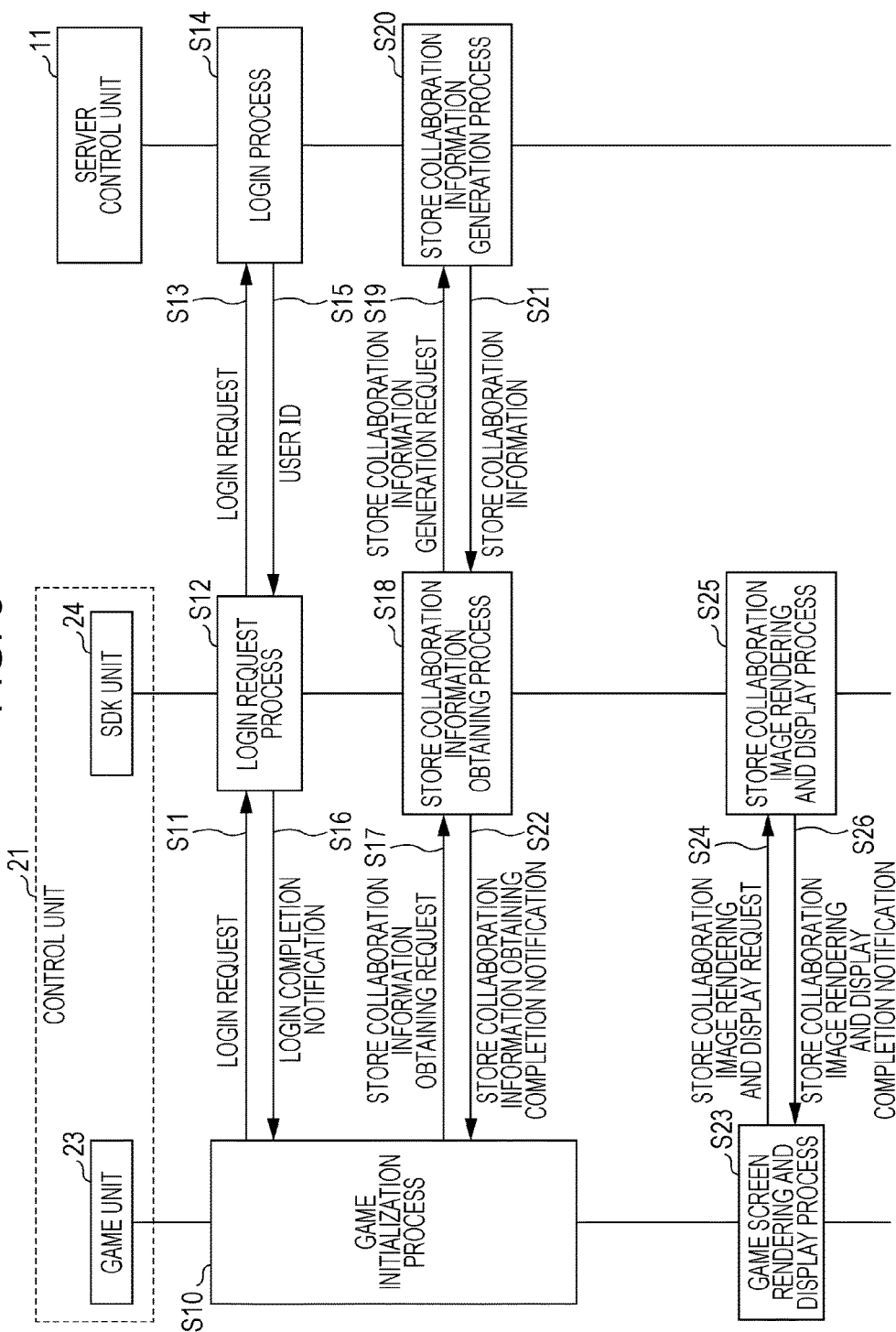
FIG. 6 is a sequence diagram of an initialization process.

Next, an initialization process for a game app executed on the mobile terminal 20 will be described. First, the overall flow of the initialization process will be described. FIG. 6 is a sequence diagram of the initialization process.

In a game initialization process (S10), the game unit 23 transmits a login request to the SDK unit 24 (S11), and the SDK unit 24 performs a login request process (S12). Specifically, the SDK unit 24 transmits the login request to the server control unit 11 (S13).

The server control unit 11 performs a login process (S14) in accordance with the received login request. After the completion of the login process, the server control unit 11 transmits a user ID to the SDK unit 24 (S15). The SDK unit 24 transmits a login completion notification to the game unit 23 (S16).

When the login is completed, the game unit 23 transmits a store collaboration information obtaining request to the SDK unit 24 (S17), and the SDK unit 24 performs a store collaboration information obtaining process (S18). Specifically, the SDK unit 24 transmits a store collaboration information generation request to the server control unit 11 (S19).

The server control unit 11 performs a store collaboration information generation process in accordance with the received store collaboration information generation request (S20) to generate store collaboration information, and transmits the store collaboration information to the SDK unit 24 (S21). Then, the SDK unit 24 transmits a store collaboration information obtaining completion notification to the game unit 23 (S22).

Through the operations described above, the game initialization process (S10) is completed. Then, the game unit 23 performs a game screen rendering and display process (S23). Specifically, the game unit 23 transmits a store collaboration image rendering and display request to the SDK unit 24 (S24), and the SDK unit 24 performs a store collaboration image rendering and display process (S25). After the completion of the store collaboration image rendering and display process, the SDK unit 24 transmits a store collaboration image rendering and display completion notification to the game unit 23.

Figure 7:
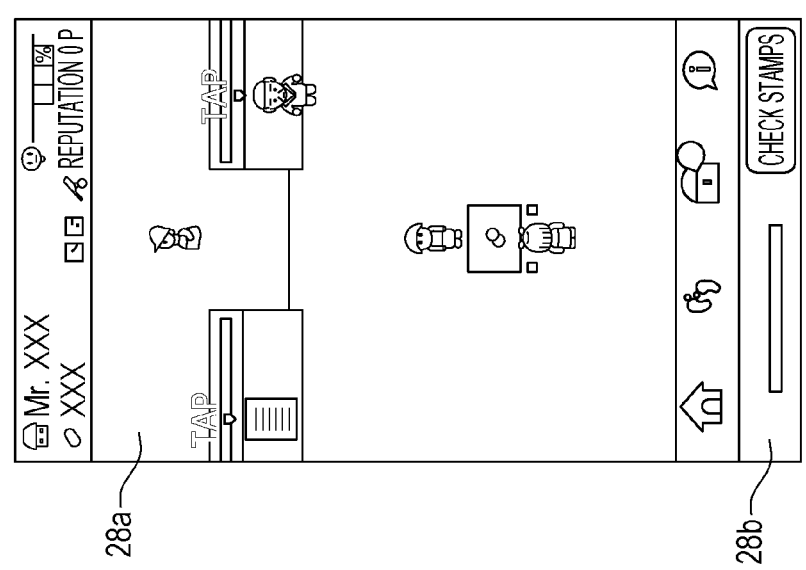
FIGS. 7A and 7B illustrate an example of display screens displayed on a display unit of a mobile terminal.

At the time of the login process, a login screen 27a illustrated in FIG. 7A is displayed on the display unit of the mobile terminal 20. At the completion of the game screen rendering and display process, a game screen 27b illustrated in FIG. 7B is displayed. The game screen 27b includes a game-specific image 28a and a store collaboration image 28b.

Figure 8:
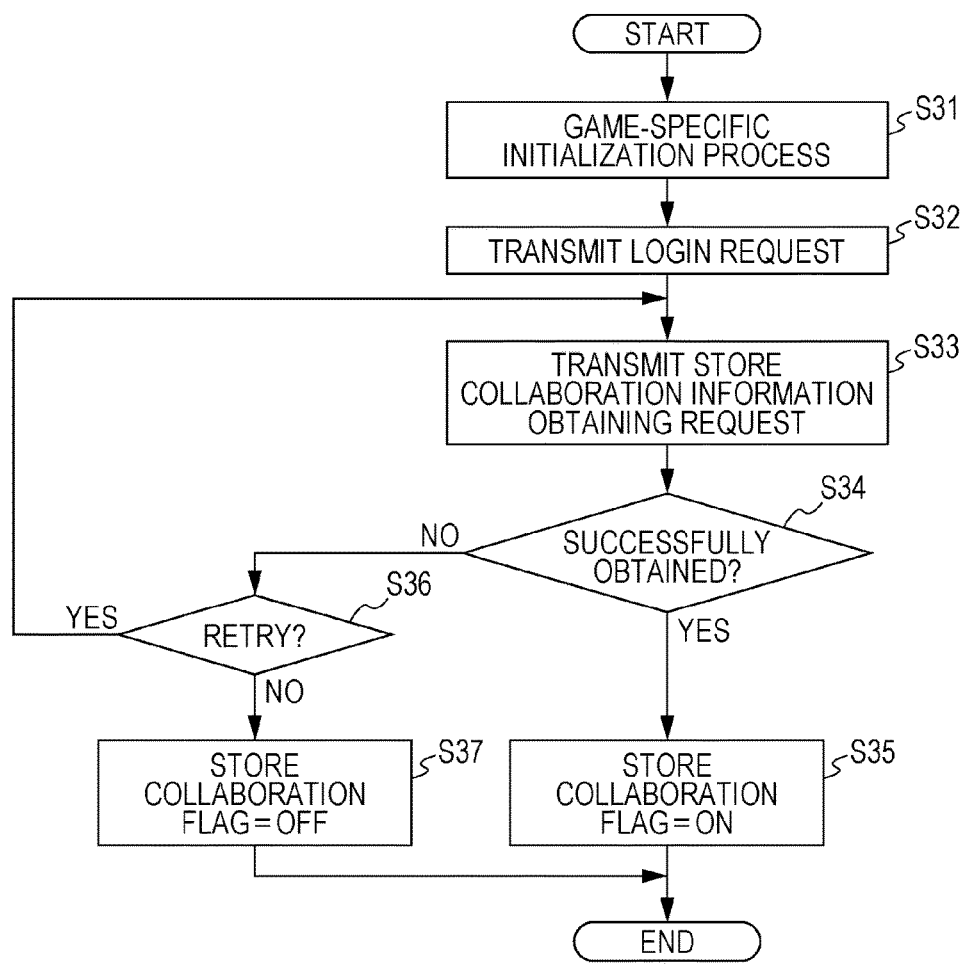
FIG. 8 is a flowchart of the operation of a game unit in the initialization process.

Next, the details of the operations of the game unit 23, the SDK unit 24, and the server 10 (the server control unit 11) in the initialization process will be described. First, the operation of the game unit 23 in the initialization process will be described. FIG. 8 is a flowchart of the operation of the game unit 23 in the initialization process.

As illustrated in FIG. 8, after performing the game initialization process (S31), the game unit 23 transmits a login request to the SDK unit 24 (S32), and transmits a store collaboration information obtaining request to the SDK unit 24 (S33). If the game unit 23 has succeeded in obtaining store collaboration information (YES in S34), a store collaboration flag is turned on (S35). If the game unit 23 has failed to obtain store collaboration information (NO in S34), a retry is performed (YES in S36). After the retry, the store collaboration flag is turned off (S37). The retry is performed a predetermined number of times, for example.

The subsequent various process requests from the game unit 23 to the SDK unit 24 (for example, the store collaboration image rendering and display request in FIG. 6) are made only while the store collaboration flag is ON.

Figure 9:
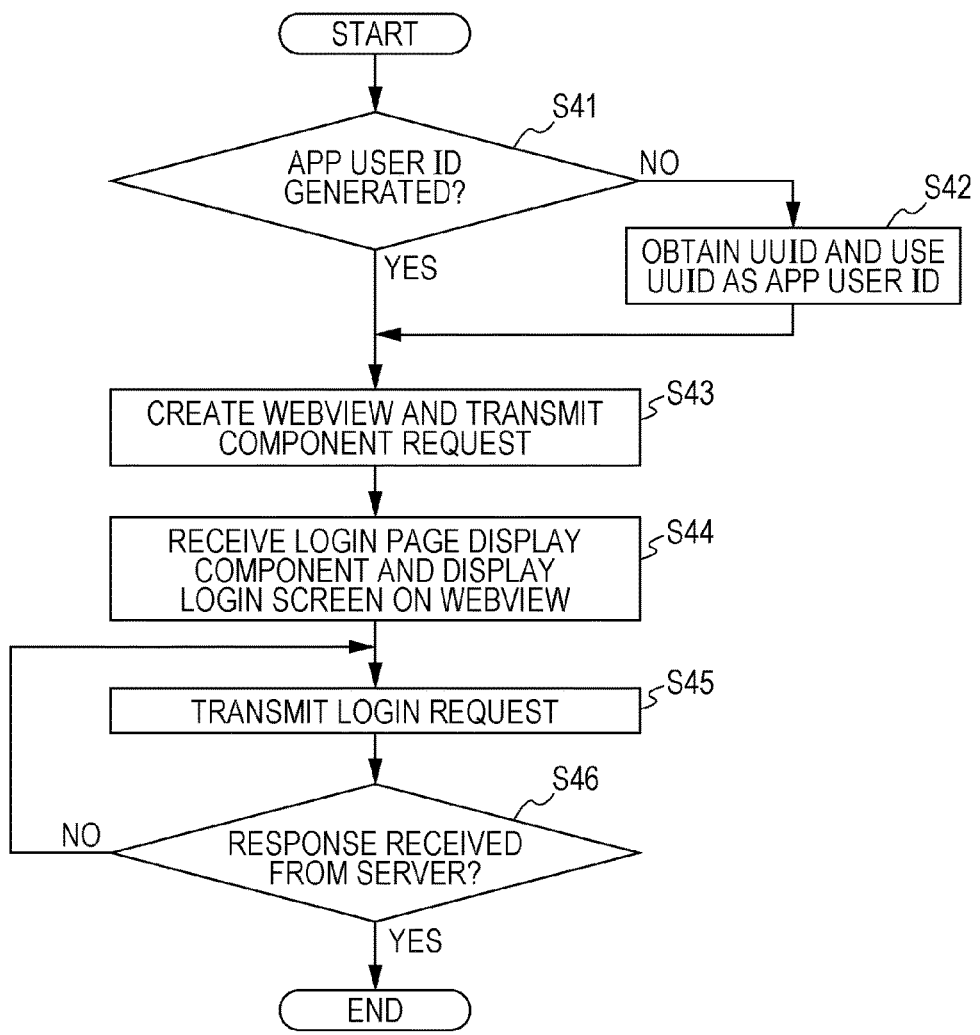
FIG. 9 is a flowchart of the operation of a software development kit (SDK) unit in the initialization process.

Subsequently, the operation of the SDK unit 24 in the initialization process will be described. FIG. 9 is a flowchart of the operation of the SDK unit 24 in the initialization process.

First, the SDK unit 24 determines whether or not an app user ID has been generated (S41). If an app user ID has not been generated (NO in S41), the SDK unit 24 obtains a universally unique identifier (UUID) from the OS 26, and uses the obtained UUID as an app user ID (S42).

Then, the SDK unit 24 creates a WebView, and transmits to the server 10 a login page display component request that takes the app user ID and an app ID as arguments (S43). The WebView is a function (way) for an app in the mobile terminal 20 (here, a game app) to display a webpage on the app.

Then, the SDK unit 24 receives components for displaying a login page from the server 10, and displays the login screen 27a on the WebView (S44). Here, the user enters a user name and a password through the mobile terminal 20. That is, the SDK unit 24 obtains the user name and password entered by the user.

Subsequently, the SDK unit 24 transmits to the server 10 a login request that takes the user name and password entered by the user, the app user ID, and the app ID as arguments (S45). If no response is received from the server 10 (NO in S46), the login request is retransmitted. If a response is obtained from the server 10 (YES in S46), the process ends.

Next, a specific example of the component request, the login request, and responses to these requests will be described. FIGS. 10A to 10D and FIG. 11 illustrate an example of Hypertext Markup Language (HTML) documents of a component request, a login request, and responses to these requests.

As illustrated in FIG. 10A, a component request 29 includes an app user ID 29a, an app ID 29b, and an action 29c.

As illustrated in FIG. 10B, a login request 31 includes an app user ID 31a, an app ID 31b, an action 31c, a user name 31d, and a password 31e.

In response to the login request 31, the server 10 transmits a response 32b (a response indicating no error) illustrated in FIG. 10O (step YES in S46). If the login is not accepted with the use of a combination of the user name and password specified in the login request 31, a response 32c illustrated in FIG. 10D is transmitted (NO is obtained in step S46 and the process of step S45 is performed again).

For the display of a login screen, a response written in HTML and JavaScript (registered trademark), such as a response 32a illustrated in FIG. 11, is transmitted in response to the component request 29. That is, "components" for displaying a WebView are transmitted in HTML and JavaScript (registered trademark). The first half (the portion surrounded by the upper frame in FIG. 11) of the response 32a describes a login request transmission process and a retry process when the "transmit" button is pressed on the mobile terminal 20. The second half (the portion surrounded by the lower frame in FIG. 11) of the response 32a describes components for displaying the login screen 27a on the display unit of the mobile terminal 20.

Figure 12:
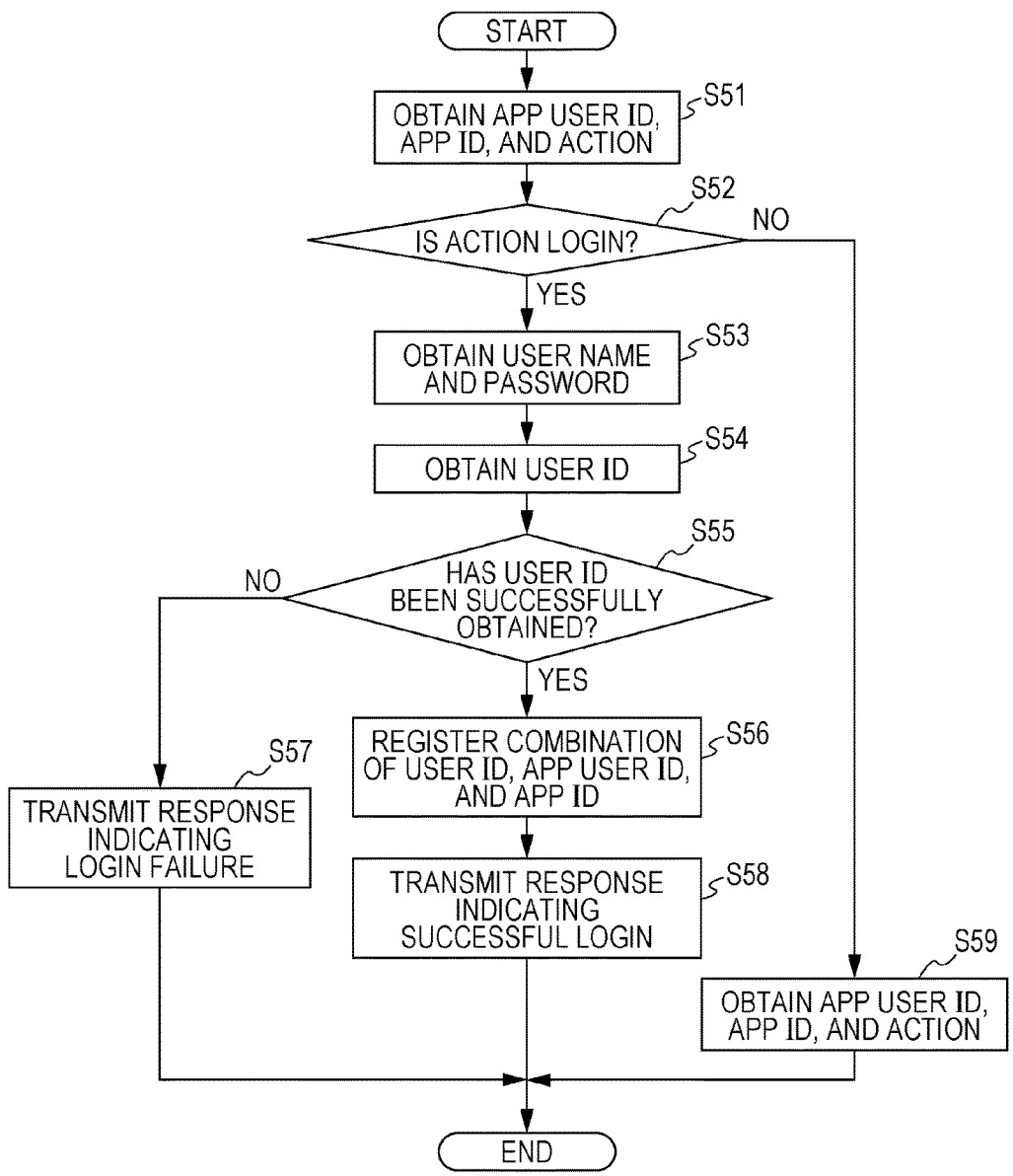
FIG. 12 is a flowchart of the operation of a server in the initialization process.
Figure 13:
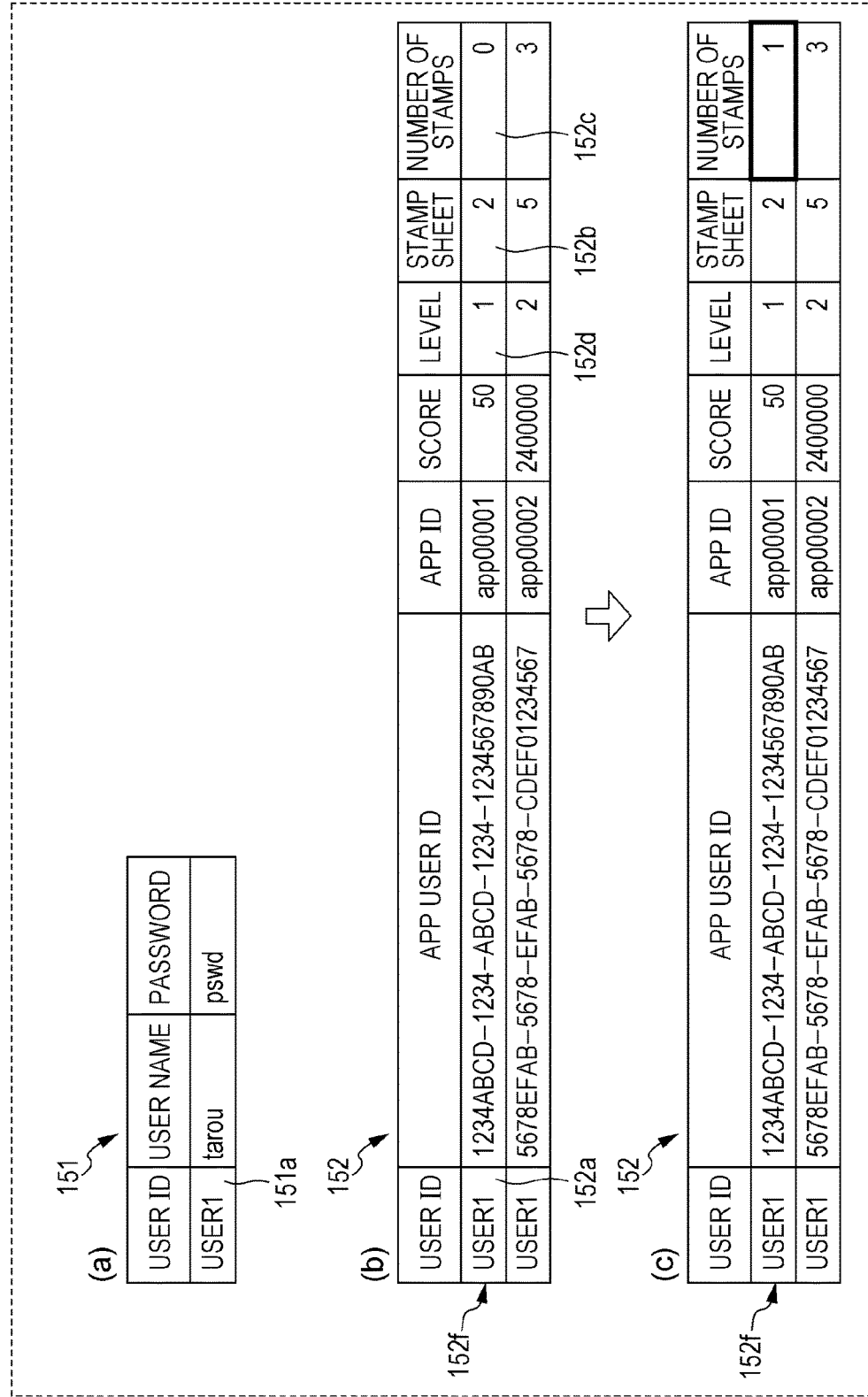
FIG. 13 illustrates user login information and user achievement level information in the user information DB.

Subsequently, the operation of the server 10 (the server control unit 11) will be described. FIG. 12 is a flowchart of the operation of the server 10 in the initialization process. FIG. 13 illustrates the user login information 151 and the user achievement level information 152 in the user information DB 15. In the user login information 151, as illustrated in part (a) of FIG. 13, a user ID 151*a* is associated with a user name and a password. As illustrated in part (b) of FIG. 13, in each piece of user achievement level information 152*f* included in the user achievement level information 152, a user ID 152*a* is associated with an app user ID, an app ID, a game score, a level 152*d*, a stamp sheet 152*b*, and the number of stamps 152*c*.

The server control unit 11 obtains the app user ID 29*a* (31*a*), the app ID 29*b* (31*b*), and the action 29*c* (31*c*) from the component request 29 or the login request 31 transmitted from the mobile terminal 20 (S51). If the action indicates "login", that is, if the login request 31 has been transmitted from the mobile terminal 20 (YES in S52), the server control unit 11 obtains the user name 31*d* and the password 31*e* from the login request 31 (S53). Then, the server control unit 11 searches the user login information 151 to obtain the user ID 151*a* (S54).

If the user ID 151*a* has been successfully obtained (YES in S55) and if a combination of the user ID 151*a*, the app user ID 31*a*, and the app ID 31*b* is not found in the user achievement level information 152, the server control unit 11 registers the combination of the user ID 151*a*, the app user ID 31*a*, and the app ID 31*b* in the user achievement level information 152 (S56). The values other than the user ID, the app user ID, and the app ID are set to default values (for example, score=0, level=1, stamp sheet=1, and number of stamps=0). Then, the server control unit 11 transmits the response 32*b* indicating a successful login to the mobile terminal 20 regardless of whether or not the user achievement level information 152 has been registered (S58).

If the server control unit 11 has failed to obtain a user ID (NO in S55), the server control unit 11 transmits the response 32*c* indicating a login failure to the mobile terminal 20 (S57).

On the other hand, if, in step S52, the action indicates "View", that is, if the component request 29 has been transmitted from the mobile terminal 20 (NO in S52), the server control unit 11 generates the response 32*a* based on the app user ID 29*a* and the app ID 29*b*, and transmits the response 32*a* to the mobile terminal 20 (S59).

Store Collaboration Information Generation Process

Figure 14:
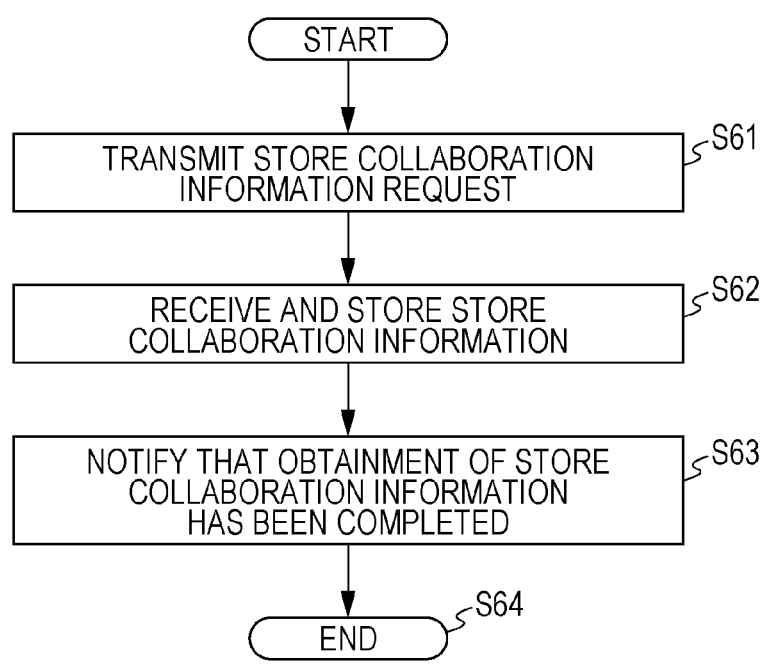
FIG. 14 is a flowchart of a method for obtaining store collaboration information.
Figures 16, 17:
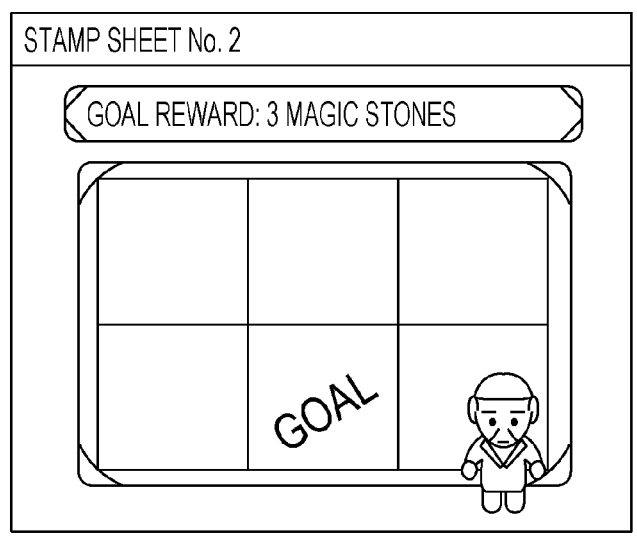
FIG. 16 illustrates an example of server information in the server information DB.
FIG. 17 illustrates an example of a stamp sheet screen.

Next, a store collaboration information generation process in the game screen rendering and display process will be described. First, a method for obtaining store collaboration information using the SDK unit 24 will be described. FIG. 14 is a flowchart of a method for obtaining store collaboration information. FIGS. 15A and 15B respectively illustrate an example of a store collaboration information request and an example of store collaboration information. FIG. 16 illustrates an example of server information in the server information DB 25. FIG. 17 illustrates an example of a stamp sheet screen.

The SDK unit 24 transmits a store collaboration information request 33 that takes an app user ID 33*a* and an app ID 33*b* as arguments (S61). Then, the SDK unit 24 receives store collaboration information 34 from the server control unit 11, and stores the store collaboration information 34 in the server information DB 25 as server information 35 (S62). Then, the SDK unit 24 notifies the game unit 23 of the completion of obtainment of the store collaboration information 34 (S63).

The store collaboration information 34 is information for generating a store collaboration image. The store collaboration information 34 includes a response 34*a*, the number of stamps 34*b*, and a message 34*c*, and the server information 35 also includes the pieces of information described above.

The response 34*a* is information indicating whether or not the server control unit 11 has succeeded in generating the store collaboration information 34 (whether or not the store collaboration information 34 has been generated without errors). The response 34*a* describes "NONE" if the store collaboration information 34 has been successfully generated, "connection_error" if network access to the server control unit 11 has failed, and "bad_app_id" If no app ID is registered in the server 10.

The number of stamps 34*b* is information indicating how many stamps an app user specified (or identified) by an app user ID has obtained in a game specified by an app ID. In the first embodiment, the number of stamps 34*b* is expressed by the number of earned stamps/the number of goal stamps. The number of goal stamps is the number of stamps with which a stamp sheet is filled, and is "5" in the first embodiment. Accordingly, if, as illustrated in FIG. 17, no stamp is placed on a stamp sheet screen 27*c*, the number of stamps 34*b* is expressed as 0/5.

The message 34*c* is a message for inspiring the user with a visit to the store 30. The message 34*c* is generated by the server control unit 11.

Figure 18:
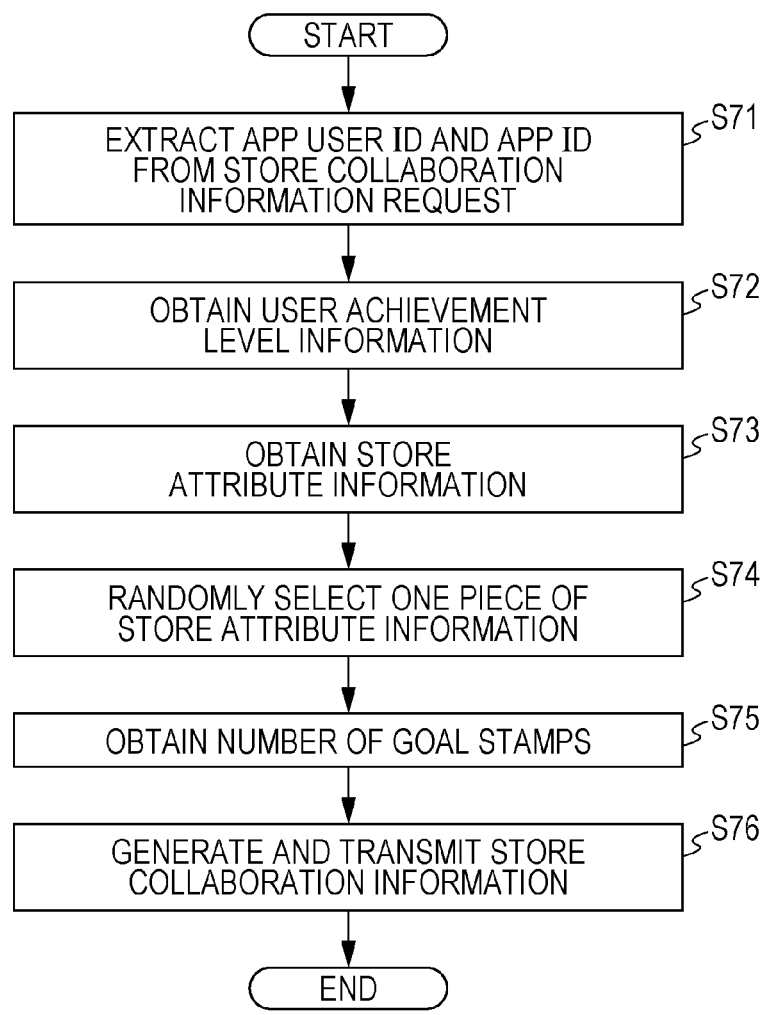
FIG. 18 is a flowchart of a store collaboration information generation method.

Next, a process for generating the store collaboration information 34 using the server 10 (the server control unit 11) will be described. FIG. 18 is a flowchart of a method for generating the store collaboration information 34. FIG. 19 illustrates an example of the store attribute information 131 in the store information DB 13. FIG. 20 illustrates an example of the stamp information 141 in the game app information DB 14.

The server control unit 11 extracts the app user ID 33*a* and the app ID 33*b* from the store collaboration information request 33 received from the control unit 21 (the SDK unit 24) (S71). Then, the server control unit 11 obtains the corresponding user achievement level information 152*f* from the user information DB 15 on the basis of the extracted app user ID 33*a* and app ID 33*b* (S72).

Subsequently, the server control unit 11 obtains a certain number of pieces of store attribute information 131 (FIG. 19) from the store information DB 13 (S73), and randomly selects one of the obtained pieces of store attribute information 131 (S74). The details of the process of step S73 will be described below.

Then, the server control unit 11 obtains the number of goal stamps in the number of stamp sheets of the app corresponding to the app ID 33*b* from the stamp information 141 in the game app information DB 14 (S75). The number of stamp sheets is specified by the stamp sheet 152*b* included in the user achievement level information 152*f*, and is "2" here. In addition, as indicated in stamp information 141*a* illustrated in FIG. 20, the number of goal stamps is "5".

Finally, the server control unit 11 generates store collaboration information 34, and transmits the generated store collaboration information 34 to the mobile terminal 20 (S76). The store collaboration information 34 includes the number of earned stamps specified by the number of stamps 152*c* included in the user achievement level information 152*f*, the number of goal stamps, and a message included in the store attribute information selected in step S74 (for example, a message 36*f* if the store attribute information selected in step S74 is store attribute information 131*d*).

Figure 21A:
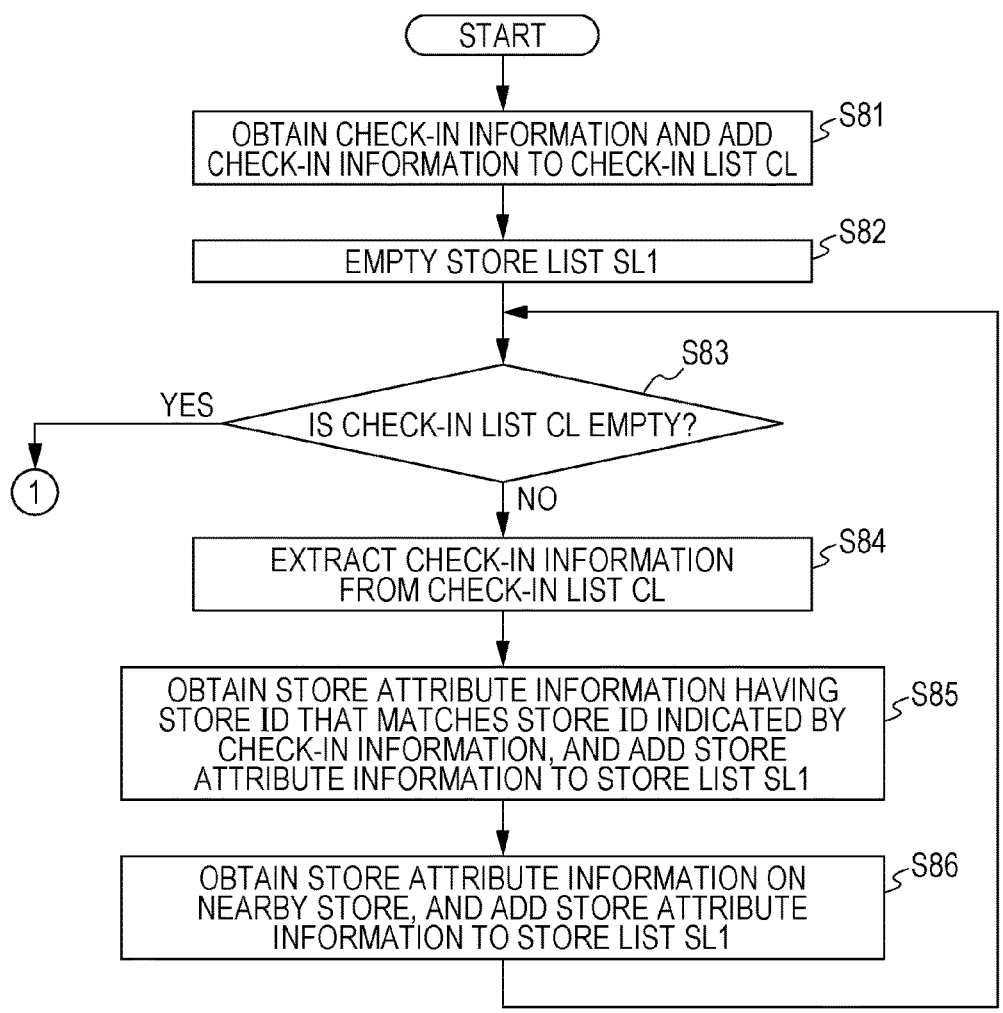
FIG. 21A is a flowchart (first half) of a process for obtaining a certain number of pieces of store attribute information from the store information DB.
Figure 21B:
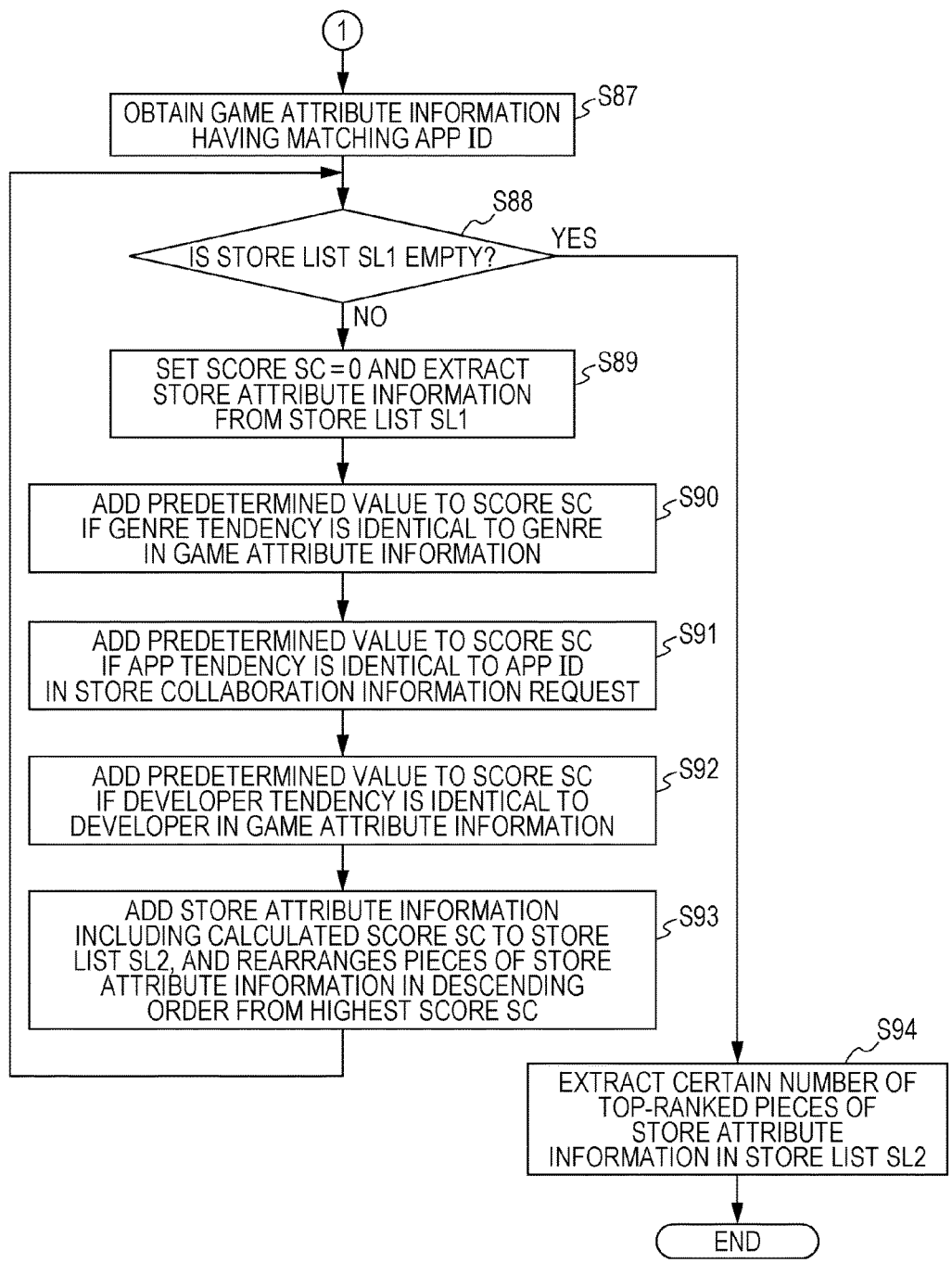
FIG. 21B is a flowchart (second half) of the process for obtaining a certain number of pieces of store attribute information from the store information DB.

Next, an example of a process for obtaining a certain number of pieces of store attribute information 131 from the store information DB 13 (the process of step S73 described above) will be described. FIG. 21A and FIG. 21B illustrate a flowchart of a process for obtaining a certain number of pieces of store attribute information 131 from the store information DB 13. FIGS. 22A and 22B respectively illustrate an example of the user check-in log 153 and an example of the game attribute information 142.

In the following description, an example is provided in which the server control unit 11 extracts a certain number of pieces of store attribute information 131 by using a check-in list CL, store lists SL1 and SL2, and a score SC.

The server control unit 11 obtains check-in information on check-ins (a history of check-ins) made over a certain period (for example, if the certain period is one month and the current time is 12:00 on Feb. 7, 2014, pieces of check-in information 153a and 153b illustrated in FIG. 22A in which the times are within a period from 12:00 on Jan. 7, 2014 to 12:00 on Feb. 7, 2014) from the user check-in log 153 in the user information DB 15, and adds the obtained check-in information to the check-in list CL (S81). Then, the server control unit 11 empties the store list SL1 (S82), and determines whether or not the check-in list CL is empty (S83).

If the check-in list CL is not empty (NO in S83), the server control unit 11 extracts a piece of check-in information from the check-in list CL (S84). Further, the server control unit 11 refers to the store attribute information 131 to obtain the store attribute information 131 having a store ID that matches the store ID indicated by the extracted check-in information, and adds the obtained store attribute information 131 to the store list SL1 (S85). For example, the check-in information 153a illustrated in FIG. 22A is extracted. In this case, a store ID 153c represents str00005, and thus store attribute information 131e among the pieces of store attribute information 131 illustrated in FIG. 19 is obtained.

Further, the server control unit 11 refers to the store attribute information 131 to obtain store attribute information 131 on a store located nearby the store indicated by the store ID 153c in the check-in information 153a, and adds the obtained store attribute information 131 to the store list SL1 (S86). The presence or absence of a nearby store is determined by calculating the distance between the stores by using the latitude and longitude included in the store attribute information 131. Specifically, if the distance between the stores is less than or equal to a certain value (for example, within 500 m), it is determined that the stores are nearby. When store attribute information 131 on a nearby store within 500 m is searched for using Structured Query Language (SQL), a description illustrated in FIG. 23 is used. For example, store attribute information 131b and store attribute information 131d are pieces of store attribute information having latitude and longitude within 500 m from the store attribute information 131e (with a latitude of 34.72101 and a longitude of 135.3122). In this case, the store attribute information 131b and the store attribute information 131d are added to the store list SL1.

The processes of steps S84 to S86 are performed until the check-in list CL becomes empty (YES in S83).

Then, the server control unit 11 obtains, from the game attribute information 142 in the game app information DB 14, game attribute information (here, game attribute information 142a) having an app ID that matches the app ID 33b included in the store collaboration information request 33 (S87).

If the store list SL1 is not empty (NO in S88), the server control unit 11 sets the score SC=0, and extracts a piece of store attribute information 131 from the store list SL1 (S89). If the genre tendency in the extracted store attribute information 131 (hereinafter also referred to as "the target store attribute information 131") is identical to a genre 142b in the game attribute information 142a, the server control unit 11 adds a predetermined value (the value in parentheses in the genre tendency in the store attribute information 131, for example, 0.5 for the store attribute information 131d) to the score SC of the target store attribute information 131 (S90).

If the app tendency in the target store attribute information 131 is identical to the app ID 33b included in the store collaboration information request 33, the server control unit 11 adds a predetermined value (the value in parentheses in the app tendency in the store attribute information 131, for example, 0.2 for store attribute information 131a) to the score SC of the target store attribute information 131 (S91).

If the developer tendency in the target store attribute information 131 is identical to a developer 142c in the game attribute information 142a, the server control unit 11 adds a predetermined value (the value in parentheses in the developer tendency in the store attribute information 131, for example, 0.3 for the store attribute information 131b) to the score SC of the target store attribute information 131 (S92).

Finally, the server control unit 11 adds to the store list SL2 the target store attribute information 131 in which the score SC calculated in steps S90 to S92 is included, and rearranges the pieces of store attribute information 131 in the store list SL2 in descending order from the highest score SC (S93).

The processes of steps S89 to S93 are performed on each piece of store attribute information 131 in the store list SL1 until the store list SL1 becomes empty (YES in S88).

Through the process described above, a certain number of top-ranked pieces of store attribute information 131 in the store list SL2, that is, a certain number of nearby stores that the player has visited over a past certain period and that have high relevance to the game app currently being played by the player, are extracted (S94).

Game Screen Rendering and Display Process

Figure 24:
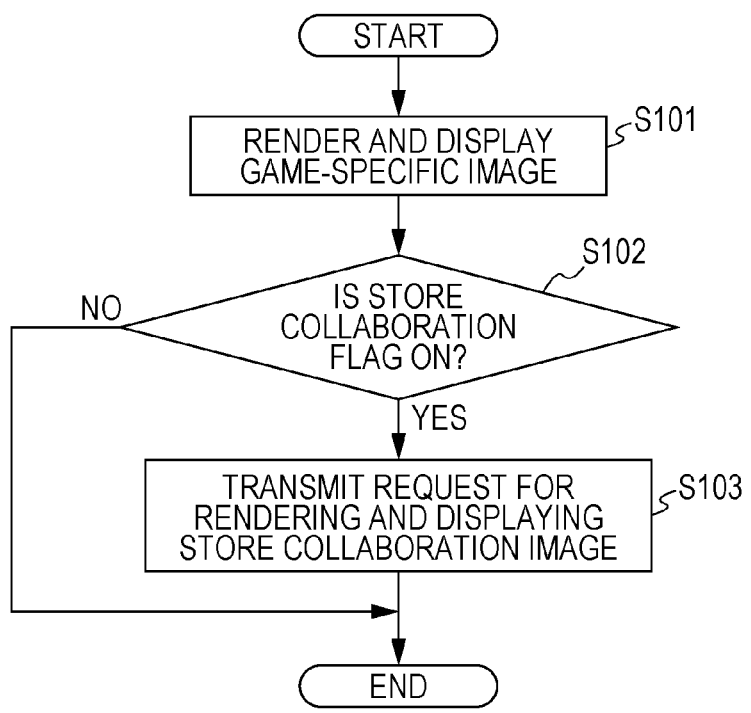
FIG. 24 is a flowchart of a game screen rendering and display process.
Figure 25:
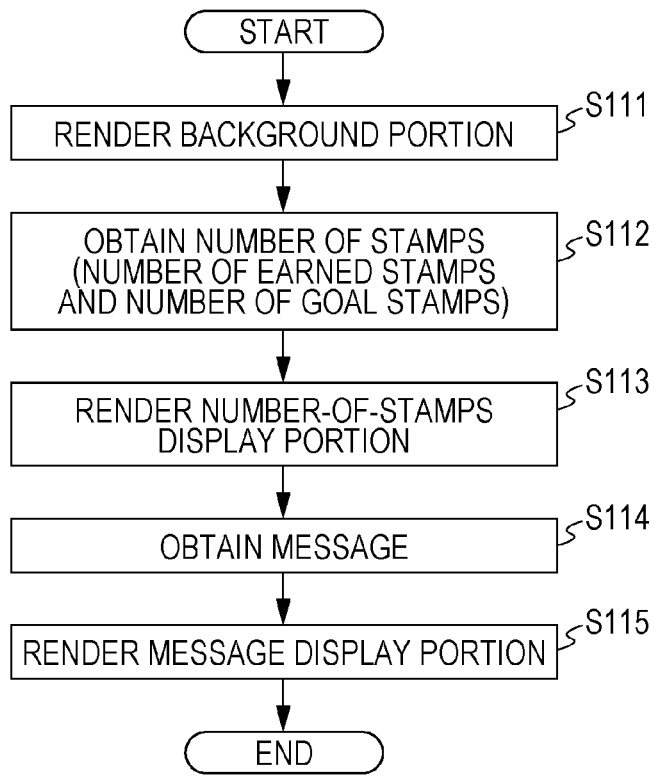
FIG. 25 is a flowchart of a store collaboration image generation process.
Figure 26:
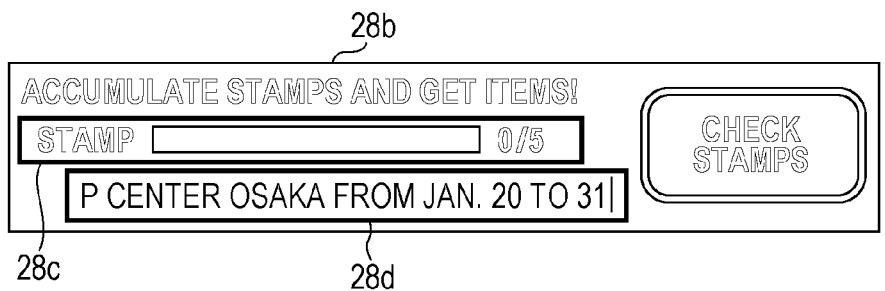
FIG. 26 illustrates an example of a store collaboration image.

A game screen rendering and display process that uses the store collaboration information 34 described above will be described. FIG. 24 is a flowchart of the game screen rendering and display process. FIG. 25 is a flowchart of a process for generating the store collaboration image 28b. FIG. 26 illustrates an example of the store collaboration image 28b.

As illustrated in FIG. 24, first, the game unit 23 renders and displays the game-specific image 28a (S101). If the store collaboration flag is ON (YES in S102), the game unit 23 transmits a request for rendering and displaying the store collaboration image 28b to the SDK unit 24 (S103).

As illustrated in FIG. 25, upon receipt of the request for rendering and displaying the store collaboration image 28b, the SDK unit 24 first renders a background portion of the store collaboration image 28b (FIG. 26) (S111). Subsequently, the SDK unit 24 obtains the number of stamps 34b (the number of earned stamps and the number of goal stamps) from the store collaboration information 34 (S112), and renders a number-of-stamps display portion 28c of the store collaboration image 28b (S113).

The SDK unit 24 further obtains the message 34c from the store collaboration information 34 (S114), and renders a message display portion 28d of the store collaboration image 28b (S115). In the message display portion 28d, the message 34c is displayed as scrolling text.

Game Process and Reward Allocation Process

Figure 27:
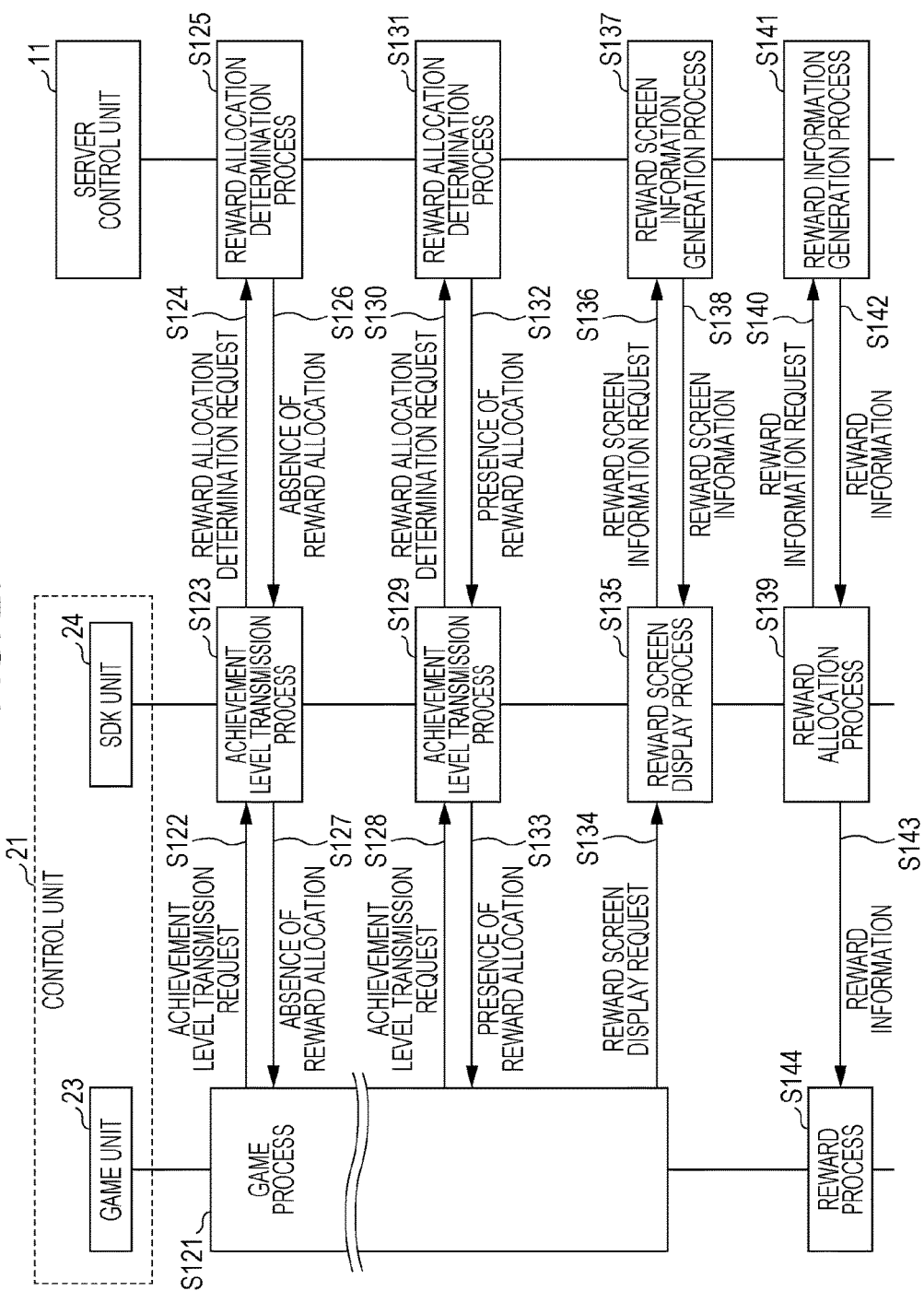
FIG. 27 is a sequence diagram of a game process and a reward allocation process.

Next, a game process and a reward allocation process will be described. FIG. 27 is a sequence diagram of the game process and the reward allocation process.

In the game process of S121, the game unit 23 transmits an achievement level transmission request to the SDK unit 24 (S122). Upon receipt of the achievement level transmission request, the SDK unit 24 performs an achievement level transmission process (S123). Specifically, the SDK unit 24 transmits a reward allocation determination request to the server control unit 11 (S124). The reward allocation determination request includes an achievement level.

The server control unit 11 performs a reward allocation determination process in accordance with the transmitted reward allocation determination request (S125). If it is determined that reward allocation is not necessary, the server control unit 11 transmits a response (reward allocation information) indicating the absence of reward allocation to the SDK unit 24 (S126). Then, the SDK unit 24 transmits the response indicating the absence of reward allocation (reward allocation information) to the game unit 23 (S127).

If a reward is to be allocated, the game unit 23 also transmits an achievement level transmission request to the SDK unit 24 (S128), and the SDK unit 24 performs an achievement level transmission process (S129 and S130). The server control unit 11 performs a reward allocation determination process in accordance with the transmitted reward allocation determination request (S131). If it is determined that reward allocation is necessary, the server control unit 11 transmits a response (reward allocation information) indicating the presence of reward allocation to the SDK unit 24 (S132). Then, the SDK unit 24 transmits the response indicating the presence of reward allocation to the game unit 23 (S133).

Upon receipt of the response indicating the presence of reward allocation, the game unit 23 transmits a reward screen display request to the SDK unit 24 (S134). Upon receipt of the reward screen display request, the SDK unit 24 performs a reward screen display process (S135). Specifically, the SDK unit 24 transmits a reward screen information request to the server control unit 11 (S136). Upon receipt of the reward screen information request, the server control unit 11 generates reward screen information (S137), and transmits the generated reward screen information to the SDK unit 24 (S138). The SDK unit 24 displays an indication of obtaining of a reward on the display unit of the mobile terminal 20 by using the received reward screen information.

After displaying the reward screen information, the SDK unit 24 performs a reward allocation process (S139). Specifically, the SDK unit 24 transmits a reward information request to the server control unit 11 (S140). Upon receipt of the reward information request, the server control unit 11 generates reward information (S141), and transmits the generated reward information to the SDK unit 24 (S142).

The SDK unit 24 transmits the received reward information to the game unit 23 (S143), and the game unit 23 performs a reward process (S144).

Figure 28:
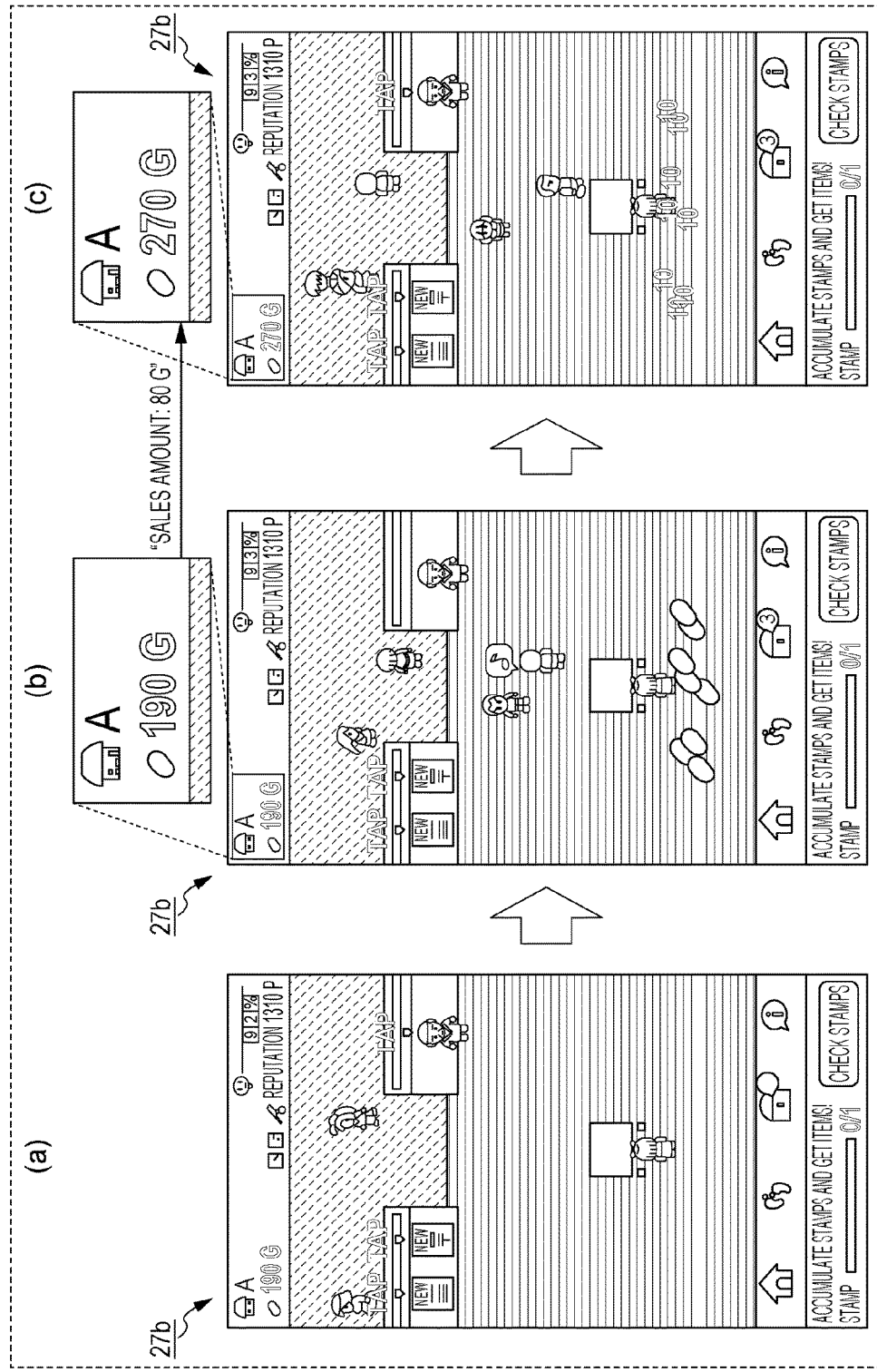
FIG. 28 illustrates game screens in a case where goods are sold in a game.

As described above, in a game according to the first embodiment, a user sells goods in the game and is allocated a stamp once the sales have reached a predetermined amount. FIG. 28 illustrates the game screen 27b when goods are sold in a game.

As illustrated in part (a) of FIG. 28, the sales figures are shown in the upper left portion of the game screen 27b. As illustrated in part (b) of FIG. 28, if goods in the game are sold with sales of "190 G" (G is the unit of currency in the game), as illustrated in part (c) of FIG. 28, sales increase. In the illustrated example, the amount of "80 G" is added, resulting in the total sales amounting to "270 G". The increase in sales is included in the achievement level transmission request described above as an "achievement level", and the achievement level is transmitted from the game unit 23 to the SDK unit 24. The achievement level is also included in the reward allocation determination request described above, and is transmitted from the SDK unit 24 to the server control unit 11.

Figure 29:
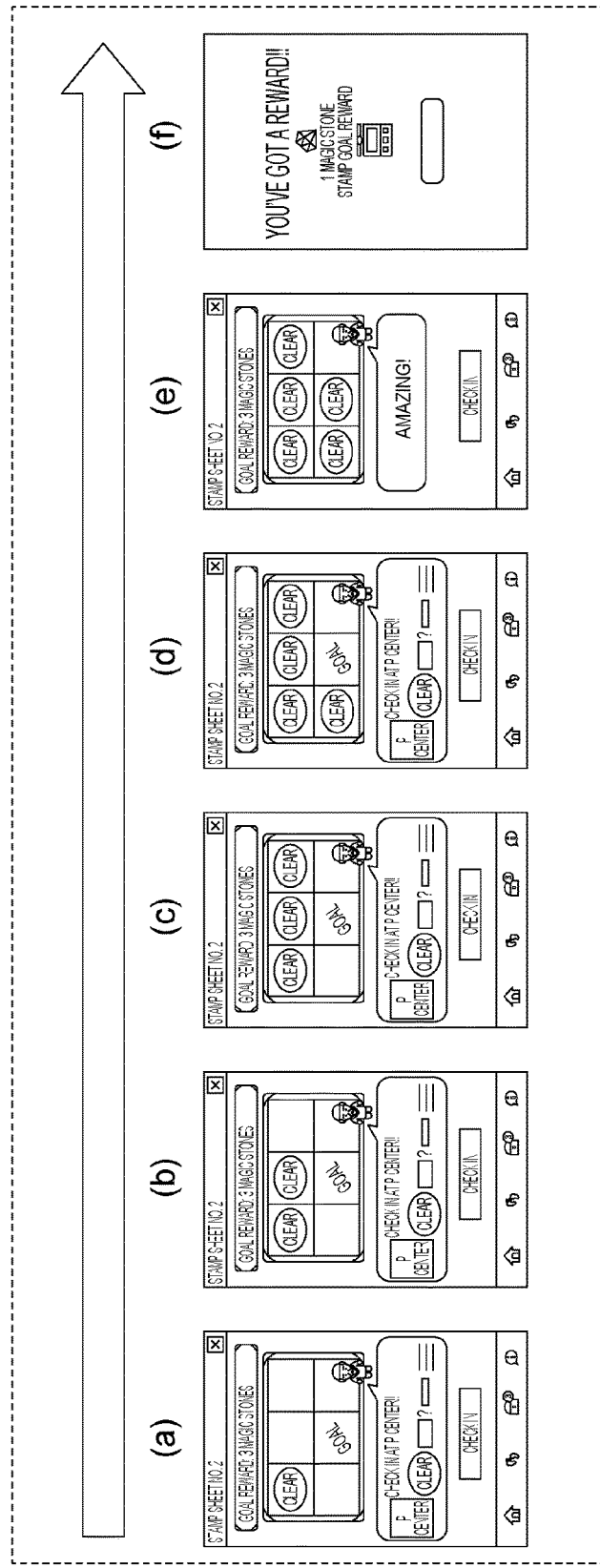
FIG. 29 illustrates how stamps are issued in a stamp sheet screen.

The process for the allocation of stamps in accordance with the achievement level, that is, the process for the addition of stamps on the stamp sheet screen 27c described above, is included in the reward allocation determination process described above. Note that the process for displaying a stamp sheet is included in the reward screen display process described above. FIG. 29 illustrates how stamps are issued in the stamp sheet screen 27c.

As illustrated in parts (a) to (e) of FIG. 29, in the reward allocation determination process, stamps are given one by one as rewards each time a certain achievement is made in the game. Further, screens on which stamps are issued one by one in the stamp sheet screen 27c are generated through a reward screen information generation process. Stamps are reward information managed by the server 10. The game unit 23 does not need to have awareness of the number of earned stamps or the number of goal stamps. If the number of earned stamps has reached the number of goal stamps (here, five), as illustrated in part (f) of FIG. 29, the user is allocated an item of value in the game.

The item allocated to the user is information to be subjected to an allocation process by the game unit 23, unlike a stamp. While the display regarding the allocation of items is performed by using the reward screen information generation process, a process for reflecting an allocated item in the game is performed by the game unit 23 in a reward process upon receipt of reward information transmitted from the SDK unit 24.

Figure 30:
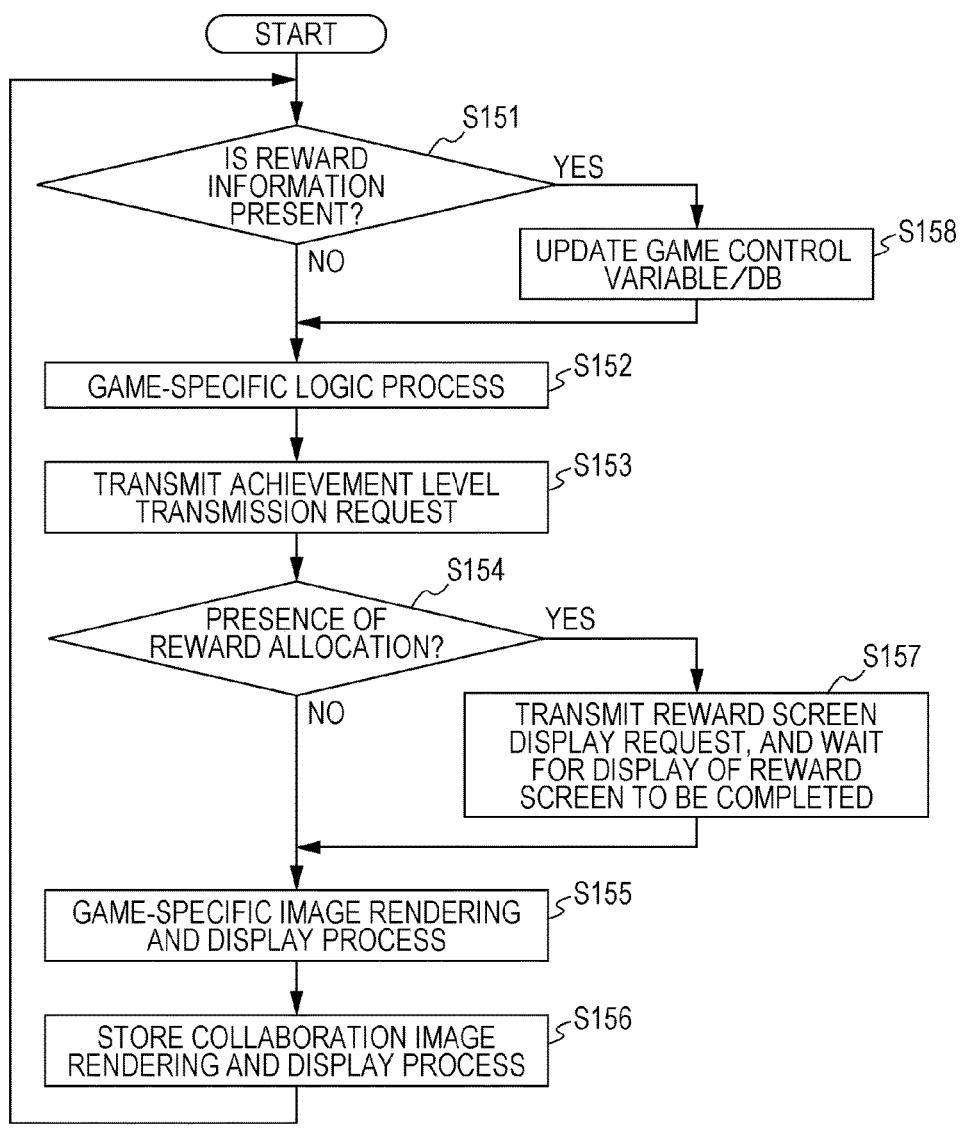
FIG. 30 is a flowchart of the game process and the reward allocation process.

Next, the game process and the reward process will be described in detail with reference to a flowchart. FIG. 30 is a flowchart of the game process and the reward process.

If reward information has been received from the SDK unit 24, that is, if reward information is present (YES in S151), the game unit 23 updates a game control variable/DB in accordance with the reward information (S158).

If no reward information is found (NO in S151) or after the process of step S158, a game-specific logic process is performed (S152). Then, the game unit 23 transmits an achievement level transmission request to the SDK unit 24 (S153).

If a response indicating the presence of reward allocation has been received (YES in S154), the game unit 23 transmits a reward screen display request to the SDK unit 24, and waits for the display of a reward screen to be completed (S157).

If the game unit 23 has received a response indicating the absence of reward allocation (NO in S154) or after the display of a reward screen has been completed, the game unit 23 performs a game-specific image rendering and display process (S155), and the SDK unit 24 performs a store collaboration image rendering and display process (S156). Then, the presence or absence of reward information is determined again (S151).

Figure 31:
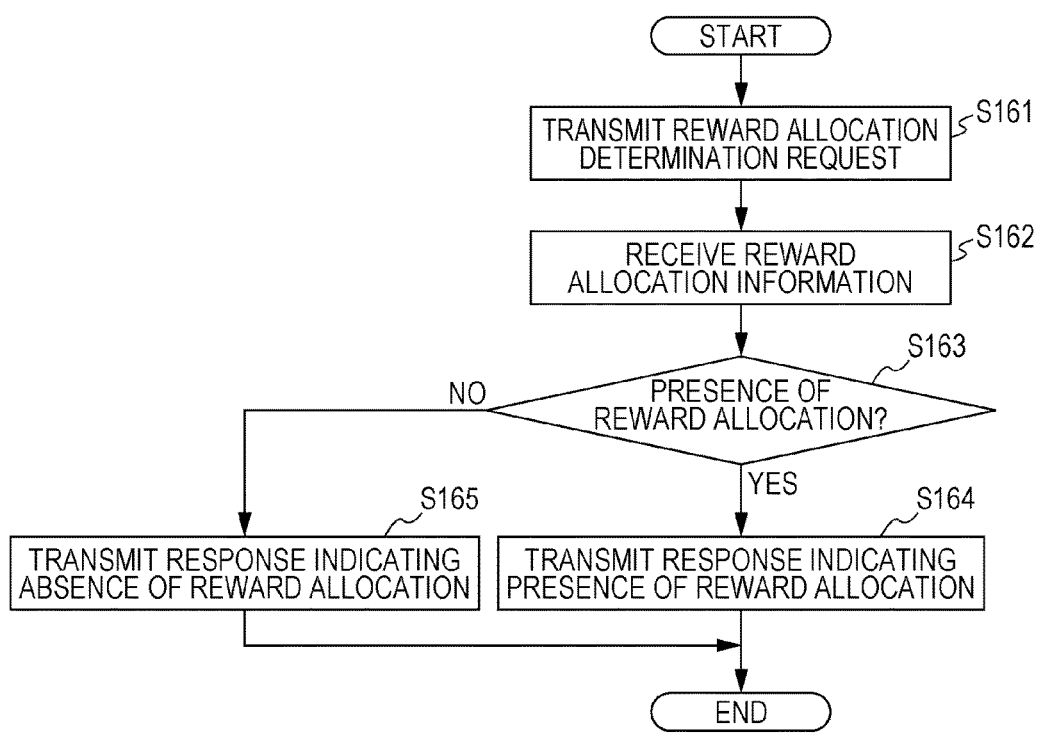
FIG. 31 is a flowchart of an achievement level transmission process.
Figure 32A:
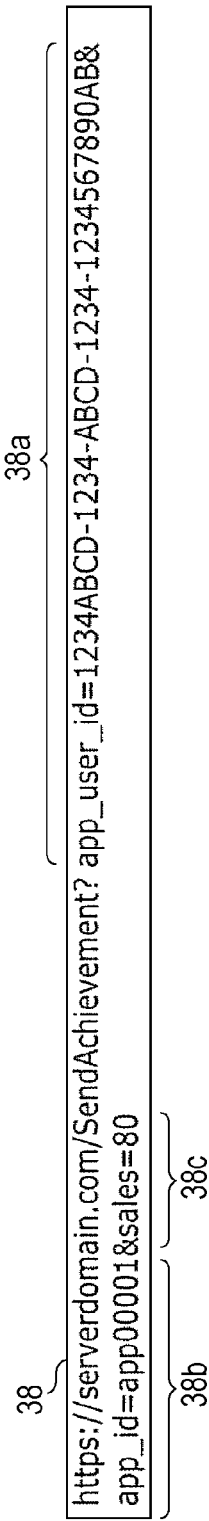
FIGS. 32A and 32B respectively illustrate an example of a reward allocation determination request and an example of reward allocation information.
Figure 32B:
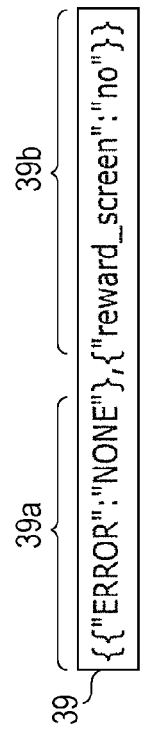

Next, the achievement level transmission process performed by the SDK unit 24 will be described in detail with reference to a flowchart. FIG. 31 is a flowchart of the achievement level transmission process. FIGS. 32A and 32B respectively illustrate an example of a reward allocation determination request and an example of reward allocation information.

As illustrated in FIG. 31, the SDK unit 24 transmits to the server 10 (the server control unit 11) a reward allocation determination request 38 that takes an app user ID 38a, an app ID 38b, and an achievement level 38c as arguments (S161). Then, the SDK unit 24 receives reward allocation information 39 from the server 10 (S162). The reward allocation information 39 includes a response 39a indicating whether an error is present or not, and a response 39b indicating whether reward allocation is present or not.

If the response 39b included in the reward allocation information 39 indicates the presence of reward allocation (YES in S163), the SDK unit 24 transmits a response indicating the presence of reward allocation to the game unit 23 (S164). On the other hand, if the response 39b included in the reward allocation information 39 indicates the absence of reward allocation (NO in S163), the SDK unit 24 transmits a response indicating the absence of reward allocation to the game unit 23 (S165).

Figure 33:
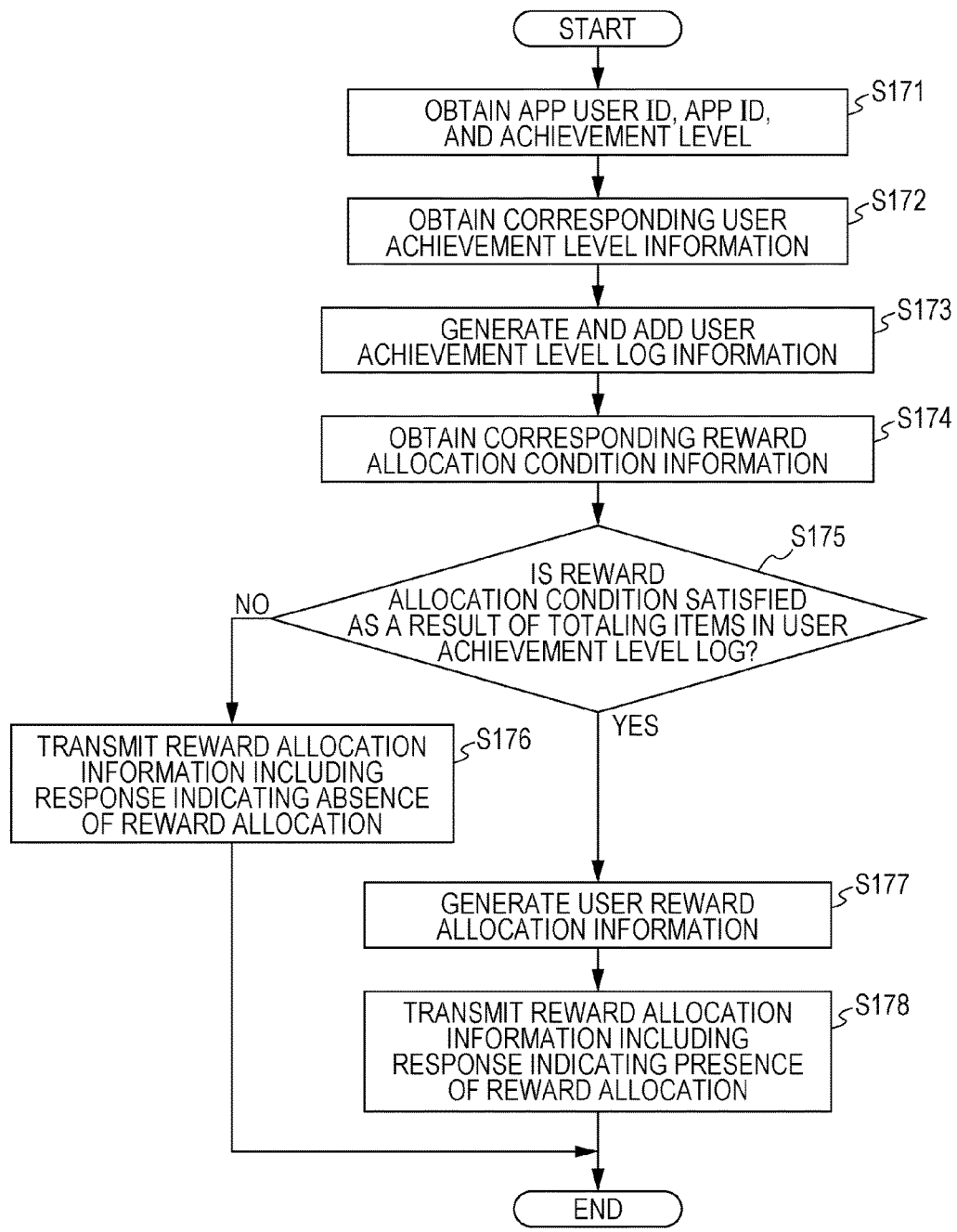
FIG. 33 is a flowchart of a reward allocation determination process.
Figure 35:
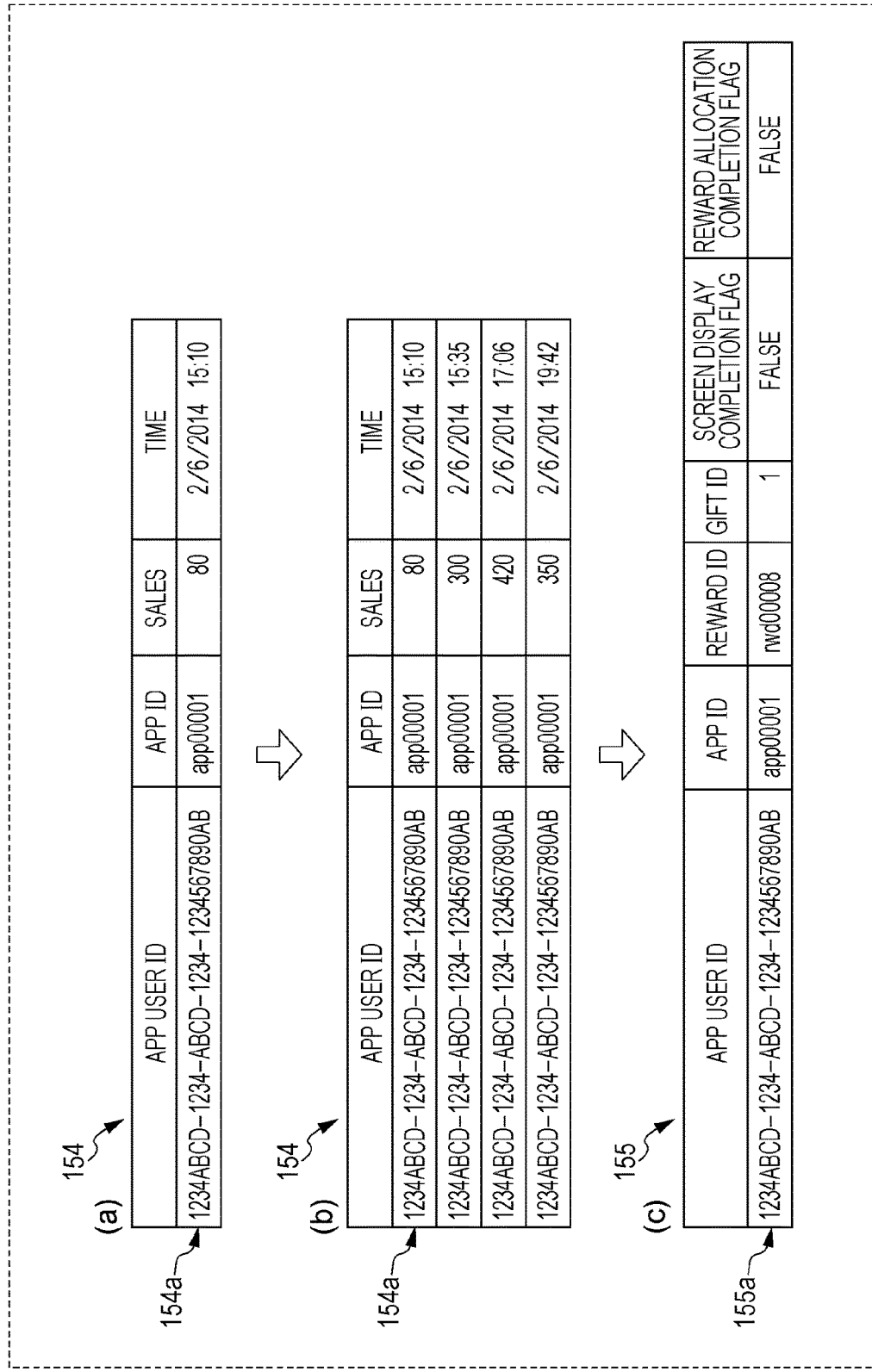
FIG. 35 illustrates an example of a user achievement level log and an example of user reward allocation information.

Next, the reward allocation determination process performed by the server control unit 11 will be described in detail with reference to a flowchart. FIG. 33 is a flowchart of the reward allocation determination process. FIG. 34 illustrates an example of the reward allocation condition information 143. FIG. 35 illustrates an example of the user achievement level log 154 (parts (a) and (b) of FIG. 35) and an example of the user reward allocation information 155 (part (c) of FIG. 35).

The server control unit 11 obtains the app user ID 38a, the app ID 38b, and the achievement level 38c from the reward allocation determination request 38 received from the SDK unit 24 (S171). The server control unit 11 refers to the user achievement level information 152 in the user information DB 15, and obtains the user achievement level information 152f corresponding to the combination of the app user ID 38a and the app ID 38b (S172).

Then, the server control unit 11 adds the current time to the app user ID 38a, the app ID 38b, and the achievement level 38c to generate user achievement level log information 154a, and adds the user achievement level log information 154a to the user achievement level log 154 (S173). Further, the server control unit 11 refers to the reward allocation condition information 143, and obtains reward allocation condition information 143a corresponding to the app ID 38b and the user's level (S174). As illustrated in FIG. 34, the reward allocation condition information 143a includes a reward ID143b.

If the reward allocation condition information 143a is satisfied as a result of totaling items in the user achievement level log 154 (YES in S175), the server control unit 11 generates the user reward allocation information 155 (S177). As illustrated in part (c) of FIG. 35, specific user reward allocation information 155a includes an app user ID corresponding to the app user ID 38a, an app ID corresponding to the app ID 38b, a reward ID corresponding to the reward ID143b, a gift ID, a screen display completion flag, and a reward allocation completion flag. The gift ID is set to any unique value (for example, an integer that monotonically increases from 1 and that is not redundantly used for other user reward allocation information). Both the screen display completion flag and the reward allocation completion flag are set to "FALSE" at this time.

Then, the server control unit 11 transmits the reward allocation information 39 in which the response 39b indicates the presence of reward allocation to the SDK unit 24 (S178).

If the reward allocation condition information 143a is not satisfied as a result of totaling items in the user achievement level log 154 in step S175 (NO in S175), the server control unit 11 transmits the reward allocation information 39 in which the response 39b indicates the absence of reward allocation to the SDK unit 24 (S176).

Figure 36:
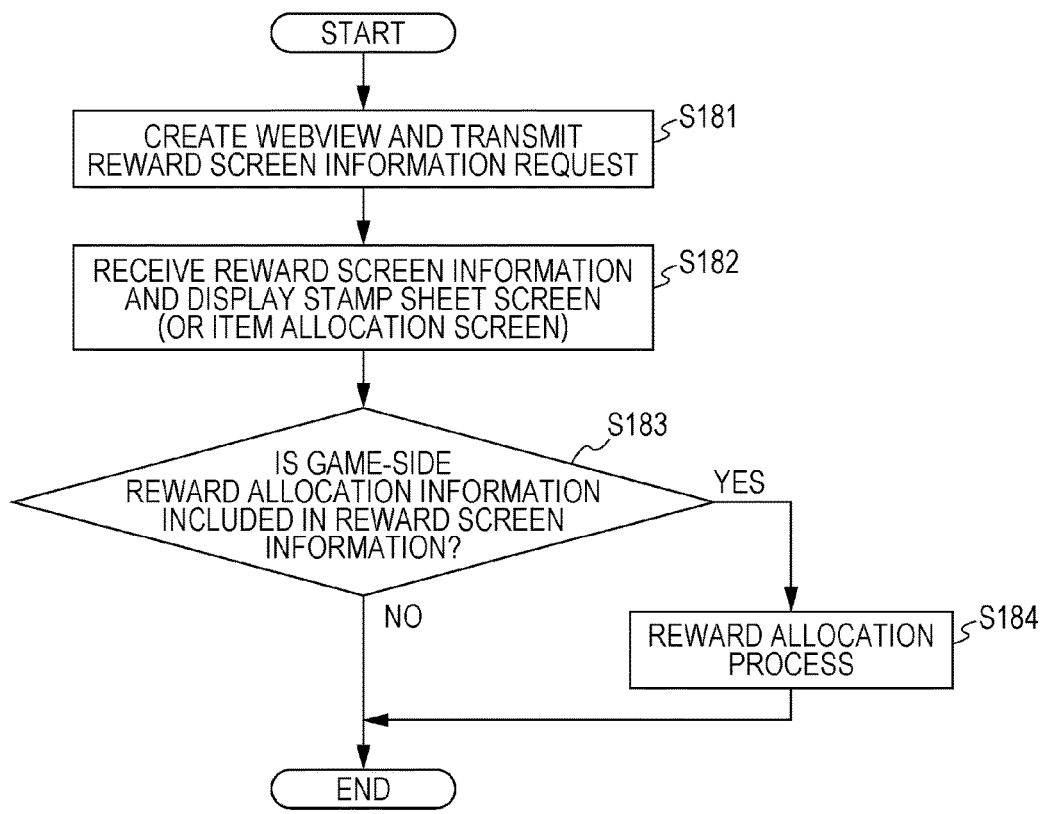
FIG. 36 is a flowchart of a reward screen display process.
Figure 37:
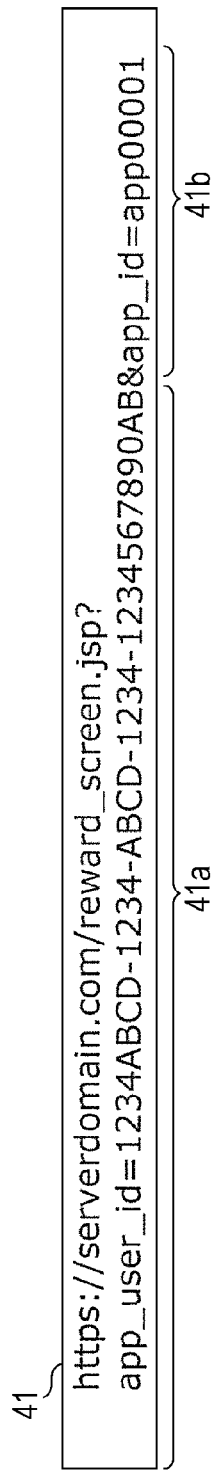
FIG. 37 illustrates an example of a reward screen information request.
Figure 38:
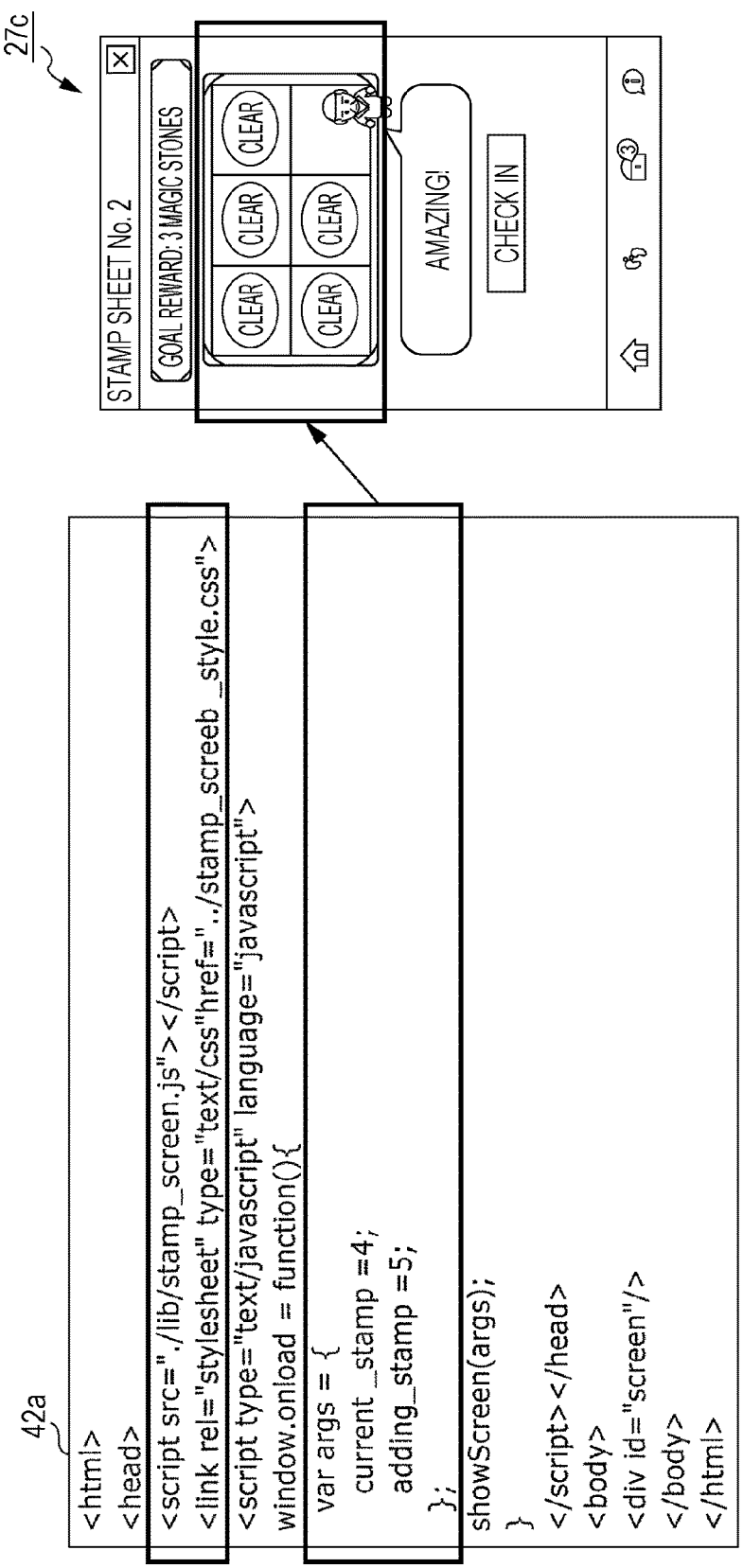
FIG. 38 illustrates an example of reward screen information in a case where a stamp sheet screen is displayed.
Figure 39:
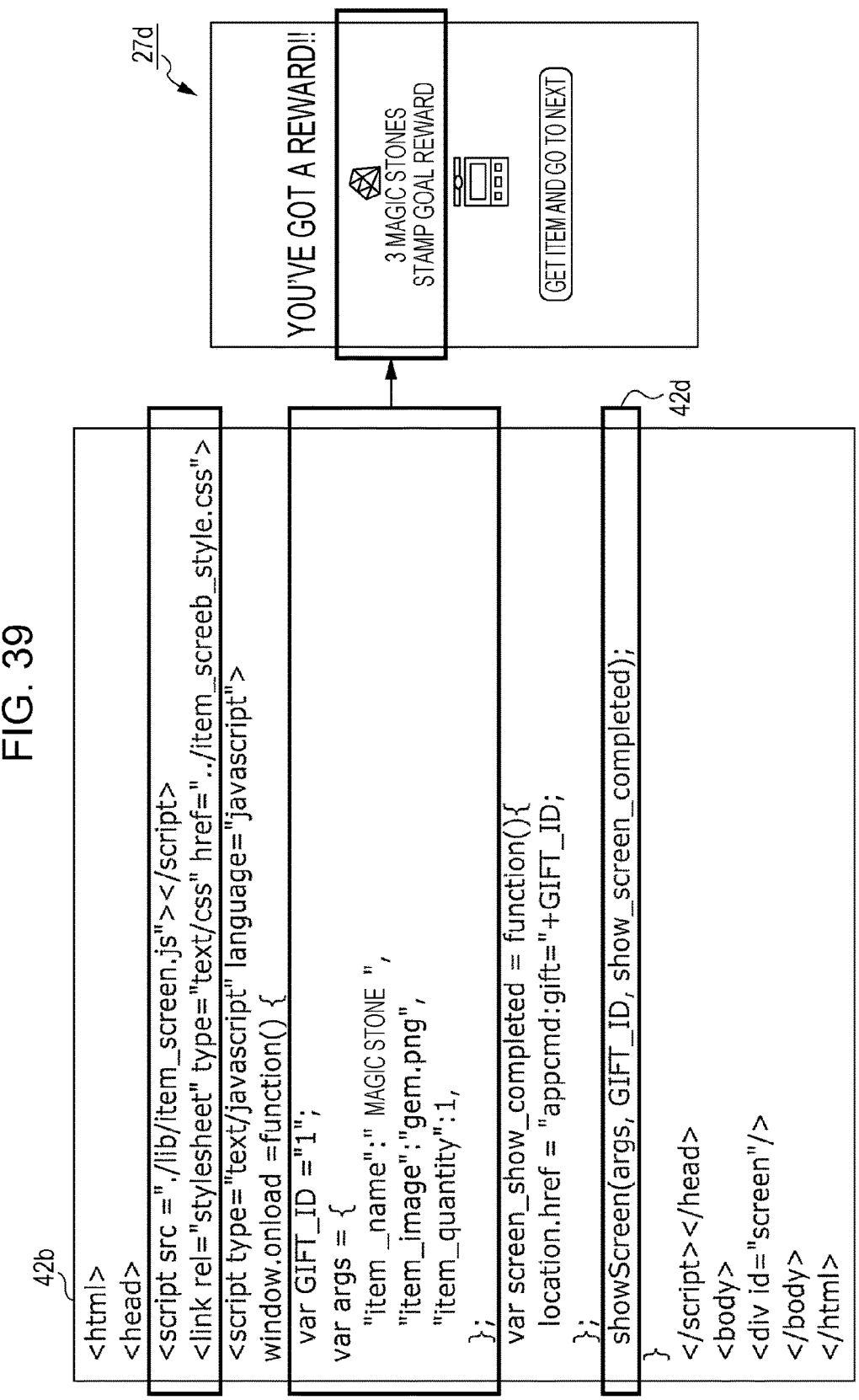
FIG. 39 illustrates an example of reward screen information in a case where an item allocation screen is displayed.

Next, the reward screen display process will be described in detail with reference to a flowchart. FIG. 36 is a flowchart of the reward screen display process. FIG. 37 illustrates an example of a reward screen information request. FIG. 38 illustrates an example of reward screen information in a case where the stamp sheet screen 27c is displayed. FIG. 39 illustrates an example of reward screen information in a case where an item allocation screen is displayed.

The SDK unit 24 creates a WebView, and transmits to the server 10 (the server control unit 11) a reward screen information request 41 that takes an app user ID 41a and an app ID 41b as arguments (S181).

Then, the SDK unit 24 receives reward screen information 42a (or reward screen information 42b) from the server control unit 11, and displays the stamp sheet screen 27c (or an item allocation screen 27d) on the WebView as a reward screen (S182).

For example, four stamps have been issued in the stamp sheet screen 27c and the fifth stamp is to be issued. In this case, the reward screen information 42a is written as in the thick-line frame in FIG. 38. Further, for example, the item allocation screen 27d is displayed on which the image of an item, the name of the item, and the number of items are specified. In this case, the reward screen information 42b is written as illustrated in FIG. 39. That is, the screen display process showScreen( ) which is written in JavaScript (registered trademark), dynamically shows a stamp allocation screen or a reward screen in accordance with the argument. The details of the process showScreen( ) are not described herein.

If the reward screen information 42a (or the reward screen information 42b) includes game-side reward allocation information 42d (YES in S183), a reward allocation process is performed (S184). The game-side reward allocation information 42d is specifically "location.href="appcmd:gift="+ GIFT_ID" shown in the 14th row of the reward screen information 42b. This is a typical method for invoking the reward allocation process for the SDK unit 24 from a process written in JavaScript (registered trademark).

While location.href=URL is used for the switching of the Web page currently displayed in the WebView to a uniform resource locator (URL), the WebView asks the SDK unit 24, which has generated the WebView, about the possibility of the switching. If the URL and appcmd: match at the beginning, the SDK unit 24 does not determine that the switching to a URL is performed but determines that a process request has been made to the SDK unit 24 from JavaScript (registered trademark). In the case of the reward screen information 42b, the reward allocation process is performed by passing "gift=1" as an argument.

The process shown in the 14th row of the reward screen information 42b is an internal process of the function screen_show_completed( ) The function screen_show_completed( ) is designated as an argument of showScreen( ) and showScreen( ) invokes screen_show_completed( ) after the display of a reward screen.

Figure 40:
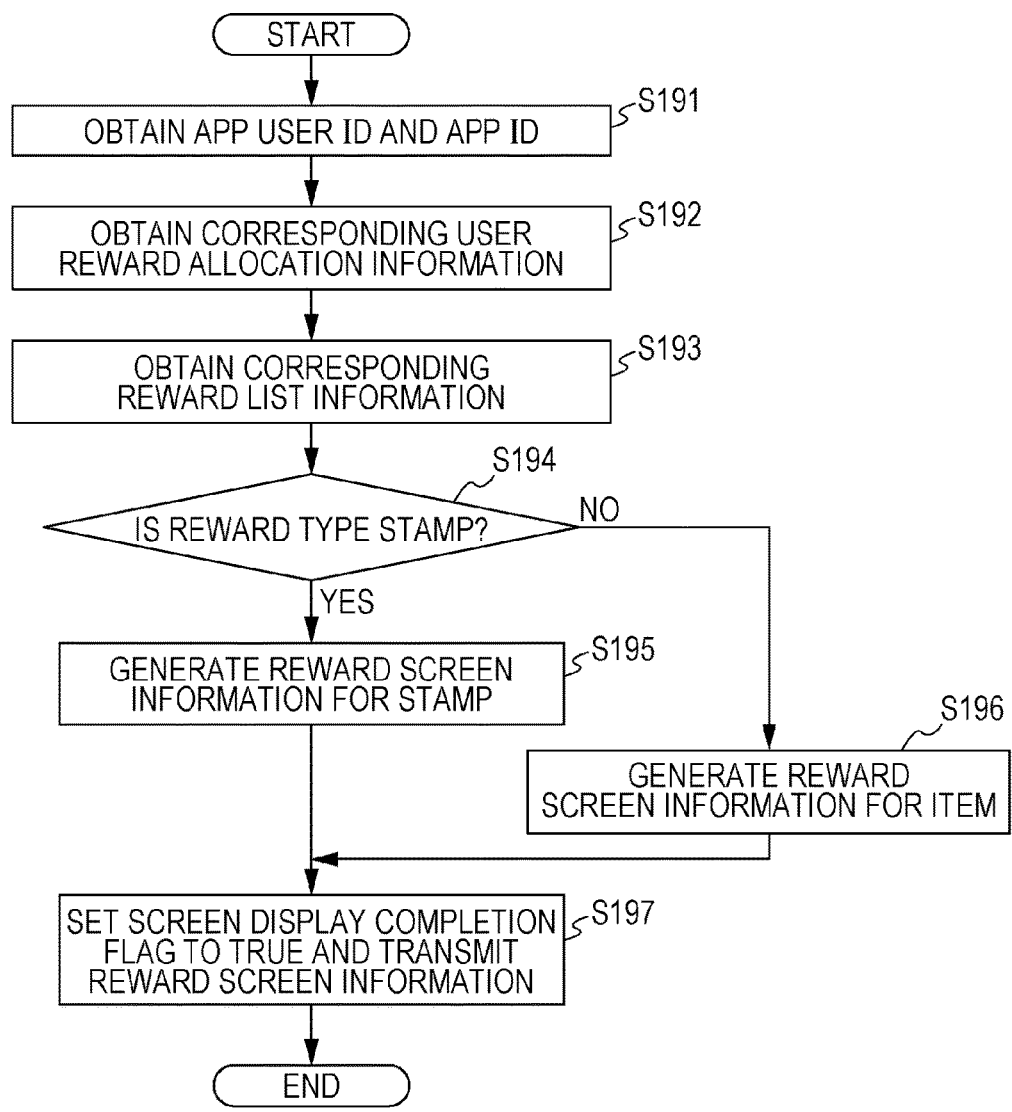
FIG. 40 is a flowchart of a method for generating reward screen information.

Next, the reward screen information generation method will be described with reference to a flowchart. FIG. 40 is a flowchart of the reward screen information generation method. FIG. 41 illustrates an example of the reward list information 144.

The server control unit 11 obtains the app user ID 41a and the app ID 41b from the reward screen information request 41 (S191). Then, the server control unit 11 obtains from the user reward allocation information 155 the user reward allocation information 155a corresponding to the obtained app user ID 41a and app ID 41b (S192). In this case, the search conditions include a condition that the screen display completion flag is "FALSE", that is, a condition that the search is limited to only the user reward allocation information 155a, which has not been displayed.

Then, the server control unit 11 obtains from the reward list information 144 reward list information 144a corresponding to the app ID 41b and the obtained user reward allocation information 155 (S193).

If the reward type in the reward list information 144a is stamp (YES in S194), the server control unit 11 generates the reward screen information 42a (S195). Specifically, the server control unit 11 generates the reward screen information 42a by using the stamp sheet 152b and the number of stamps 152c, which are included in the user achievement level information 152f, and also by using the number of stamps after reward allocation, which is obtained by adding "the number of rewards" in the reward list information 144a to the number of stamps 152c (or the number of goal stamps if the number of stamps obtained as a result of addition exceeds the number of goal stamps).

If the reward type in the reward list information 144a is item (NO in S194), the server control unit 11 generates the reward screen information 42b by using the gift ID included in the user reward allocation information 155a and also by using the reward image and reward name included in the reward list information 144a (S196).

Finally, the server control unit 11 sets the screen display completion flag in the user reward allocation information 155 to "TRUE" (ON), and transmits the reward screen information 42a (or the reward screen information 42b) to the SDK unit 24 (S197). The server control unit 11 may transmit the reward screen information 42a (or the reward screen information 42b) to the SDK unit 24 and then set the screen display completion flag in the user reward allocation information 155 to "TRUE".

Figure 42:
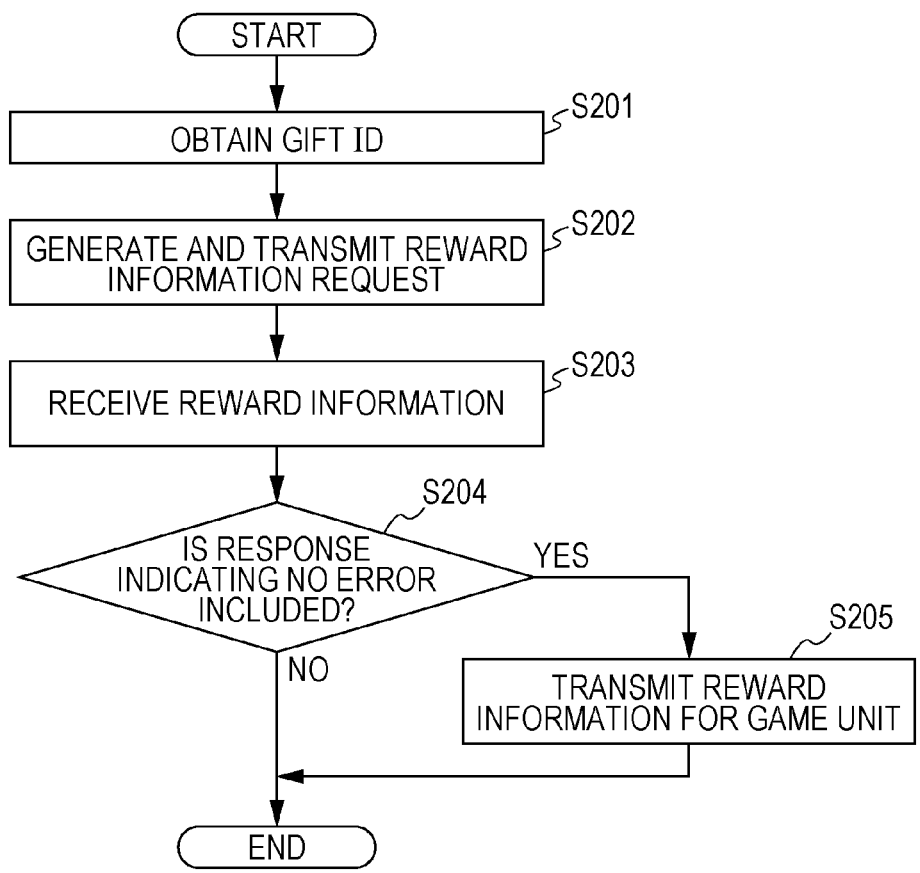
FIG. 42 is a flowchart of the reward allocation process.
Figure 43A:
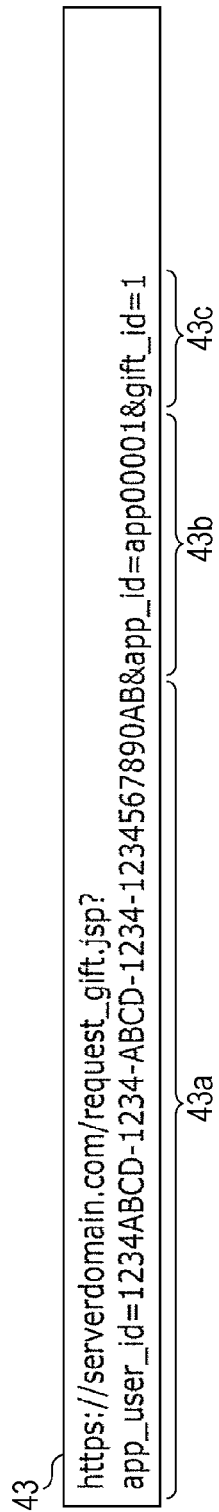
FIGS. 43A and 43B respectively illustrate an example of a reward information request and an example of reward information.
Figure 43B:
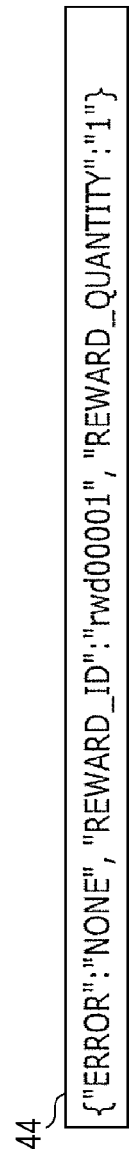

Next, the reward allocation process (S184 in FIG. 36) will be described in detail with reference to a flowchart. FIG. 42 is a flowchart of the reward allocation process. FIGS. 43A and 43B respectively illustrate an example of a reward information request and an example of reward information.

The SDK unit 24 obtains the gift ID from the reward screen information 42a (or the reward screen information 42b) transmitted from the server control unit 11 (S201). Then, the SDK unit 24 generates a reward information request 43 that takes an app user ID 43a, an app ID 43b, and a gift ID 43c as arguments, and transmits the reward information request 43 to the server control unit 11 (S202).

Then, the SDK unit 24 receives reward information 44 from the server control unit 11 (S203). If the reward information 44 includes a response indicating no error ("ERROR":"NONE") (YES in S204), the SDK unit 24 transmits reward information for the game unit 23 to the game unit 23 (S205). The reward information for the game unit 23 at least includes the reward ID and the number of rewards of the reward information 44.

Figure 44:
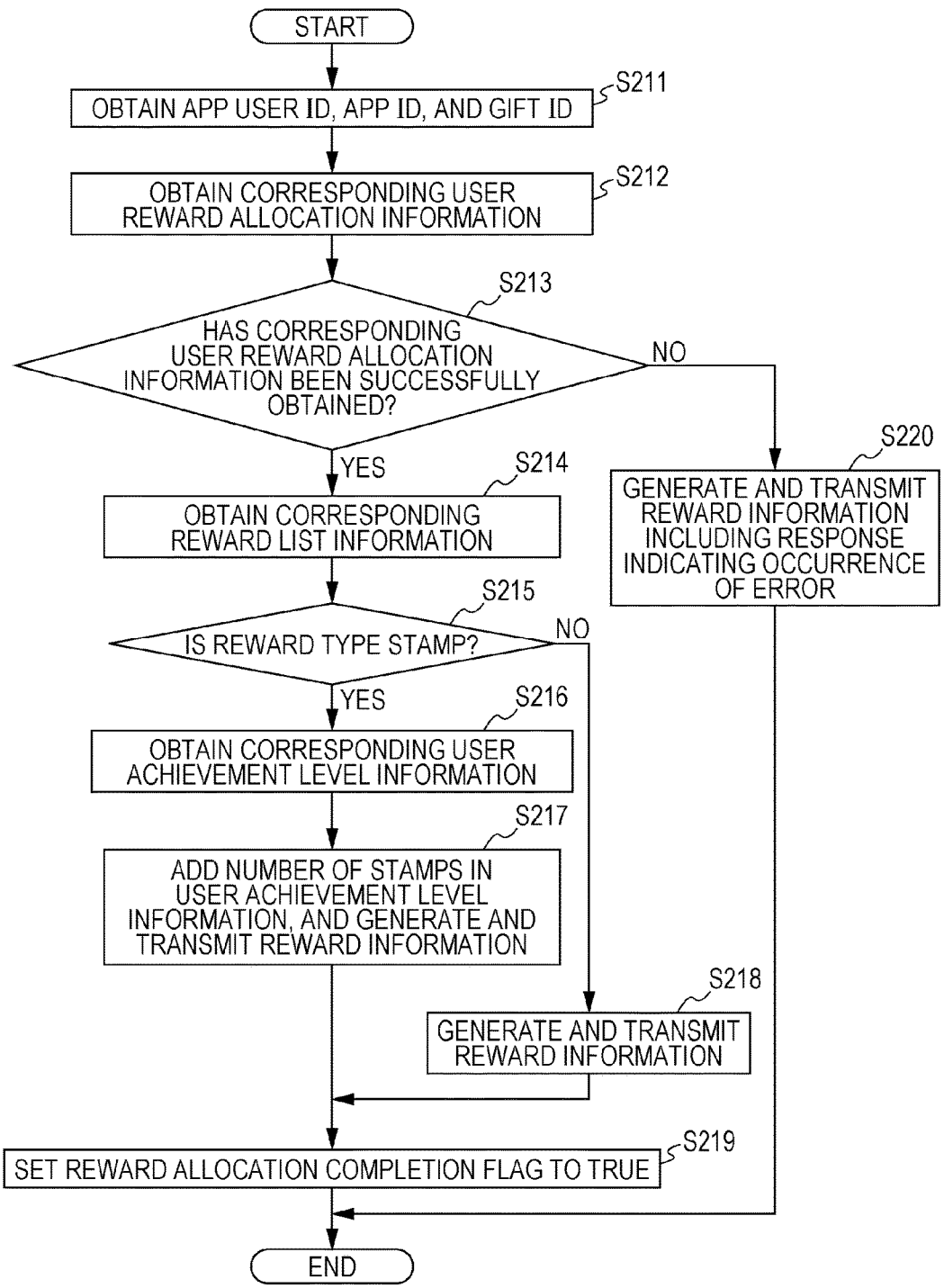
FIG. 44 is a flowchart of a reward information generation process.

Next, a reward information generation process will be described in detail with reference to a flowchart. FIG. 44 is a flowchart of the reward information generation process.

The server control unit 11 obtains the app user ID 43a, the app ID 43b, and the gift ID 43c from the reward information request 43 obtained from the SDK unit 24 (S211). Then, the server control unit 11 obtains from the user reward allocation information 155 the user reward allocation information 155a corresponding to the app user ID 43a, the app ID 43b, and the gift ID 43c (S212). In this case, the search conditions also include a condition that the reward allocation completion flag is "FALSE".

If the corresponding user reward allocation information 155a has been successfully obtained (YES in S213), the server control unit 11 obtains from the reward list information 144 the reward list information 144a corresponding to the app ID 43b and the reward ID included in the user reward allocation information 155a (S214).

If the reward type in the reward list information 144a is stamp (YES in S215), the server control unit 11 obtains from the user achievement level information 152 the user achievement level information 152f corresponding to the app user ID 43a and the app ID 43b (S216). Then, the server control unit 11 adds the number of rewards (the number of stamps) specified by the reward list information 144a to the number of stamps in the user achievement level information 152f, and further generates and transmits the reward information 44 (S217). Accordingly, as illustrated in part (c) of FIG. 13 described above, the number of stamps in the user achievement level information 152f is increased.

If the reward type in the reward list information 144a is item (NO in S215), the server control unit 11 generates and transmits the reward information 44 (S218). In this case, the reward information 44 includes the reward ID included in the user reward allocation information 155a and the number of rewards included in the reward list information 144a.

After step S217 or step S218, the server control unit 11 sets the reward allocation completion flag in the user reward allocation information 155a to "TRUE" (S219).

If the corresponding user reward allocation information 155a has not been successfully obtained in step S213 (NO in S213), the server control unit 11 generates and transmits reward information 44 which includes a response ("ERROR":"NO_REWARD_FOUND") indicating the occurrence of an error (S220).

Although not illustrated in the drawings, in the stamp adding process described above, if the number of stamps exceeds the number of goal stamps, the server control unit 11 obtains the reward ID of the current stamp sheet 152b from the stamp information 141, and generates user reward allocation information 155a. The procedure of the generation of user reward allocation information is similar to that of step S177, and is not described in detail herein. In addition, the server control unit 11 updates the user achievement level information 152f (that is, the number of stamp sheets is incremented by 1 and the number of stamps is reset).

Reward Allocation Based on Check-in

Figure 45:
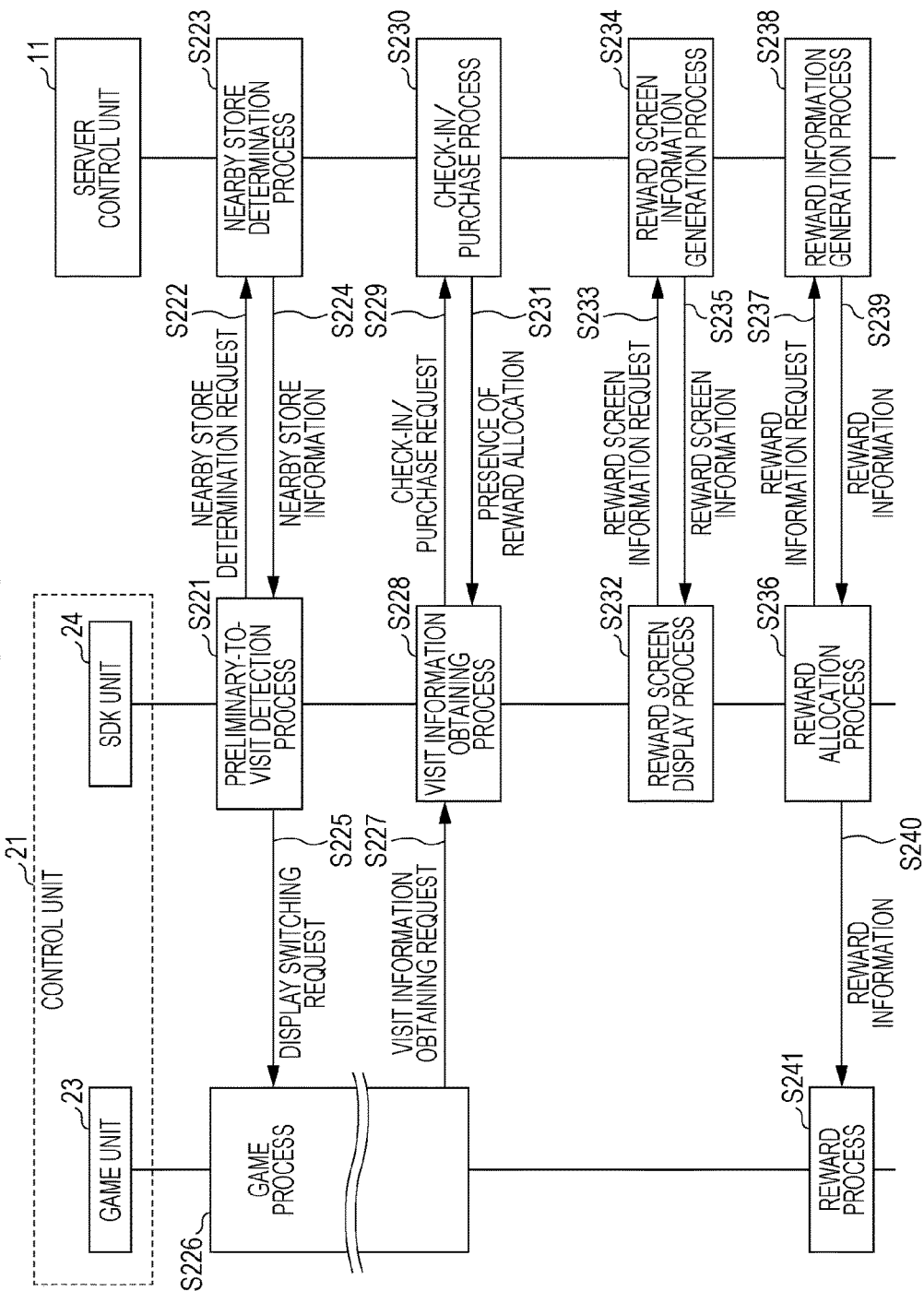

Next, reward allocation based on a check-in (or a purchase at the store 30), which is a characteristic process of the game reward allocation system 100, will be described. FIG. 45 is a sequence diagram of reward allocation based on a check-in. In the first embodiment, the term "check-in" refers to a process in which the mobile terminal 20 obtains identification information (in the first embodiment, information including a store ID or a buying ID) for allocating a stamp by, for example, reading a two-dimensional code provided in the store 30 by using an imaging unit of the mobile terminal 20.

First, the SDK unit 24 performs a behavior-preliminary-to-visit detection process (S221), and transmits a nearby store determination request to the server control unit 11 (S222). The server control unit 11 performs a nearby store determination process (S223), and transmits nearby store information to the SDK unit 24 (S224).

The SDK unit 24 transmits a display switching request to the game unit 23 in accordance with the result of the nearby store determination process (S225). At this time, the game unit 23 is in the game process (S226). Thus, after receiving the display switching request, the game unit 23 makes the game process proceed to continuously have the player enjoy the game experience. Then, the game unit 23 transmits a visit information obtaining request to the SDK unit 24 (S227). The game unit 23 may display a button indicating "the switching to a check-in screen" upon receipt of the display switching request, and transmit a visit information obtaining request to the SDK unit 24 at the timing when the user presses the button.

Then, the SDK unit 24 performs a visit information obtaining process (S228). Specifically, the SDK unit 24 transmits a check-in request (or a purchase request) to the server control unit 11 (S229), and the server control unit 11 performs a check-in process (or a purchase process) (S230). If reward allocation is necessary, the server control unit 11 transmits a response (reward allocation information) indicating the presence of reward allocation to the SDK unit 24 (S231). Subsequently, a series of processes from the reward screen display process (S232) through the reward process (S241) is performed. These processes are similar to those described above, and are not described in detail herein.

Figure 46:
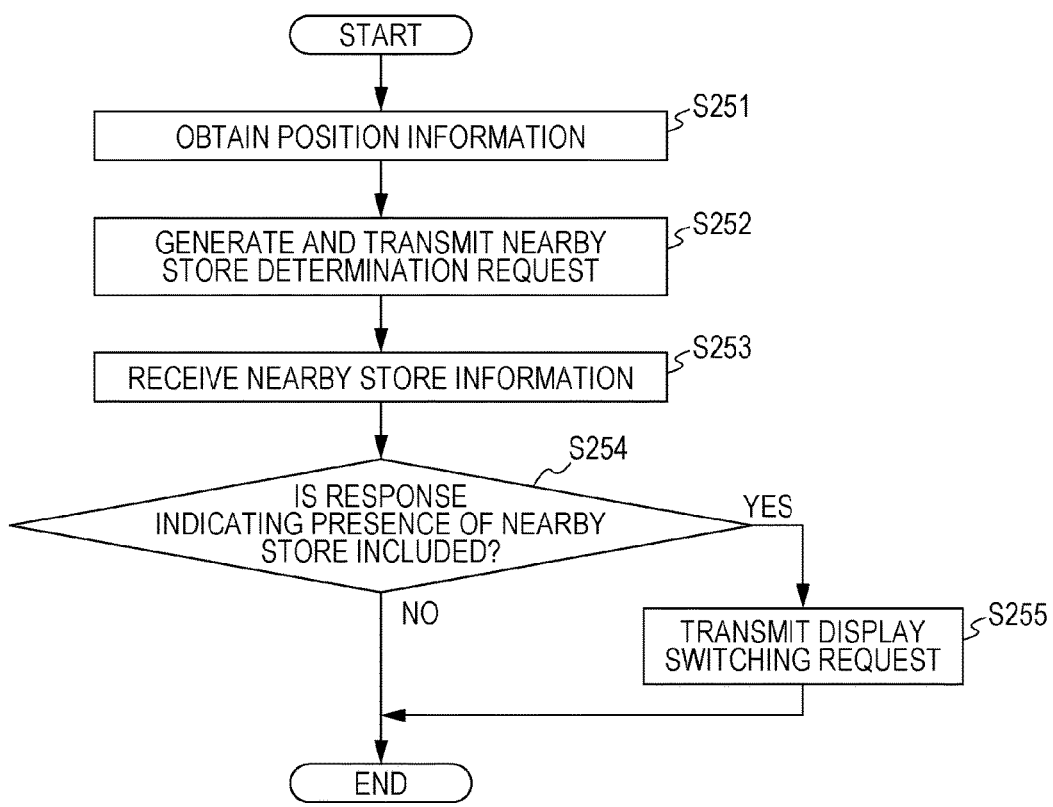
FIG. 46 is a flowchart of a behavior-preliminary-to-visit detection process.
Figure 47A:
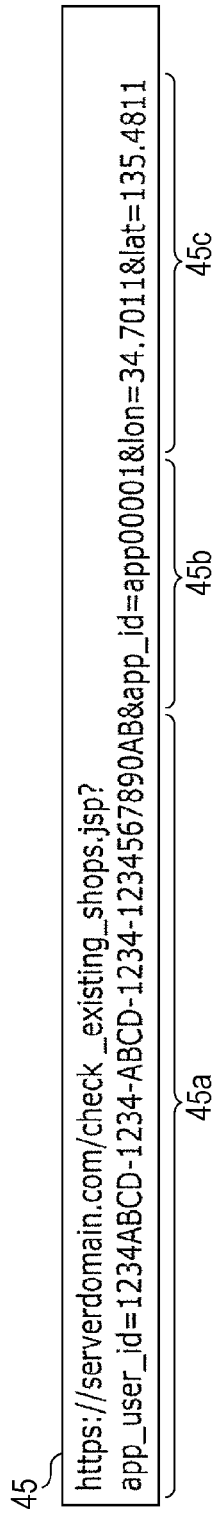
FIGS. 47A and 47B respectively illustrate an example of a nearby store determination request and an example of nearby store information.
Figure 47B:
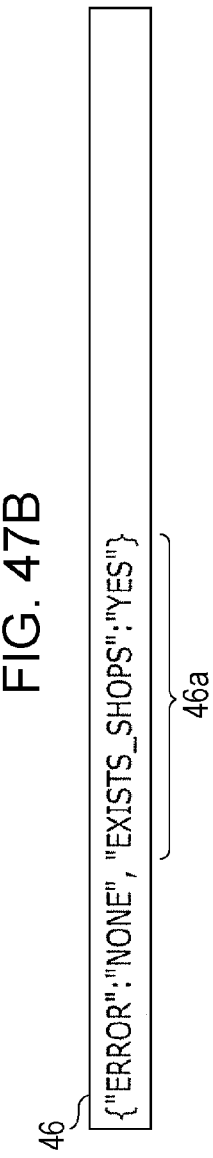

Next, the behavior-preliminary-to-visit detection process will be described in detail with reference to a flowchart. FIG. 46 is a flowchart of the behavior-preliminary-to-visit detection process. FIGS. 47A and 47B respectively illustrate an example of a nearby store determination request and an example of nearby store information.

First, the SDK unit 24 activates a position information obtaining unit included in the mobile terminal 20, and obtains position information (S251). Specifically, the position information obtaining unit is a global positioning system (GPS) module. The position information obtaining unit may be of any type that is capable of obtaining the position of the mobile terminal 20.

Then, the SDK unit 24 generates a nearby store determination request 45, and transmits the nearby store determination request 45 to the server control unit 11 (S252). As illustrated in FIG. 47A, the nearby store determination request 45 includes an app user ID 45a, an app ID 45b, and position information 45c.

Then, the SDK unit 24 receives nearby store information 46 from the server control unit 11 (S253). As illustrated in FIG. 47B, the nearby store information 46 includes a response 46a indicating whether or not there is a nearby store.

If there is a nearby store, that is, if the response 46a included in the nearby store information 46 indicates the presence of a nearby store (YES in S254), the SDK unit 24 transmits a display switching request to the game unit 23 (S255).

Figure 48:
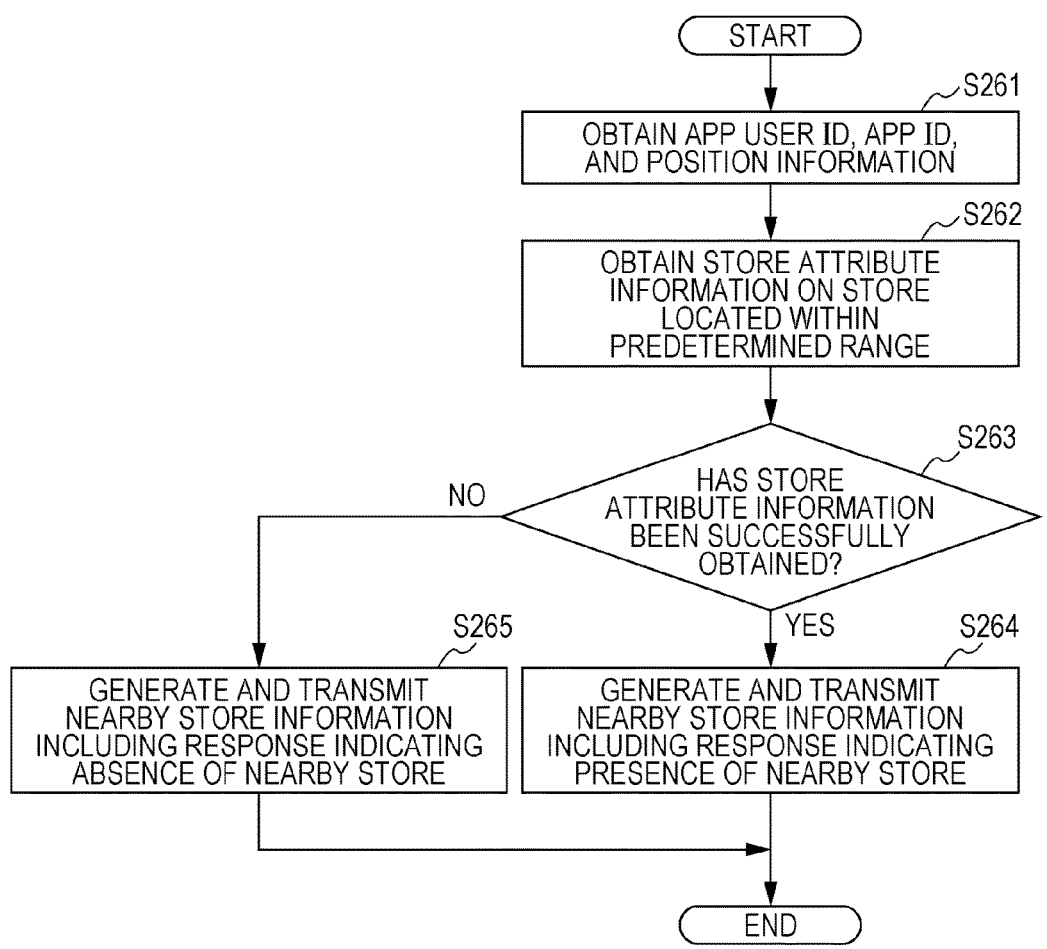
FIG. 48 is a flowchart of a nearby store determination process.

The nearby store determination process will now be described in detail with reference to a flowchart. FIG. 48 is a flowchart of the nearby store determination process.

The server control unit 11 obtains the app user ID 45a, the app ID 45b, and the position information 45c from the received nearby store determination request 45 (S261). Then, the server control unit 11 refers to the store attribute information 131, and obtains store attribute information on a store located within a predetermined range (S262). The server control unit 11 obtains store attribute information on a store located within a range of, for example, 500 m from the position indicated by the position information 45c.

If one or more pieces of store attribute information have been successfully obtained (YES in S263), the server control unit 11 generates nearby store information 46 in which the response 46a indicates the presence of a nearby store, and transmits the nearby store information 46 to the SDK unit 24 (S264). If no store attribute information has been successfully obtained (NO in S263), the server control unit 11 generates nearby store information 46 in which the response 46a indicates the absence of a nearby store, and transmits the nearby store information 46 to the SDK unit 24 (S265).

Figure 49:
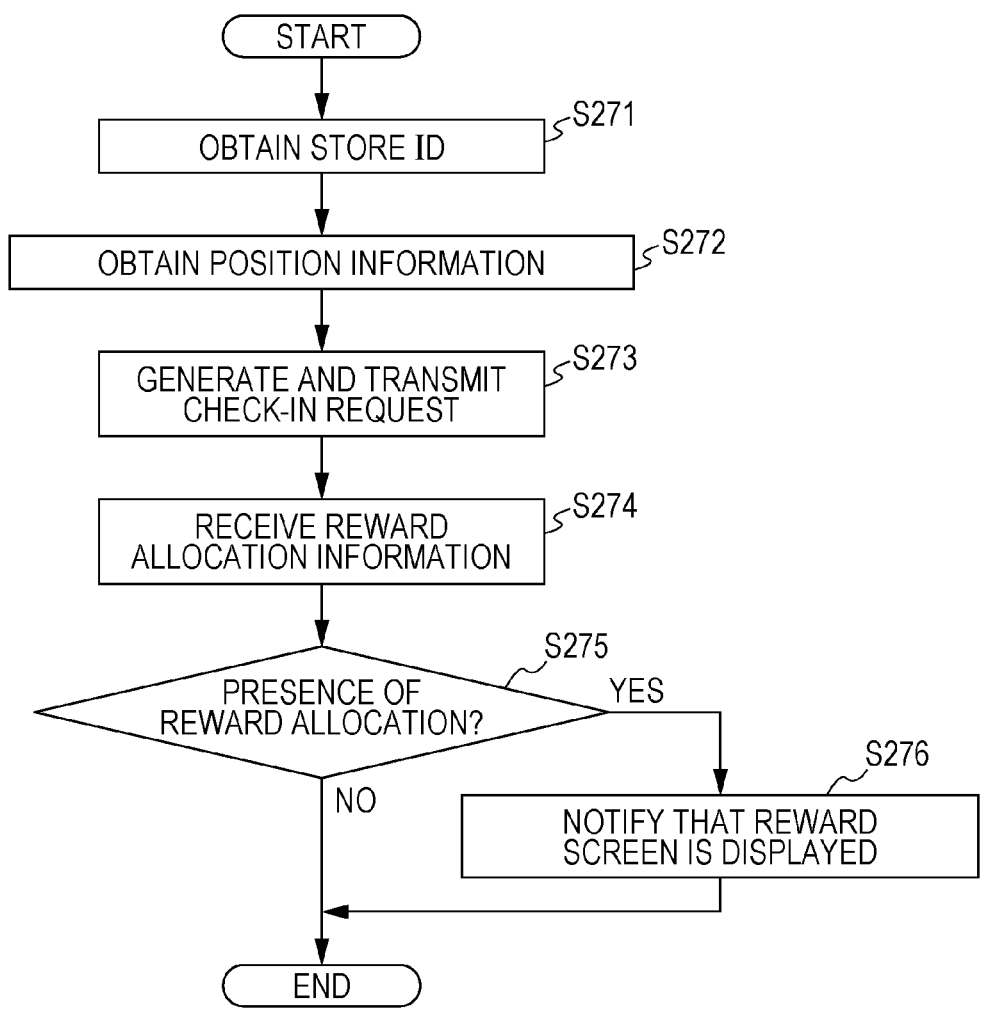
FIG. 49 is a flowchart of a visit information obtaining process.
Figure 50A:
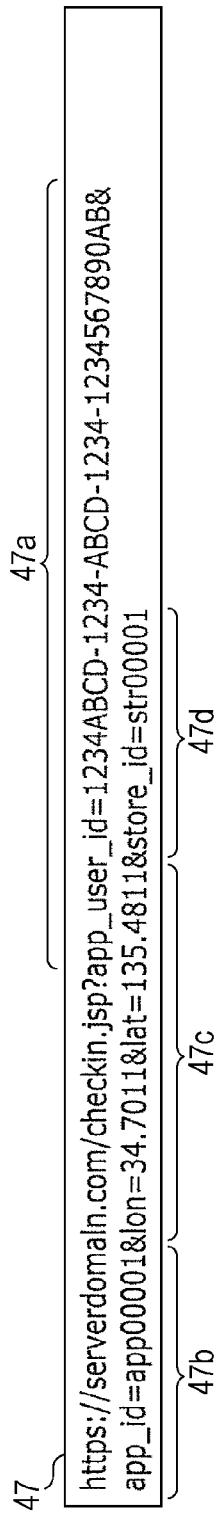
FIGS. 50A and 50B respectively illustrate an example of a check-in request and an example of reward allocation information.
Figure 50B:
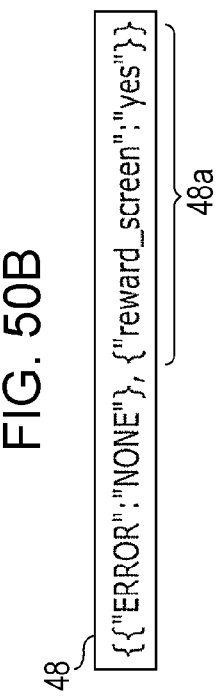
Figure 51:
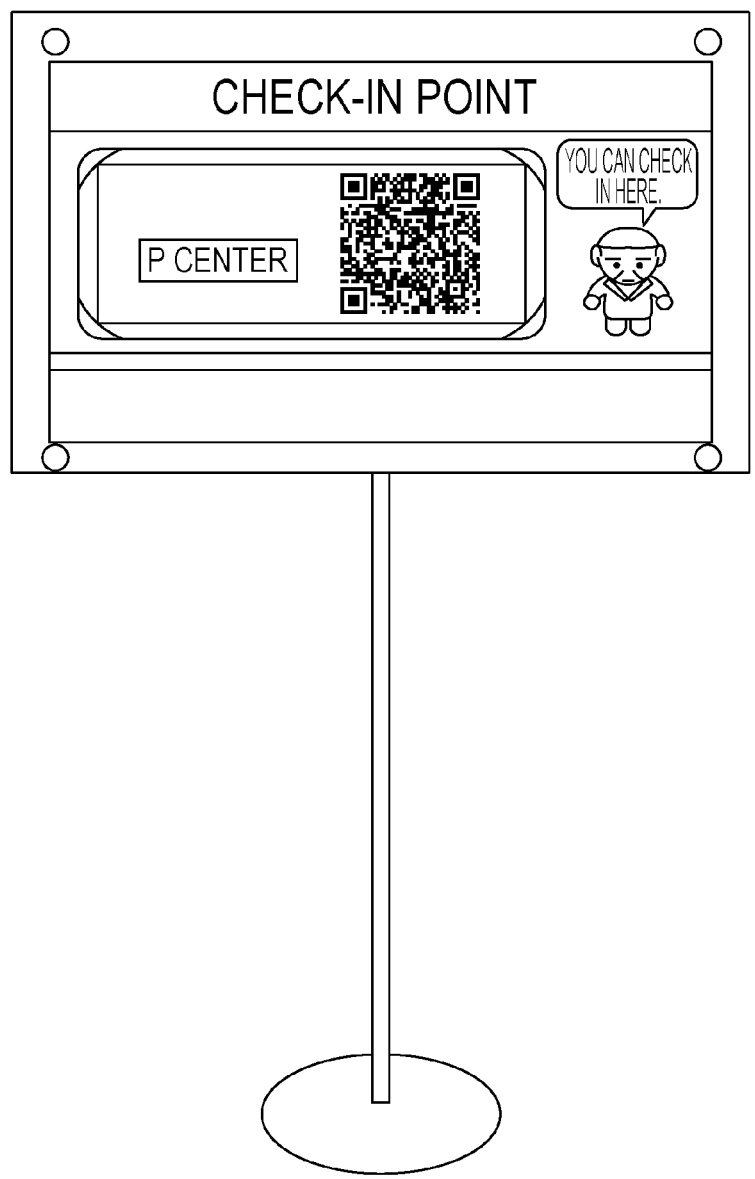

Next, the visit information obtaining process will be described in detail with reference to a flowchart. FIG. 49 is a flowchart of the visit information obtaining process. FIGS. 50A and 50B respectively illustrate an example of a check-in request and an example of reward allocation information. FIG. 51 illustrates an example of a two-dimensional code available for check-ins.

First, the SDK unit 24 activates the imaging unit included in the mobile terminal 20, and causes the imaging unit to read a two-dimensional code to obtain a store ID (identification information including a store ID) from the two-dimensional code (S271). As illustrated in FIG. 51, a panel on which a two-dimensional code is printed is installed in the store 30. The two-dimensional code includes a store ID as information. A user visits the store 30 and reads the two-dimensional code by using the mobile terminal 20. The two-dimensional code may be, for example, a QR code (registered trademark), or may be any other two-dimensional code. As an alternative to a two-dimensional code, other identification information such as a barcode may be used. The ID obtained in step S271 may be a purchase ID described below.

Then, the SDK unit 24 activates the position information obtaining unit included in the mobile terminal 20, and obtains position information (S272).

Then, the SDK unit 24 generates a check-in request 47, and transmits the check-in request 47 to the server control unit 11 (S273). As illustrated in FIG. 50A, the check-in request 47 includes an app user ID 47a, an app ID 47b, position information 47c, and a store or purchase ID 47d.

Then, the SDK unit 24 receives reward allocation information 48 from the server control unit 11 (S274). As illustrated in FIG. 50B, the reward allocation information 48 includes a response 48a indicating the presence or absence of reward allocation.

If reward allocation is present (YES in S275), the SDK unit 24 notifies the game unit 23 that a reward screen is displayed (S276). Then, the reward screen display process described above is performed. Note that the reward screen display process actually performed here is different from the reward screen display process described above in that, for example, a banner advertisement is displayed.

Figure 52:
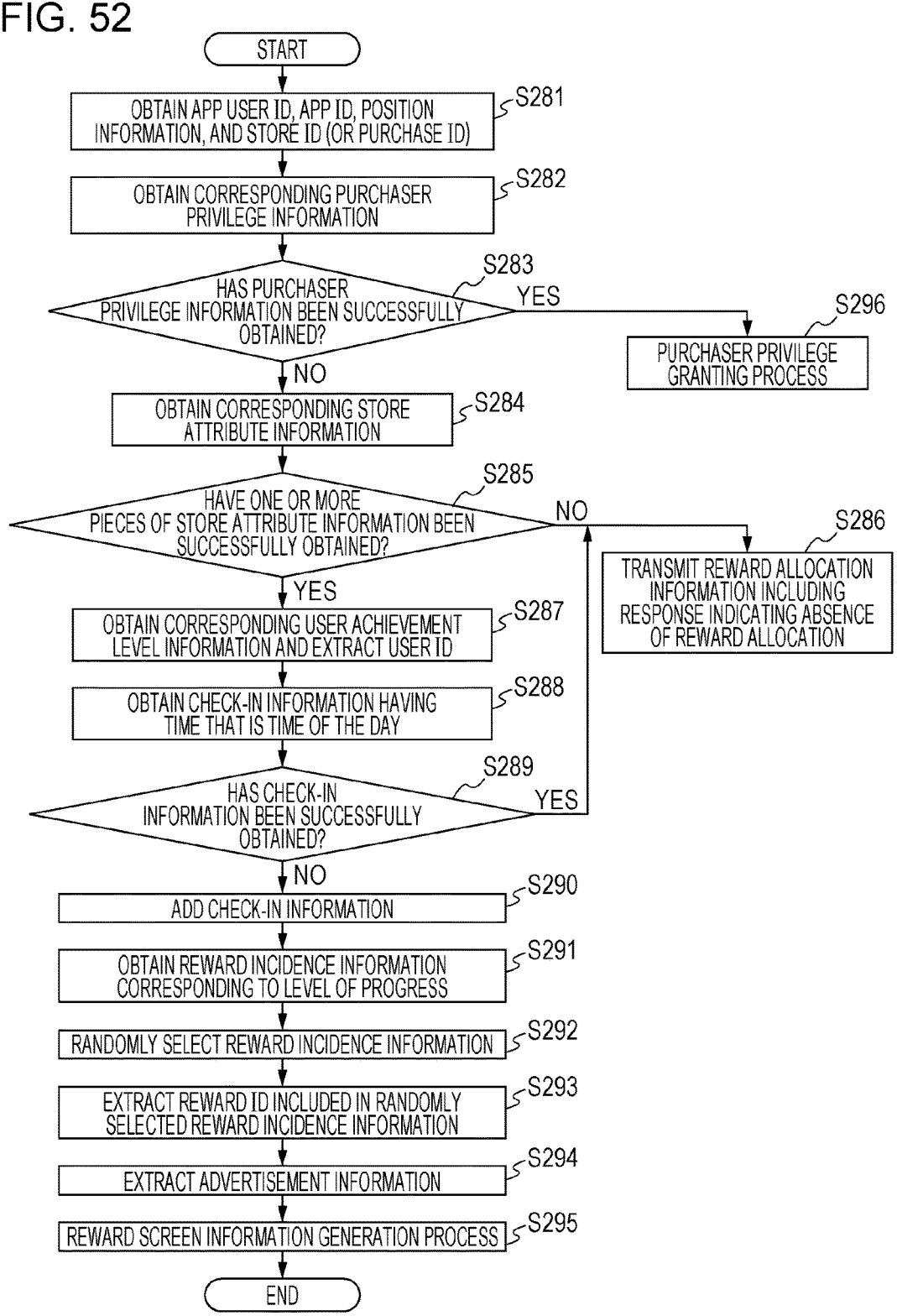
FIG. 52 is a flowchart of a check-in process (or purchase process)

Then, the check-in process (or purchase process) will be described in detail with reference to a flowchart. FIG. 52 is a flowchart of the check-in process (or purchase process). FIG. 53 illustrates an example of the reward incidence information 145. FIG. 54 illustrates an example of the advertisement information 132. FIG. 55 illustrates an example of the purchaser privilege information 133.

The server control unit 11 receives the check-in request 47 from the SDK unit 24, and obtains the app user ID 47a, the app ID 47b, the position information 47c, and the store or purchase ID 47d from the received check-in request 47 (S281).

In order to determine whether the store or purchase ID 47d is a store ID or a purchase ID, the server control unit 11 refers to the purchaser privilege information 133, and obtains purchaser privilege information 133a having a purchase ID that matches the store or purchase ID 47d (S282). If the purchaser privilege information 133a has not been successfully obtained (NO in S283), the server control unit 11 determines that the store or purchase ID 47d is a purchase ID. Then, the server control unit 11 refers to the store attribute information 131, and obtains store attribute information (by way of example, the store attribute information 131a) having a store ID that matches the store or purchase ID 47d (S284). If the purchaser privilege information 133a has been successfully obtained (YES in S283), a purchaser privilege granting process described below is performed (S296).

The store attribute information 131a to be obtained in step S284 is store attribute information 131a having a store ID 47d (hereinafter referred to as "the store ID 47d" instead of the store or purchase ID 47d) and position information (latitude and longitude) indicating a position close to the position indicated by the obtained position information 47c. If store attribute information 131a satisfying the conditions described above has not been successfully obtained (NO in S285), the server control unit 11 transmits reward allocation information which includes a response indicating the absence of reward allocation to the SDK unit 24 (S286).

The processes of steps S284 to S286 mean that it is not sufficient to read a two-dimensional code in order for a user to receive a reward allocated based on a check-in and that it is necessary to read a two-dimensional code at or near the store 30. The configuration described above may reliably draw users to the store 30.

If store attribute information 131a satisfying the conditions has been successfully obtained in step S285 (YES in S285), the server control unit 11 refers to the user achievement level information 152, and obtains the user achievement level information 152f having an app user ID and an app ID respectively corresponding to the app user ID 47a and the app ID 47b. The server control unit 11 extracts the user ID 152a from the obtained user achievement level information 152f (S287). Then, the server control unit 11 refers to the user check-in log 153, and obtains check-in information (by way of example, the check-in information 153a) having a user ID corresponding to the extracted user ID 152a and having a time that is a time of the day (S288).

If the check-in information 153a has been successfully obtained (YES in S289), the server control unit 11 transmits reward allocation information which includes a response indicating the absence of reward allocation to the SDK unit 24 (S286).

The processes of steps S287 to S289 are performed in order to allow a user to receive a reward allocated based on a check-in once a day. The period necessary to again receive a reward allocated based on a check-in is not limited to one day described above, and may be set as desired. In a case where a reward is allocated once regardless of the period, there is no need for the determination of a time in steps S287 to S289.

If the check-in information 153a has not been successfully obtained in step S289 (NO in S289), the server control unit 11 adds (or registers) to the user check-in log 153 check-in information including a user ID, a store ID, and an app ID respectively corresponding to the user ID 152a, the store ID 47d, and the app ID 47b, and also including the current time (S290).

Then, the server control unit 11 extracts the level 152d from the user achievement level information 152f obtained in step S287, and refers to the reward incidence information 145 to obtain one or more pieces of reward incidence information 145a having an app ID and a level respectively corresponding to the app ID 47b and the level 152d (S291).

The level 152d is a level of progress indicating the state of progress of the game. The level 152d is used to change the content of a reward in accordance with the level of progress.

For example, the number of stamps or items to be allocated as rewards is set to increase in accordance with an increase in the level of progress in the game. In games, the difficulty level generally increases with the level of progress in the games. In order to maintain game balance, the settings described above are made.

Then, the server control unit 11 randomly selects one of the obtained one or more pieces of reward incidence information 145a (S292). The random selection is based on the reward incidence included in the reward incidence information 145. Further, the server control unit 11 extracts the reward ID included in the randomly selected reward incidence information 145 (S293). In addition, the server control unit 11 extracts advertisement information 132a associated with the store ID 47d from the advertisement information 132 (S294). Since the advertisement information 132 is information used in combination with the store attribute information 131, the advertisement information 132 includes no store ID, for example.

Finally, the server control unit 11 performs the reward screen information generation process (in steps S193 to S197 in FIG. 40) in accordance with the reward ID extracted in step S293 (S295).

When the advertisement information 132a has been successfully extracted in step S294, a reward screen information having added thereto a banner image (banner information) included in the extracted advertisement information 132a is generated. FIG. 56 illustrates an example of reward screen information 42c having added thereto a banner image. The reward screen information 42c illustrated in FIG. 56 is used for the display of the item allocation screen 27d. The same applies to reward screen information used for the display of the stamp sheet screen 27c.

According to the reward screen information 42c illustrated in FIG. 56, the item allocation screen 27d including a banner image is displayed on the display unit of the mobile terminal 20. As in the item allocation screen 27d, the banner image may have an indication that, for example, a purchase at a store where a two-dimensional code for check-ins is provided enables the purchaser to have an additional stamp allocated. Such a banner image may encourage the user to purchase goods in the store 30.

Figure 57A:
FIGS. 57A and 57B illustrate examples of tickets with printed two-dimensional codes to be used for a purchaser privilege granting process.
Figure 57B:

Next, the purchaser privilege granting process will be described. FIGS. 57A and 57B illustrate examples of tickets with printed two-dimensional codes to be used for the purchaser privilege granting process.

The tickets illustrated in FIGS. 57A and 57B may be each a sheet of paper having approximately a business card size and containing a two-dimensional code including a purchase ID. The tickets are distributed when goods are purchased in the store 30. In the first embodiment, different tickets are distributed in accordance with the amount of purchased goods. For example, the ticket illustrated in FIG. 57A is distributed to a user who has purchased goods amounting to less than a predetermined amount (here, 1000 yen), and the ticket illustrated in FIG. 57B is distributed to a user who has purchased goods amounting to the predetermined amount or more. That is, different types of tickets are distributed in accordance with the purchase amount of the user. The tickets illustrated in FIGS. 57A and 57B are distributed in exchange for the purchase of goods. Unlike the two-dimensional code for check-ins (FIG. 51) which is provided in the store 30, the tickets illustrated in FIGS. 57A and 57B are not necessarily read at or near the store 30.

In the following, the purchaser privilege granting process (the process when YES is obtained in step S283 in FIG. 52) will be described in detail with reference to a flowchart. FIG. 58 is a flowchart of the purchaser privilege granting process. FIG. 59 illustrates an example of the purchaser privilege reward information 146.

If a used flag in the purchaser privilege information 133a obtained in step S283 in FIG. 52 is "TRUE" (YES in S301), the server control unit 11 transmits reward allocation information which includes a response indicating the absence of reward allocation to the SDK unit 24 (S302).

If the used flag in the purchaser privilege information 133a obtained in step S283 in FIG. 52 is "FALSE" (NO in S301), the server control unit 11 refers to the purchaser privilege reward information 146, and obtains purchaser privilege reward information 146a (S303). The purchaser privilege reward information 146a to be obtained here is purchaser privilege reward information having a purchaser privilege ID that matches the purchaser privilege ID included in the purchaser privilege information 133a.

Then, the used flag in the purchaser privilege information 133a is updated to "TRUE" (S304). Then, the server control unit 11 performs the reward screen information generation process (in steps S193 to S197 in FIG. 40) in accordance with the reward ID included in the obtained purchaser privilege reward information 146a (S305).

As described above, the game reward allocation system 100 according to the first embodiment allows a user to obtain a reward similar to a reward obtained during the progress of the game on the basis of a check-in.

In the game reward allocation system 100, a gaming technique in which an accumulation of small achievements is expressed with effective visual effects such as printed stamps, and makes the user feel like a major achievement and gain rewards can be applied to the actual activity of the user (the visit to a store). This technique is called gamification and such a technique has been demonstrated to be effective. Gamification is a methodology of applying game mechanics to activities in other fields, such as health activities and educational activities, to improve engagement in such activities.

In order to implement the game reward allocation system 100, it may be sufficient that the SDK described above (the SDK unit 24) be incorporated in an existing game application (the game unit 23). In other words, it is easy to add the reward allocation function based on a check-in described above to an existing game application. That is, the game reward allocation system 100 can have high versatility.

Conclusion

An information providing method using the game reward allocation system 100 according to the first embodiment has been described. The game reward allocation system 100 is connected to the mobile terminal 20 via the network 40. The mobile terminal 20 has installed thereon an application for a game of a type in which game rewards are earned in accordance with the level of progress in the game, and also has a display.

The game reward allocation system 100 is an example of an information management system, and the mobile terminal 20 is an example of an information device. Further, a game reward is specifically a stamp or an item obtainable in a game.

In the information providing method according to the first embodiment, the mobile terminal 20 obtains identification information (information included in a two-dimensional code) which includes a store ID indicating a given store, and, from the mobile terminal 20, an app ID indicating a game application that is running on the mobile terminal 20 and a user ID (app user ID) indicating a user of the game application, as well as the store ID, are received via the network 40.

In the information providing method according to the first embodiment, furthermore, a first database (the user information DB 15) and a second database (the game app information DB 14) are referred to in accordance with the app ID and the app user ID, and first instruction data (reward screen information) indicating that a first game reward corresponding to the level of progress in the game be allocated is transmitted to the mobile terminal 20 via the network 40.

In the user achievement level information 152 in the user information DB 15, the user's level of progress in the game is managed in association with the app ID and the user ID. In the reward incidence information 145 in the game app information DB 14, a first game reward ID (reward ID) indicating a first game reward allocated in accordance with the app ID and the level of progress is managed.

In the information providing method, furthermore, specifically, a third database (the store attribute information 131 in the store information DB 13) that manages registered stores which have been registered is referred to, and it is determined whether or not the registered stores include the store indicated by the received store ID (S285 in FIG. 52). If the registered stores include the store indicated by the received store ID, the first instruction data is transmitted to the mobile terminal 20 via the network 40 (S295 in FIG. 52).

The identification information described above includes first position information indicating the position of the given store (a store ID included in the identification information is associated with the position information (latitude and longitude) in the store attribute information 131).

In the information providing method, accordingly, second position information indicating the position of the mobile terminal 20 is obtained from the mobile terminal 20 by using a GPS system (S281 in FIG. 52). If the position indicated by the second position information is within a predetermined distance range from the position indicated by the first position information (YES in S285 in FIG. 52), the first instruction data is transmitted to the mobile terminal 20 via the network 40 (S295 in FIG. 52).

In the information providing method, furthermore, state information (with the reward allocation completion flag "TRUE") indicating that the first game reward has been allocated to the user who is indicated by the user ID and who has started the application indicated by the app ID after the first instruction data has been transmitted to the mobile terminal 20 is managed.

The first instruction data includes advertisement information (the banner image illustrated in FIG. 56) indicating that a purchase at the store indicated by the store ID allows the purchaser to be further allocated an additional game reward. In the information providing method, accordingly, the mobile terminal 20 reads a buying ID (the purchase ID included in the two-dimensional code illustrated in FIG. 57A or 57B) indicating that goods or services have been purchased at the store 30, and, from the mobile terminal 20, an app ID as well as the buying ID is received via the network 40 (S281 in FIG. 52).

Then, a third database (the purchaser privilege reward information 146 in the game app information DB 14) that manages an app ID and a second game reward ID (reward ID) indicating a second game reward allocated in association with the app ID is referred to in accordance with the app ID (S303 in FIG. 58), and second instruction data (reward screen information) indicating that the second game reward be additionally allocated is transmitted to the mobile terminal 20 via the network 40 (S305 in FIG. 58).

The third database manages, in association with an app ID and a second game reward ID, a privilege ID (purchaser privilege ID) indicating in which price range the user has purchased goods or services.

In the information providing method, accordingly, the mobile terminal 20 reads a buying ID and a privilege ID, and, from the mobile terminal 20, an app ID as well as the buying ID and the privilege ID is received via the network 40 (S281 in FIG. 52). Then, the third database is referred to in accordance with the privilege ID and the app ID (S303 in FIG. 58), and second instruction data indicating that the second game reward be additionally allocated is transmitted to the mobile terminal 20 via the network 40.

The information providing method described above may give incentives to a player of a game to visit the actual store 30.

Modifications to First Embodiment

The plurality of databases (the store information DB 13, the game app information DB 14, and the user information DB 15) described above in the first embodiment may be formed into a single database. In addition, the content of the information stored in the databases described above in the first embodiment and the distribution of information to the databases are examples, and are not limited to any specific form. Furthermore, while, in the first embodiment, the server 10 includes the plurality of databases, the plurality of databases may be located outside the server 10.

In the first embodiment, an advertisement (a banner advertisement) indicating that an event for reward allocation based on a check-in takes place may be displayed on the game screen 27b, the stamp sheet screen 27c, or the item allocation screen 27d. The advertisement may be displayed when the user is located within a predetermined range from the position of the store 30 on the basis of the position information obtained by the position information obtaining unit included in the mobile terminal 20. This advertisement may further attract customers to the store 30. The display of such an advertisement is feasible by using a process similar to the determination process described above in the first embodiment as to whether or not the user of the mobile terminal 20 (or the mobile terminal 20) is located close to the store 30.

Second Embodiment

Underlying Knowledge Forming Basis of Information Providing Method According to Second Embodiment In the first embodiment, the imaging unit of the mobile terminal 20 reads a two-dimensional code at the time of a check-in. Alternatively, a check-in may be performed through any operation other than reading a two-dimensional code if the mobile terminal 20 is successful in obtaining a store ID. For example, a check-in may be performed by distributing a store ID (in a second embodiment, a device ID of a beacon device described below) within the store 30 via wireless communication.

In a conceivable configuration, for example, a beacon device may be installed in the store 30 and the mobile terminal 20 may receive a beacon signal that is a radio signal transmitted from the beacon device to perform a check-in.

This configuration will cause a difficulty in giving incentives to a player of a game to visit the actual store 30 if the beacon signal transmitted from the beacon device is tapped by an eavesdropper or the beacon device is stolen. Accordingly, it is desirable to address unauthorized use of the beacon device.

In the second embodiment, an information processing method (game reward allocation system) configured to address unauthorized use of a beacon device will be described. The following description will focus on the differences between the second embodiment and the first embodiment, and substantially identical portions may not be described.

Configuration

Figure 60:
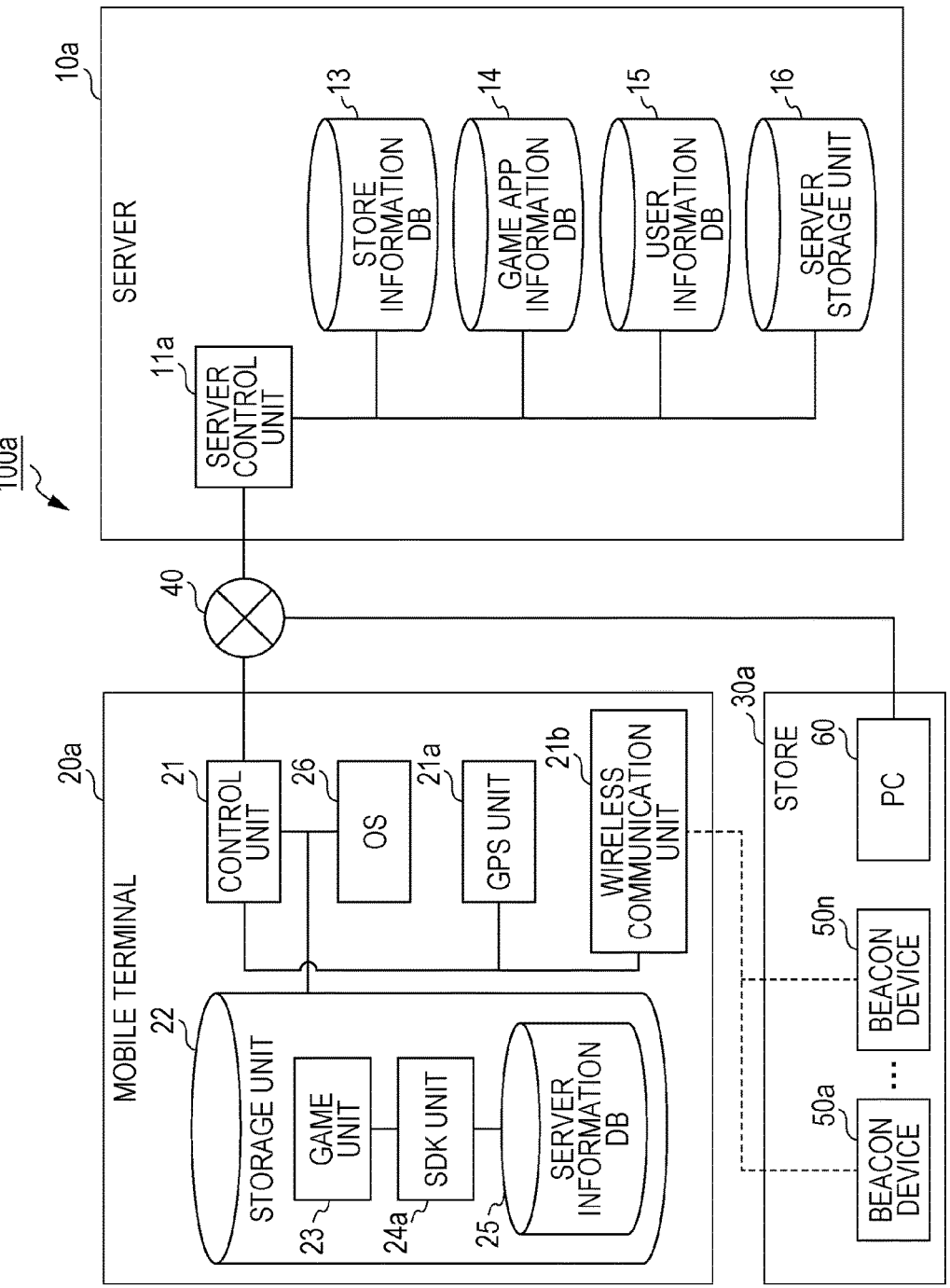
FIG. 60 illustrates a functional configuration of a game reward allocation system according to a second embodiment.

First, a configuration of a game reward allocation system according to the second embodiment will be described. FIG. 60 illustrates a functional configuration of a game reward allocation system 100a according to the second embodiment.

As illustrated in FIG. 60, the game reward allocation system 100a according to the second embodiment includes a server 10a (an example of a server device) and a mobile terminal 20a (an example of a portable terminal). The server 10a and the mobile terminal 20a are connected to each other via a network 40 (for example, the Internet). FIG. 60 also illustrates a store 30a that is a target for collaboration with a game executable on the mobile terminal 20a.

The difference between the mobile terminal 20a and the mobile terminal 20 is the process of an SDK unit 24a. Another difference is that the mobile terminal 20a further includes a GPS unit 21a (corresponding to the position information obtaining unit in the first embodiment) (not illustrated in the first embodiment) and a wireless communication unit 21b.

The GPS unit 21a is a GPS module that obtains current position information indicating the current position of the mobile terminal 20a. The current position information is obtained by controlling the GPS unit 21a using the control unit 21.

The wireless communication unit 21b is a wireless communication module that performs wireless communication between the mobile terminal 20a and a plurality of beacon devices 50a to 50n installed in the store 30a. The transmission and reception of signals between the mobile terminal 20a and the plurality of beacon devices 50a to 50n are performed by controlling the wireless communication unit 21b using the control unit 21. The communication standard of the wireless communication performed by the wireless communication unit 21b is, for example, Bluetooth (registered trademark). Alternatively, any other communication standard such as wireless local area network (LAN) may be used.

The difference between the server 10 and the server 10a is the process of a server control unit 11a. Another difference is that the server 10a further includes a server storage unit 16. In the second embodiment, furthermore, unlike the first embodiment, the plurality of beacon devices 50a to 50n and a PC 60 are installed in the store 30a.

Figure 61:
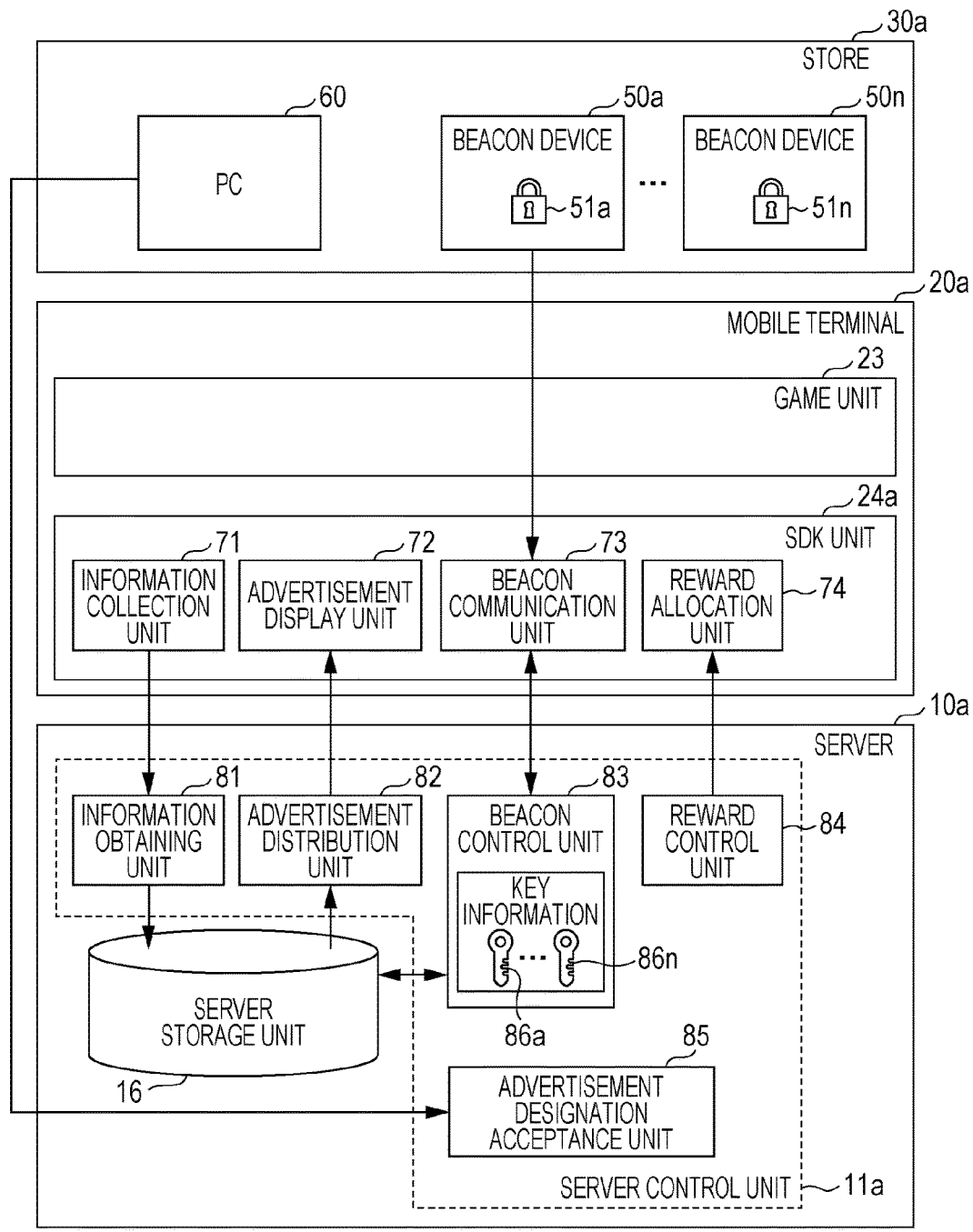
FIG. 61 is a block diagram illustrating a detailed functional configuration of the game reward allocation system according to the second embodiment.

In the following, a detailed functional configuration of the game reward allocation system 100a will be described. FIG. 61 is a block diagram illustrating the detailed functional configuration of the game reward allocation system 100a. In FIG. 61, constituent elements mainly described in the following second embodiment are illustrated, and some of the constituent elements illustrated in FIG. 60 are not illustrated.

In the following second embodiment, as in the first embodiment, a process performed by the control unit 21 executing a game app is expressed simply as a verb and a corresponding subject "the game unit 23" or "the SDK unit 24a". In addition, a process performed by a constituent element of the SDK unit 24a is also expressed with the constituent element as the subject.

Furthermore, it is assumed that communication between the mobile terminal 20a (the SDK unit 24a) and the server 10a (the server control unit 11a) (for example, communication between a beacon communication unit 73 and a beacon control unit 83) is performed via the control unit 21 (communication unit) and the network 40.

It is also assumed that communication between the mobile terminal 20a (the SDK unit 24a) and the plurality of beacon devices 50a to 50n is performed via the wireless communication unit 21b. That is, communication between the mobile terminal 20a (the SDK unit 24a) and the plurality of beacon devices 50a to 50n is performed by using the wireless communication function of the mobile terminal 20a.

First, the SDK unit 24a of the mobile terminal 20a will be described in detail. The SDK unit 24a includes an information collection unit 71, an advertisement display unit 72, the beacon communication unit 73, and a reward allocation unit 74.

The information collection unit 71 obtains information on a user, such as the gender, age, and address (residence) of the user. The information collection unit 71 transmits the information on the user to an information obtaining unit 81 of the server 10a. The information on the user is obtained by the information collection unit 71 through, for example, an input acceptance screen displayed on a display unit of the mobile terminal 20a, or may be stored in advance in the mobile terminal 20a.

The advertisement display unit 72 performs a process similar to the store collaboration information obtaining process illustrated in FIG. 14, and a process similar to the store collaboration image rendering process illustrated in FIG. 25.

The beacon communication unit 73 receives a beacon signal from a beacon device (for example, the beacon device 50a) installed in the store 30a, and transmits a device ID included in the received beacon signal to the beacon control unit 83. Further, the beacon communication unit 73 transmits an app ID, an app user ID, and current position information on the mobile terminal 20a to the beacon control unit 83. The app ID and the app user ID are included in the game unit 23. The current position information is obtained from the GPS unit 21a included in the mobile terminal 20a.

The reward allocation unit 74 performs a process similar to the reward screen display process illustrated in FIG. 36, and a process similar to the reward allocation process illustrated in FIG. 42.

Next, the server control unit 11a of the server 10a will be described. The server control unit 11a includes the information obtaining unit 81, an advertisement distribution unit 82, the beacon control unit 83, a reward control unit 84, and an advertisement designation acceptance unit 85.

The information obtaining unit 81 obtains information on the user from the information collection unit 71, and stores the obtained information in the server storage unit 16 as app user information.

The advertisement distribution unit 82 performs a process similar to the store collaboration information generation process illustrated in FIG. 18, and a process similar to the store collaboration information transmission process illustrated in FIG. 18.

In the second embodiment, unlike the first embodiment, the content of the store collaboration information generated by the advertisement distribution unit 82 can be specified through the PC 60 installed in the store 30a. Specifically, the advertisement designation acceptance unit 85 accepts the designation of a store that is a target for collaboration or the designation of the content of game rewards. Such designation is input by a person in charge of advertising for the store 30a through the PC 60.

The person in charge of advertising for the store 30a is also able to specify the mobile terminal 20a from which the store collaboration information is transmitted, by using the app user information. That is, the person in charge of advertising for the store 30a is able to specify the destination to which the advertisement is distributed, through the PC 60. Specifically, the person in charge of advertising for the store 30a is able to transmit the store collaboration information only to mobile terminals of users who are, for example, 30 years old or over.

The content of the designation accepted by the advertisement designation acceptance unit 85 is stored in, for example, the server storage unit 16.

The beacon control unit 83 provides beacon device information on a beacon device located around the mobile terminal 20a, calculates the probability of abnormal condition of the beacon device, and performs a process corresponding to the calculated probability of abnormal condition. Specifically, the beacon control unit 83 obtains current position information (an example of first position information) indicating the current position of the mobile terminal 20a from the beacon communication unit 73 of the mobile terminal 20a. Further, the beacon control unit 83 compares the obtained current position information with installation position information (beacon ID information described below) indicating the installation position of the beacon device 50a to provide information concerning a beacon device located around the mobile terminal 20a. Further, the beacon control unit 83 compares the obtained current position information with the installation position information indicating the installation position of the beacon device 50a to calculate the probability of abnormal condition of the beacon device 50a, and performs a process corresponding to the calculated probability of abnormal condition. The operations of the beacon control unit 83 described above are characteristic operations of the server 10a, and will be described in detail below.

The beacon control unit 83 holds (or stores) pieces of key information 86a to 86n. The pieces of key information 86a to 86n are key information for performing encryption communication with the beacon devices 50a to 50n, respectively. A signal encrypted by using the key information 86a is decodable by using key information 51a held in the beacon device 50a, and a signal encrypted by using the key information 51a is decodable by using the key information 86a. Similarly, a signal encrypted by using the key information 86n is decodable by using key information 51n held in the beacon device 50n, and a signal encrypted by using the key information 51n is decodable by using the key information 86n. The key information 51n and the key information 86n may be identical (common key encryption).

The reward control unit 84 performs a process similar to the reward screen information generation process illustrated in FIG. 40, and a process similar to the reward information generation process illustrated in FIG. 44.

Next, the constituent elements (the beacon devices 50a to 50n and the PC 60) installed in the store 30a will be described.

The beacon devices 50a to 50n are installed in the store 30a, and are each a device that periodically repeatedly transmits a beacon signal which is a radio signal for wireless communication. The beacon signal includes, for example, the device ID (identification information) of a beacon device that has transmitted the beacon signal. The beacon device 50a is an example of a first beacon device, and the beacon device 50n is an example of a second beacon device.

Each of the beacon devices 50a to 50n is not limited to any specific form but, in the second embodiment, may be a small module having a substrate of approximately 3 cm×3 cm on which circuit components are mounted. In the second embodiment, furthermore, the beacon devices 50a to 50n are each driven by a button cell battery. In terms of maintenance, it is desirable to reduce the frequency of replacement of the batteries. Accordingly, each of the beacon devices 50a to 50n does not include a constituent element for obtaining position information thereon, such as a GPS module, in order to reduce power consumption.

As described above, the beacon devices 50a to 50n respectively hold the pieces of key information 51a to 51n to perform encryption communication with the beacon control unit 83. Since each of the beacon devices 50a to 50n does not include a constituent element for directly communicating with the server 10a, communication between the beacon devices 50a to 50n and the server 10a involves the transmission and reception of information via the mobile terminal 20a. However, the mobile terminal 20a holds no key information corresponding to the pieces of key information 51a to 51n, which makes it difficult for the mobile terminal 20a to alter information, for example.

In the second embodiment, a plurality of beacon devices are installed in a single store 30a, or a single building (space). It is sufficient that at least one beacon device be installed in the store 30a, and a plurality of beacon devices may not necessarily be installed.

The PC 60 is a personal computer installed in the store 30a, and is usable by a person in charge of advertising for the store 30a to specify the content of store collaboration information, for example. The PC 60 may not necessarily be installed in the store 30a. Instead of the PC 60, any other information communication terminal such as a smartphone may be used.

Figure 62:
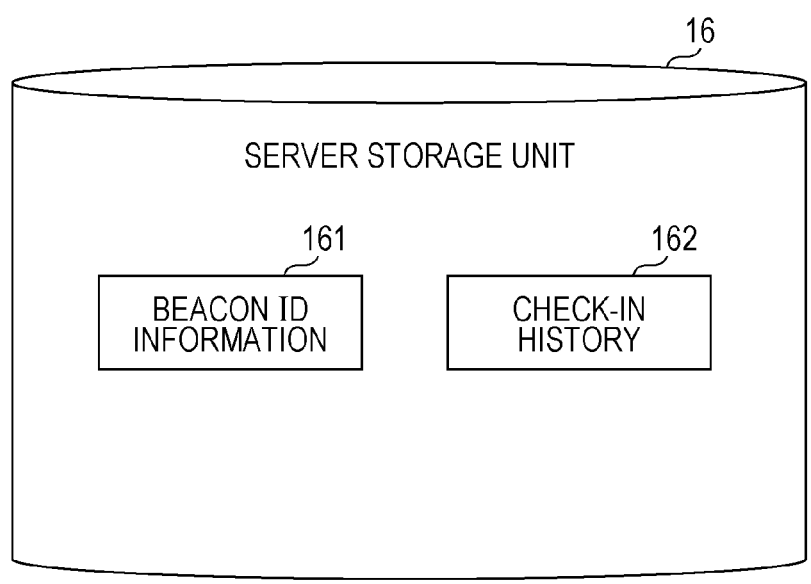
FIG. 62 illustrates information stored in a server storage unit.

Finally, the server storage unit 16 will be described. FIG. 62 illustrates information stored in the server storage unit 16.

As illustrated in FIG. 62, the server storage unit 16 stores beacon ID information 161 and a check-in history 162. Although not illustrated in FIG. 62, the server storage unit 16 also stores the app user information described above and the content of the designation accepted by the advertisement designation acceptance unit 85.

The beacon ID information 161 is information managed in advance by the server 10a, and is an example of second position information. Specifically, the beacon ID information 161 is information illustrated in FIG. 63. FIG. 63 illustrates an example of the beacon ID information 161.

As illustrated in FIG. 63, the beacon ID information 161 is information in which the device IDs of a plurality of beacon devices are associated with the installation positions of the beacon devices. The beacon ID information 161 also includes other information such as the respective device names of the plurality of beacon devices, the store IDs of stores in which the beacon devices are installed, the locations where the beacon devices are installed ("installation locations"), radio field intensity (received signal strength intensity (RSSI)), and a false flag.

The check-in history 162 is a log of check-ins. FIG. 64 illustrates an example of the check-in history 162. As described below, upon receipt of a beacon signal from each of the beacon devices 50a to 50n, the mobile terminal 20a transmits a device ID included in the beacon signal to the server 10a. In this case, the server 10a stores the device ID transmitted from the mobile terminal 20a in the server storage unit 16 as a check-in history in association with the date and time of reception of the device ID. Similarly, the server 10a also stores the date and time of reception of a device ID transmitted from any other mobile terminal in the server storage unit 16 as the check-in history 162.

That is, each of a plurality of mobile terminals (an example of second portable terminals) transmits to the server 10a a beacon ID (an example of a first ID) included in a beacon signal received from the beacon device 50a. The server 10a manages, as the check-in history 162, the dates and times of reception of the beacon IDs transmitted from the plurality of mobile terminals. Also, each of a plurality of mobile terminals (an example of third portable terminals) transmits to the server 10a a beacon ID (an example of a second ID) included in a beacon signal received from a beacon device (for example, the beacon device 50n) different from the beacon device 50a. The server 10a further manages, as the check-in history 162, the dates and times of reception of the beacon IDs transmitted from the plurality of mobile terminals.

As illustrated in FIG. 64, the check-in history 162 also includes other information such as a check-in position, an app user ID, and an app ID (not illustrated). The check-in position is the position of a mobile terminal at the time of check-in.

In the following second embodiment, a check-in history constituted by a date and time of reception of the device ID of the beacon device 50a is also referred to as a first check-in history. A check-in history constituted by a date and time of reception of the device ID of a beacon device other than the beacon device 50a among the plurality of beacon devices 50a to 50n is also referred to as a second check-in history.

Operation

Figure 65A:
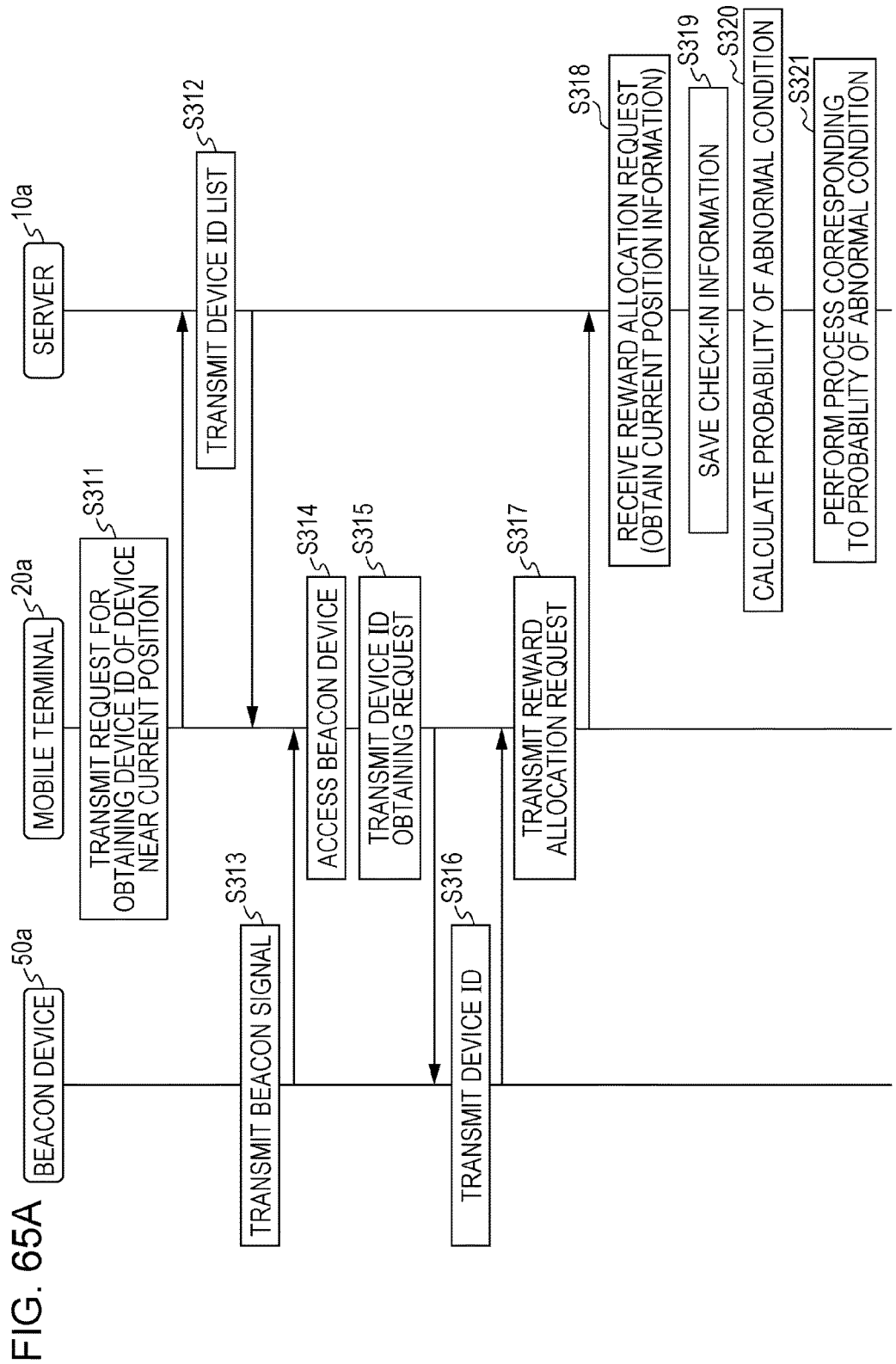
FIG. 65A is a first sequence diagram of the operation of the game reward allocation system according to the second embodiment.

Next, the operation of the game reward allocation system 100a will be described. FIG. 65A is a sequence diagram of the operation of the game reward allocation system 100a. The operation illustrated in FIG. 65A is performed when a user who has visited the store 30a starts a game app stored in the mobile terminal 20a. Specifically, the operation illustrated in FIG. 65A is started, for example, when the user presses a trigger button through a screen on which the app is being started.

First, the beacon communication unit 73 of the mobile terminal 20a transmits a request for obtaining the device ID of a device near the current position of the mobile terminal 20a to the beacon control unit 83 of the server 10a (S311). In this case, the beacon communication unit 73 starts the GPS unit 21a, causes the device ID obtaining request to include the current position information on the mobile terminal 20a obtained from the GPS unit 21a, and transmits the device ID obtaining request.

Then, the beacon control unit 83 transmits a list of device IDs of beacon devices located near the current position of the mobile terminal 20a (S312). For example, the beacon control unit 83 refers to the beacon ID information 161 in the server storage unit 16 to select beacon devices installed within a predetermined range (for example, within a distance of 1 km) from the current position of the mobile terminal 20a, and transmits a list of the device IDs of the selected beacon devices to the beacon communication unit 73. Note that, in the beacon ID information 161, a beacon device whose value of the false flag indicates "pending", "temporary suspension", or "complete stop" can possibly be used without authorization. Thus, the beacon control unit 83 does not cause the list to include the device ID of such a beacon device.

Each of the plurality of beacon devices 50a to 50n (for example, the beacon device 50a) installed in the store 30a periodically repeatedly transmits a beacon signal (S313). Upon receipt of a beacon signal from the beacon device 50a, the beacon communication unit 73 accesses the beacon device 50a (S314) and transmits a device ID obtaining request to the beacon device 50a (S315).

Upon receipt of the device ID obtaining request, the beacon device 50a transmits a beacon signal including the device ID of the beacon device 50a to the beacon communication unit 73 (S316).

The beacon device 50a may transmit the device ID to the mobile terminal 20a via two-way communication between the beacon device 50a and the mobile terminal 20a, as in steps S313 to S316. Alternatively, the beacon device 50a may transmit (or broadcast) a beacon signal including the device ID to the mobile terminal 20a in step S313. FIG. 65B is a sequence diagram of this operation of the game reward allocation system 100a.

In the operation of the game reward allocation system 100a illustrated in FIG. 65B, the processes of steps S314 to S316 are omitted, and a beacon signal including the device ID of the beacon device 50a is broadcasted in step S313. That is, there is no need for two-way communication for the transmission of a device ID, enabling an increase in communication speed and a reduction in power consumption for communication. On the contrary, there is a limitation on the amount of information that can be included in a beacon signal, resulting in the data length of a device ID being limited.

Upon receipt of the beacon signal, the beacon communication unit 73 transmits to the beacon control unit 83 a request for reward allocation including both the device ID included in the received beacon signal and the current position information on the mobile terminal 20 obtained from the GPS unit 21a at the current time (S317). The request for reward allocation also includes an app ID and an app user ID.

The beacon control unit 83 receives the request for reward allocation from the beacon communication unit 73 (S318). In other words, the beacon control unit 83 obtains the device ID and the current position information indicating the current position of the mobile terminal 20a. Then, the beacon control unit 83 saves check-in information (S319). That is, the beacon control unit 83 manages (or stores), as the check-in history 162 (first check-in history), the date and time of reception of the device ID and current position information transmitted from the mobile terminal 20a. Then, the beacon control unit 83 calculates the probability of abnormal condition of the beacon device 50a (S320). For example, the beacon control unit 83 refers to the beacon ID information 161 stored in the server storage unit 16 to read the installation position of the mobile terminal 20a, and compares the read installation position with the obtained current position information to calculate the probability of abnormal condition of the beacon device 50a. Then, the beacon control unit 83 performs a process corresponding to the probability of abnormal condition calculated in step S320 (S321).

Method for Calculating Probability of Abnormal Condition

Next, the method for calculating a probability of abnormal condition in step S320 in FIG. 65A will be described in detail. In the following description, by way of example, the probability of abnormal condition=1 is set when the probability of abnormal condition is the highest, and the probability of abnormal condition=0 is set when the probability of abnormal condition is the lowest, that is, when normal conditions exist.

As described above, the server storage unit 16 stores the beacon ID information 161. That is, the beacon control unit 83 manages in advance the beacon ID information 161 indicating the installation position of the beacon device 50a.

If the position indicated by the current position information on the mobile terminal 20a obtained in step S318 is largely different from the installation position of the beacon device 50a indicated by the beacon ID information 161, it is suspected that the beacon device 50a may be placed at a position different from the installation position indicated by the beacon ID information 161 due to its theft or any other reason.

Accordingly, for example, if the difference between the installation position indicated by the beacon ID information 161 and the current position of the mobile terminal 20a is within a predetermined value, the beacon control unit 83 determines that the beacon device 50a is under normal conditions (probability of abnormal condition=0). If the difference is larger than the predetermined value, the beacon control unit 83 determines that an abnormal event has occurred (probability of abnormal condition=1).

The determination described above is the simplest example. In the second embodiment, the beacon control unit 83 calculates a probability of abnormal condition, using the current position information on the mobile terminal 20a obtained in step S318, so that the larger the difference between the installation position indicated by the beacon ID information 161 and the current position indicated by the obtained current position information, the higher the probability of abnormal condition.

The calculation of the probability of abnormal condition may be based on information other than the current position information described above. As described above, the beacon control unit 83 manages (or stores in the server storage unit 16), as a first check-in history, the dates and times when the beacon ID of the beacon device 50a was received from a plurality of mobile terminals. The first check-in history may be used for the calculation of the probability of abnormal condition.

In a case where the beacon device 50a is installed in the store 30a, there is a tendency for the number of check-ins to vary from store to store and from time slot to time slot (for example, in Store 1, the number of check-ins is comparatively large during the time slot of 12:00 to 13:00, but is comparatively small during the time slot of 20:00 to 21:00, etc.).

However, while the beacon device 50a is being used without authorization, the tendency for the number of check-ins to vary may be different from usual or the number of check-ins may markedly decrease. That is, in this case, the current first check-in history is considered to be largely different from the previous first check-in history.

Accordingly, the beacon control unit 83 may compare the first check-in history obtained when the current position information is obtained in step S318 with the previous first check-in history to calculate a probability of abnormal condition. For example, the beacon control unit 83 calculates the degree of similarity between the current distribution of the number of check-ins and the previous distribution of the number of check-ins, and calculates a probability of abnormal condition so that the lower the degree of similarity calculated, the higher the probability of abnormal condition. The degree of similarity is calculated by using a known technique.

For example, in a case where the user of the mobile terminal 20*a* alters data of the GPS unit 21*a*, it is probable that a probability of abnormal condition may not be able to be correctly calculated through the comparison between the installation position indicated by the beacon device 50*a* and the current position of the mobile terminal 20*a*. In this case, it is effective to calculate a probability of abnormal condition by using a check-in history.

Alternatively, the calculation of a probability of abnormal condition may be based on a second check-in history constituted by a date and time of reception of the device ID of a beacon device (for example, the beacon device 50*n*) other than the beacon device 50*a* among the beacon devices 50*a* to 50*n* installed in the store 30*a*. Specifically, the beacon control unit 83 may calculate a probability of abnormal condition by comparing the first check-in history with the second check-in history.

As described above, the beacon control unit 83 manages (or stores in the server storage unit 16), as a second check-in history, the dates and time when the beacon ID of a beacon device other than the beacon device 50*a* was received from the plurality of mobile terminals. If the distribution of the number of check-ins included in the second check-in history is largely different from the distribution of the number of check-ins included in the first check-in history, the beacon device 50*a* is presumably used in a way different from that of the other beacon devices. That is, it can be determined that the beacon device 50*a* will be installed in a location other than the store 30*a* and used without authorization.

For example, the beacon control unit 83 calculates the degree of similarity between the distribution of the number of check-ins included in the first check-in history and the distribution of the number of check-ins included in the second check-in history, and calculates a probability of abnormal condition so that the lower the degree of similarity calculated, the higher the probability of abnormal condition. The degree of similarity is calculated by using a known technique.

As described above, the first check-in history includes an app user ID. A probability of abnormal condition may be calculated on the basis of the number of identical app user IDs. For example, the beacon control unit 83 may calculate a probability of abnormal condition in accordance with the number of identical app user IDs included in the first check-in history.

As illustrated in FIG. 66, a predetermined number of or more check-ins made using an identical app user ID may be consecutive, or the proportion (frequency) of check-ins made using an identical app user ID may be higher than a predetermined value. FIG. 66 illustrates an example of a check-in history 162*a* when an abnormal event has occurred. In the case illustrated in FIG. 66, it is suspected that a specific user may be using the beacon device 50*a* without authorization. In this case, the beacon control unit 83 may determine that the probability of abnormal condition is high. In addition, the beacon control unit 83 may determine that the probability of abnormal condition is high if, for example, the number of identical app user IDs included in a certain period is large. Indeed, the following case is conceivable. Although the beacon device 50*a* is being used with authorization, only a specific user happens to visit the store. In order to mitigate the potential consequences of the situation, the number of identical app user IDs included in a certain period is used as an auxiliary condition in combination with the comparison of the degree of similarity to the previous history described above.

As described above, a probability of abnormal condition is calculated by using the discrepancy between the installation position of the beacon device 50*a* and the current position of the mobile terminal 20*a* or by using the check-in history 162. Note that a probability of abnormal condition may be calculated by using the discrepancy between the installation position of the beacon device 50*a* and the current position of the mobile terminal 20*a* and by also using the check-in history 162. In this case, probabilities of abnormal condition are calculated by using the respective techniques, and then a weighted sum of the calculated probabilities of abnormal condition is calculated, for example, to determine one probability of abnormal condition.

Process Corresponding to Probability of Abnormal Condition

Figure 67:
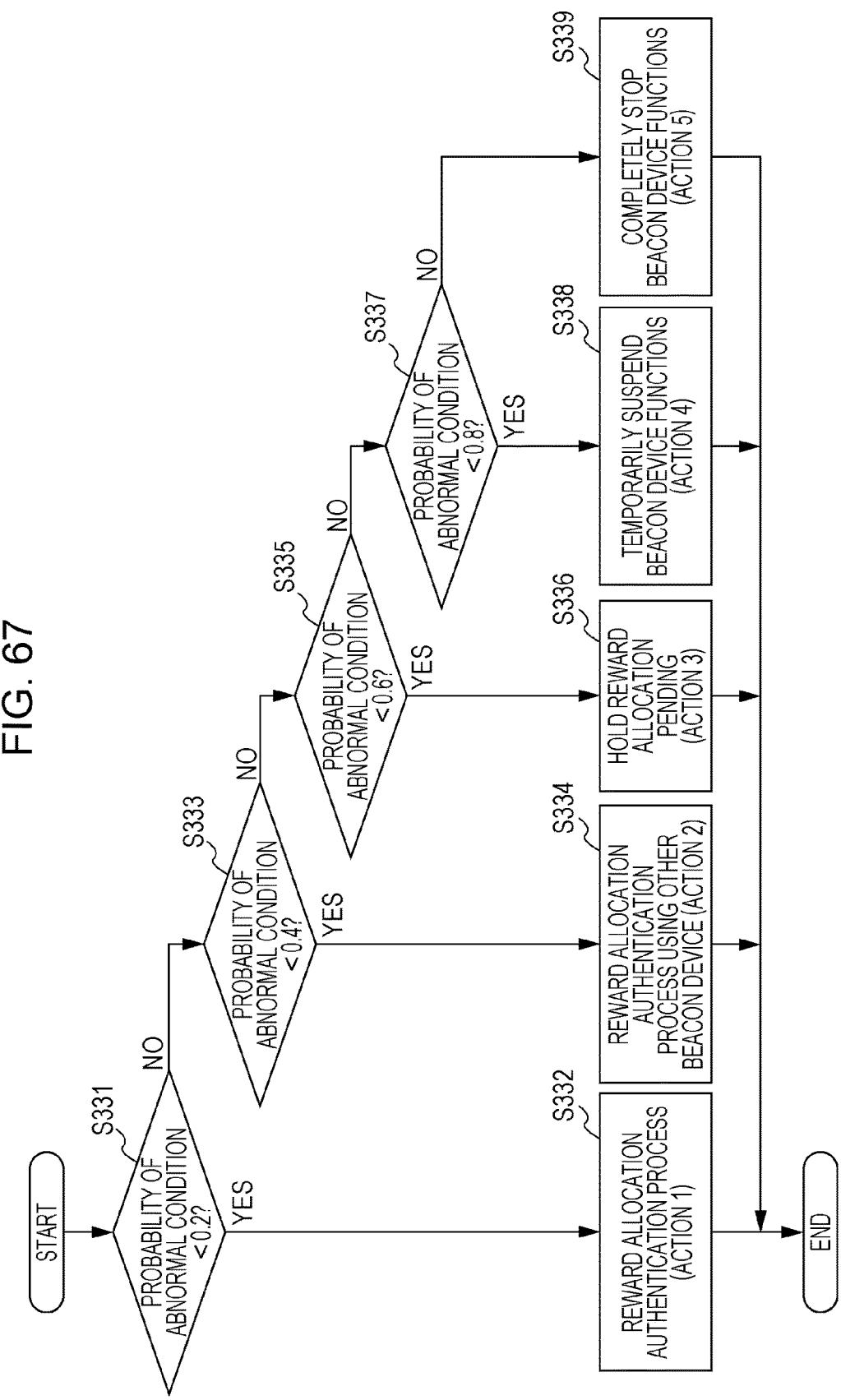
FIG. 67 is a flowchart of a method for determining a process corresponding to the probability of abnormal condition by using a beacon control unit.

Next, the process corresponding to the probability of abnormal condition in step S321 in FIG. 65A will be described. The beacon control unit 83 performs a process corresponding to the probability of abnormal condition calculated in the way described above. In the second embodiment, the beacon control unit 83 performs any of five processes in accordance with the probability of abnormal condition. FIG. 67 is a flowchart of a method for determining a process corresponding to the probability of abnormal condition by using the beacon control unit 83. In the flowchart in FIG. 67, threshold values for determination of the probability of abnormal condition and the number of threshold values are examples.

First, the beacon control unit 83 determines whether or not the calculated probability of abnormal condition is smaller than a first threshold value, namely, 0.2 (S331). If the calculated probability of abnormal condition is smaller than 0.2 (YES in S331), the beacon control unit 83 performs a reward allocation authentication process using the beacon device 50*a* (Action 1) (S332).

If the calculated probability of abnormal condition is greater than or equal to 0.2 (NO in S331), the beacon control unit 83 determines whether or not the calculated probability of abnormal condition is smaller than a second threshold value, namely, 0.4 (S333). If the calculated probability of abnormal condition is smaller than 0.4 (YES in S333), the beacon control unit 83 performs a reward allocation authentication process using another beacon device (for example, the beacon device 50*n*) different from the beacon device 50*a* (Action 2) for the beacon communication unit 73 (S334).

If the calculated probability of abnormal condition is greater than or equal to 0.4 (NO in S333), the beacon control unit 83 determines whether or not the calculated probability of abnormal condition is smaller than a third threshold value, namely, 0.6 (S335). If the calculated probability of abnormal condition is smaller than 0.6 (YES in S335), the beacon control unit 83 performs a process for holding reward allocation pending (Action 3) (S336).

If the calculated probability of abnormal condition is greater than or equal to 0.6 (NO in S335), the beacon control unit 83 determines whether or not the calculated probability of abnormal condition is smaller than a fourth threshold value, namely, 0.8 (S337). If the calculated probability of abnormal condition is smaller than 0.8 (YES in S337), the beacon control unit 83 performs a process for temporarily suspending the functions of the beacon device 50*a* (Action 4) (S338).

If the calculated probability of abnormal condition is greater than or equal to 0.8 (NO in S337), the beacon control unit 83 performs a process for completely stopping the functions of the beacon device 50a (Action 5) (S339).

The details of the processes corresponding to the probability of abnormal condition will be described hereinafter.

Reward Allocation Authentication Process (Action 1)

Figure 68:
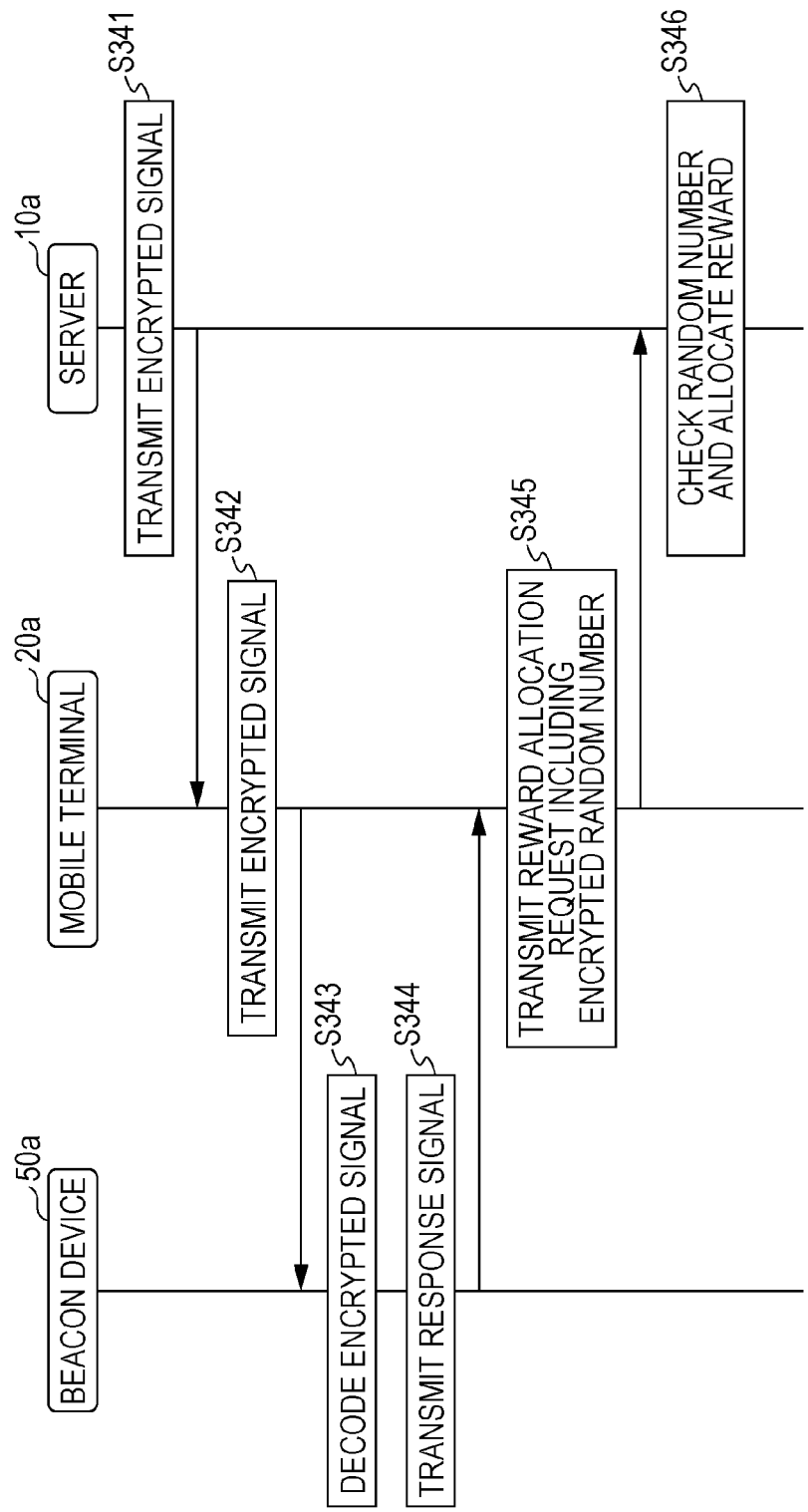
FIG. 68 is a sequence diagram of a reward allocation authentication process.

First, the reward allocation authentication process (Action 1) will be described in detail. FIG. 68 is a sequence diagram of the reward allocation authentication process. The reward allocation authentication process is a predetermined process performed when the probability of abnormal condition is low (or when normal conditions exist). When the reward allocation authentication process is completed, a game reward (for example, a stamp or an item) used in a game app is allocated over data.

First, the beacon control unit 83 of the server 10a generates a control signal for instructing the beacon device 50a and the mobile terminal 20a to perform Action 1, and a random number (one-time password). The random number is used as measures against the interception (tapping) of communication.

The beacon control unit 83 transmits to the beacon communication unit 73 an encrypted signal obtained by encrypting the generated control signal and random number by using the key information 86a corresponding to the key information 51a stored in the beacon device 50a (S341).

The beacon communication unit 73 of the mobile terminal 20a receives the encrypted signal from the beacon control unit 83. However, the mobile terminal 20a does not store the key information 51a. That is, the beacon communication unit 73 is not able to decode the encrypted signal. Accordingly, the beacon communication unit 73 transmits the received encrypted signal to the beacon device 50a as is (S342).

The beacon device 50a decodes the received encrypted signal by using the key information 51a (S343), and obtains a control signal and a random number. Then, in accordance with the instructions for Action 1 indicated by the control signal, the beacon device 50a transmits a response signal including the instructions to the beacon communication unit 73 (S344). In this case, the beacon device 50a re-encrypts the random number, which is obtained by decoding the encrypted signal by using the key information 51a, by using the key information 51a, and causes the response signal to include the re-encrypted random number before transmitting the response signal.

Upon receipt of the response signal, the beacon communication unit 73 transmits a reward allocation request including the encrypted random number to the beacon control unit 83 in accordance with the instructions for Action 1 included in the response signal (S345).

The beacon control unit 83 receives the reward allocation request, checks the random number, and performs a process for allocating a reward (S346). More specifically, the beacon control unit 83 first decodes the encrypted random number by using the key information 86a to obtain a random number, and checks whether the obtained random number matches the random number transmitted from the beacon control unit 83 in step S341. If both match, a process for allocating a reward is started.

The process for allocating a reward is similar to the reward screen generation process described with reference to FIG. 40 or a process similar to the reward information generation process described with reference to FIG. 44, and is performed by the reward control unit 84. As a result, a game reward (for example, a stamp or an item) used in the game app is allocated over data.

In the way described above, if the calculated probability of abnormal condition is lower than a predetermined value (here, 0.2), the beacon control unit 83 performs a predetermined process for allocating a reward to the mobile terminal 20a.

Reward Allocation Authentication Process Using Other Beacon Device (Action 2)

Figure 69:
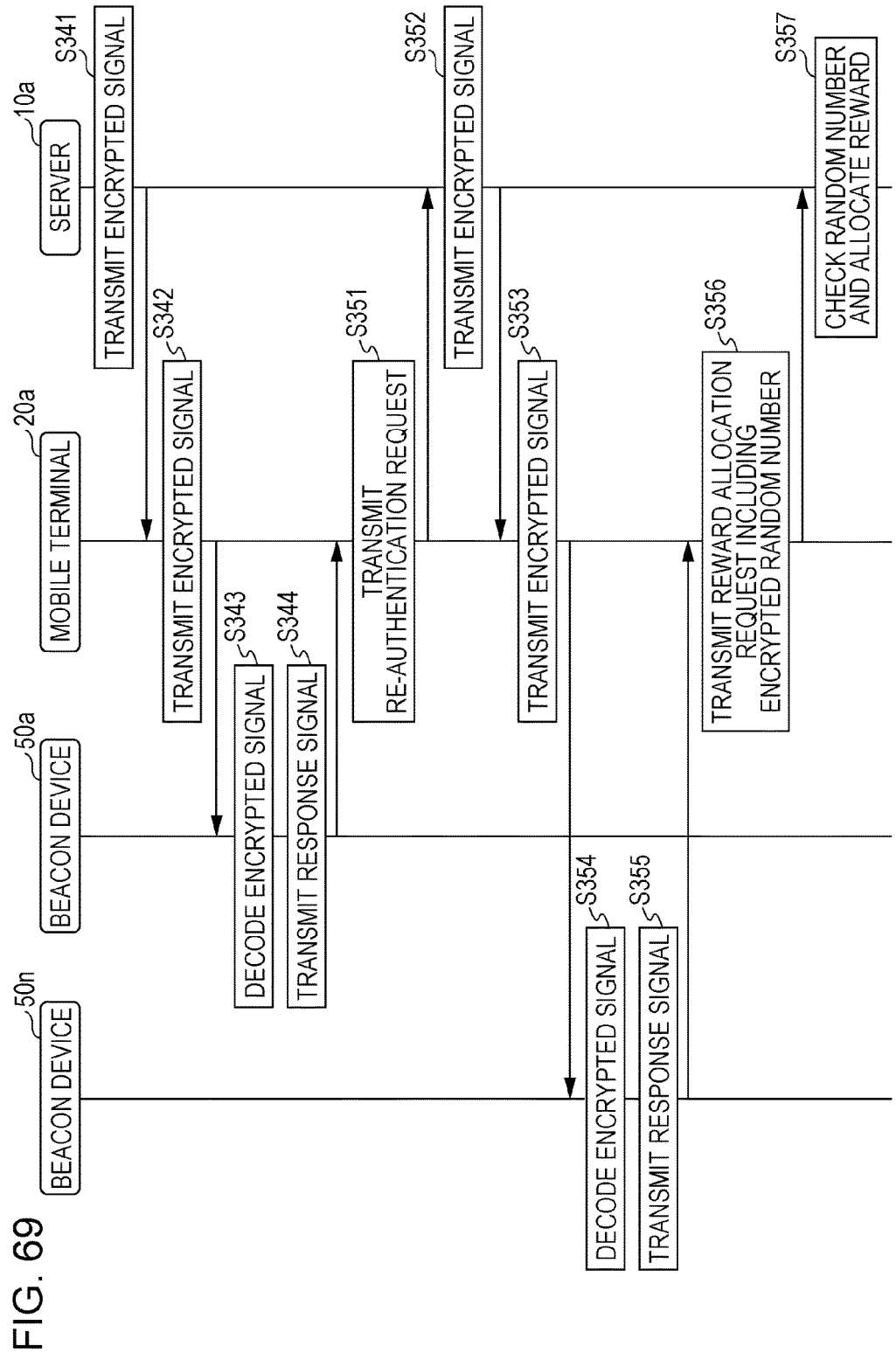
FIG. 69 is a sequence diagram of a reward allocation authentication process using another beacon device.

Next, the reward allocation authentication process using another beacon device (Action 2) will be described in detail. FIG. 69 is a sequence diagram of the reward allocation authentication process using another beacon device. In FIG. 69, steps substantially identical to those in FIG. 68 are denoted by numerals similar to those in FIG. 68, and the description thereof is simplified.

As described above, a plurality of beacon devices are installed in the store 30a. Thus, if unauthorized use of the beacon device 50a is suspected, a reward allocation authentication process is performed using a beacon device (here, the beacon device 50n) other than the beacon device 50a. This makes the reward allocation authentication process infeasible when, for example, the beacon device 50a has been stolen, suppressing the unauthorized obtaining of game rewards.

First, the beacon control unit 83 of the server 10a transmits to the beacon communication unit 73 an encrypted signal including a control signal for providing instructions for Action 2 and a random number (S341). The beacon communication unit 73 transmits the received encrypted signal to the beacon device 50a as is (S342).

The beacon device 50a decodes the received encrypted signal by using the key information 51a (S343), and obtains a control signal and a random number. Then, in accordance with the instructions for Action 2 indicated by the control signal, the beacon device 50a transmits a response signal including the instructions and the re-encrypted random number to the beacon communication unit 73 (S344).

Upon receipt of the response signal, the beacon communication unit 73 transmits a re-authentication request including the encrypted random number to the beacon control unit 83 in accordance with the instructions for Action 2 included in the response signal (instructions for communicating with the beacon device 50n) (S351).

The beacon control unit 83 receives the re-authentication request, checks the random number, and re-transmits the encrypted signal (S352). Specifically, the beacon control unit 83 generates a control signal for instructing the beacon device 50n and the mobile terminal 20a to perform an action, and a random number, and transmits to the beacon communication unit 73 an encrypted signal encrypted by using the key information 86n, the encrypted signal including the generated control signal and random number (S352). The beacon communication unit 73 transmits the received encrypted signal to the beacon device 50n as is (S353).

The beacon device 50n decodes the received encrypted signal by using the key information 51n (S354), and obtains a control signal and a random number. Then, in accordance with the instructions for the action indicated by the control signal, the beacon device 50n transmits a response signal including the instructions and the re-encrypted random number to the beacon communication unit 73 (S355).

Upon receipt of the response signal, the beacon communication unit 73 transmits a reward allocation request including the encrypted random number to the beacon control unit 83 in accordance with the instructions for the action included in the response signal (S356).

The beacon control unit 83 receives the reward allocation request, checks the random number, and performs a process for allocating a reward (S357). More specifically, the beacon control unit 83 first decodes the encrypted random number by using the key information 86$n$ to obtain a random number, and checks whether the obtained random number matches the random number transmitted from the beacon control unit 83 in step S352. If both match, a process for allocating a reward is started.

In the way described above, if the calculated probability of abnormal condition is greater than or equal to a predetermined value (here, 0.2), the beacon control unit 83 performs a process for instructing the mobile terminal 20$a$ to obtain a beacon signal (response signal) from the beacon device 50$n$ different from the beacon device 50$a$.

This can prevent the mobile terminal 20$a$ from receiving a beacon signal from the beacon device 50$a$ if the beacon device 50$a$ has been stolen, suppressing or reducing unauthorized use of the beacon device 50$a$.

A method for selecting a beacon device different from the beacon device 50$a$ is not limited to any specific method. For example, the beacon control unit 83 may refer to installation position information on beacon devices and select a beacon device located closest to the beacon device 50$a$. Alternatively, the beacon control unit 83 may refer to installation position information on beacon devices and randomly select a beacon device from among beacon devices located near the beacon device 50$a$.

Process for Holding Reward Allocation Pending (Action 3)

Figure 70:
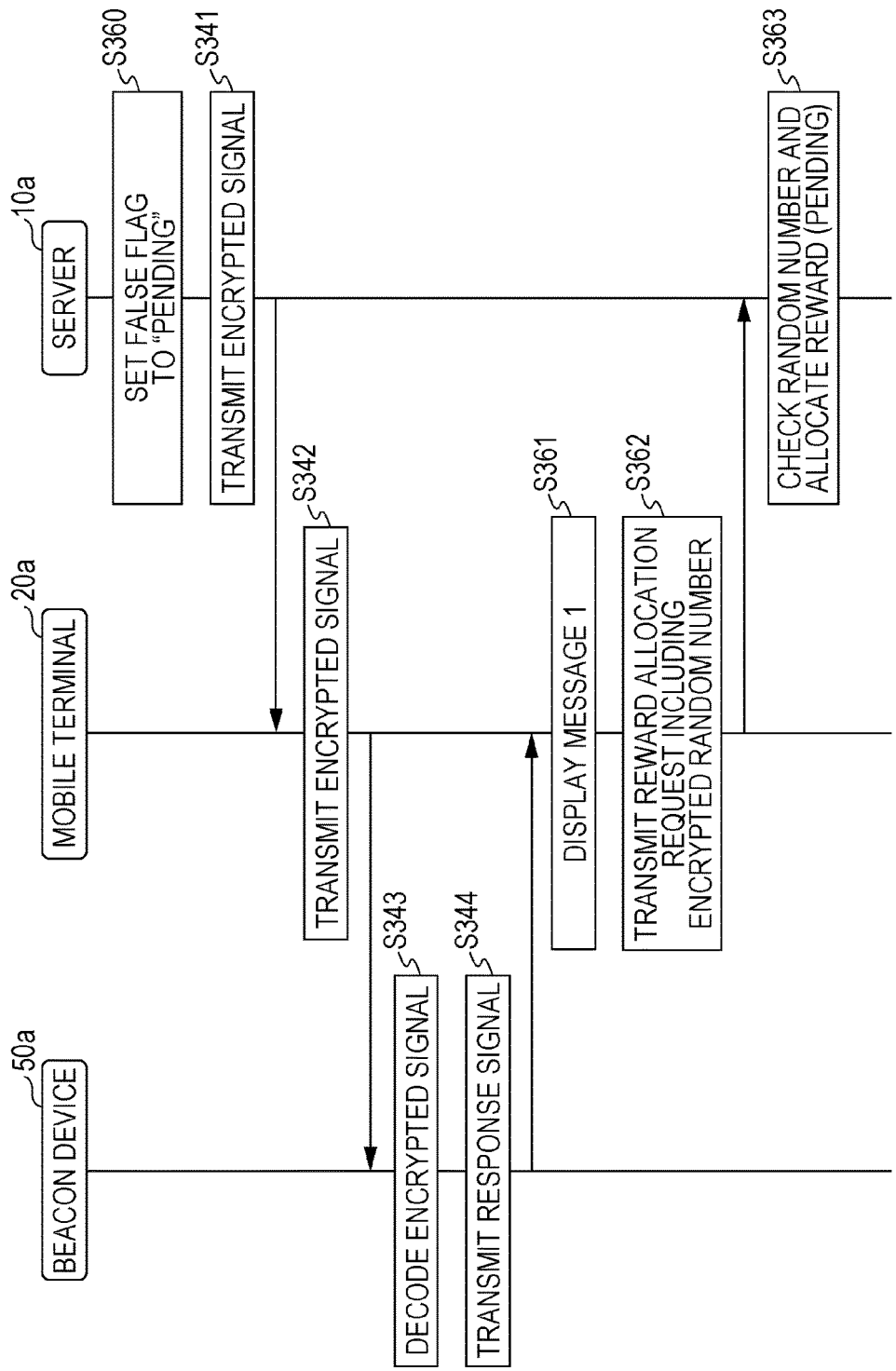
FIG. 70 is a sequence diagram of a process for holding reward allocation pending.

Next, the process for holding reward allocation pending (Action 3) will be described in detail. FIG. 70 is a sequence diagram of the process for holding reward allocation pending. In FIG. 70, steps substantially identical to those in FIG. 68 are denoted by numerals similar to those in FIG. 68, and the description thereof is simplified.

In the process for holding reward allocation pending, if unauthorized use of the beacon device 50$a$ is suspected, the start of the process for allocating a reward is brought into a pending state. During the period of the pending state, the staff actually checks the state of the beacon device 50$a$ in the store 30$a$, and, when it is confirmed that the beacon device 50$a$ is in the normal state, a process for allocating a reward is started.

First, the beacon control unit 83 of the server 10$a$ sets the false flag, corresponding to the device ID of the beacon device 50$a$, in the beacon ID information 161 to "pending" (S360), and then transmits to the beacon communication unit 73 an encrypted signal including a control signal for providing instructions for Action 3 and a random number (S341). The beacon communication unit 73 transmits the received encrypted signal to the beacon device 50$a$ as is (S342).

The beacon device 50$a$ decodes the received encrypted signal by using the key information 51$a$ (S343), and obtains a control signal and a random number. Then, in accordance with the instructions for Action 3 indicated by the control signal, the beacon device 50$a$ transmits a response signal including the instructions and the re-encrypted random number to the beacon communication unit 73 (S344).

Figure 71:
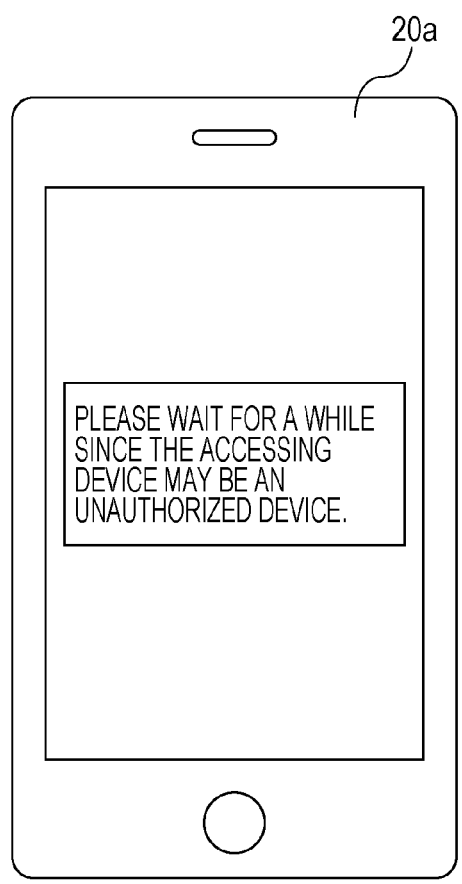
FIG. 71 is a schematic diagram of a mobile terminal on which Message 1 is displayed.

Upon receipt of the response signal, the beacon communication unit 73 displays Message 1 on the display unit in accordance with the instructions for Action 3 included in the response signal (S361). FIG. 71 is a schematic diagram of the mobile terminal 20$a$ on which Message 1 is displayed.

As illustrated in FIG. 71, in Message 1, a message indicating that reward allocation is pending is displayed.

Further, in accordance with the instructions for Action 3, the beacon communication unit 73 transmits a reward allocation request including the encrypted random number to the beacon control unit 83 (S362).

The beacon control unit 83 receives the reward allocation request, checks the random number, and holds the process for allocating a reward pending (S363). The pending reward allocation is released (the process for allocating a reward is started), for example, when the staff who has confirmed that the beacon device 50$a$ is in the normal state notifies the beacon control unit 83 of the normal operation of the beacon device 50$a$ through the PC 60. When the normal operation is confirmed, the beacon control unit 83 resets the false flag, corresponding to the device ID of the beacon device 50$a$, in the beacon ID information 161 to "NO".

In the way described above, if the calculated probability of abnormal condition is greater than or equal to a predetermined value (here, 0.4), the beacon control unit 83 performs a process for putting a predetermined process for allocating a reward on hold. This may suppress the start of a predetermined process for allocating a reward after checking the state of the beacon device 50$a$.

Process for Temporarily Suspending Functions of Beacon Device (Action 4)

Figure 72:
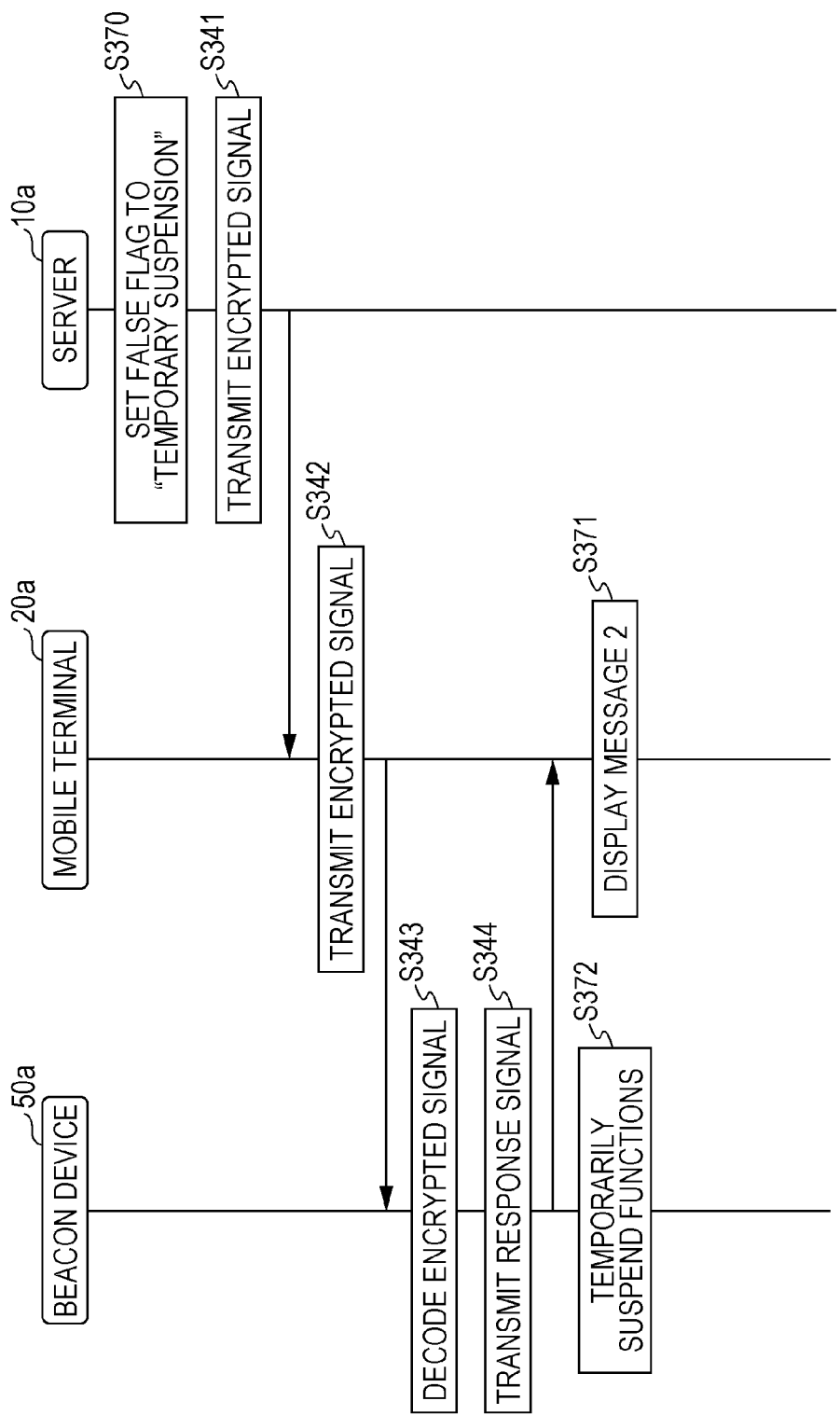
FIG. 72 is a sequence diagram of a process for temporarily suspending the function of a beacon device.

Next, the process for temporarily suspending the functions of the beacon device 50$a$ (Action 4) will be described in detail. FIG. 72 is a sequence diagram of the process for temporarily suspending the functions of the beacon device 50$a$. In FIG. 72, steps substantially identical to those in FIG. 68 are denoted by numerals similar to those in FIG. 68, and the description thereof is simplified.

The process for temporarily suspending the functions of the beacon device 50$a$ is a process performed when the probability of abnormal condition is comparatively high.

First, the beacon control unit 83 of the server 10$a$ sets the false flag, corresponding to the device ID of the beacon device 50$a$, in the beacon ID information 161 to "temporary suspension" (S370), and then transmits to the beacon communication unit 73 an encrypted signal including a control signal for providing instructions for Action 4 (S341). The beacon communication unit 73 transmits the received encrypted signal to the beacon device 50$a$ as is (S342).

The beacon device 50$a$ decodes the received encrypted signal by using the key information 51$a$ (S343), and obtains a control signal. Then, in accordance with the instructions for Action 4 indicated by the control signal, the beacon device 50$a$ transmits a response signal including the instructions to the beacon communication unit 73 (S344).

Figure 73:
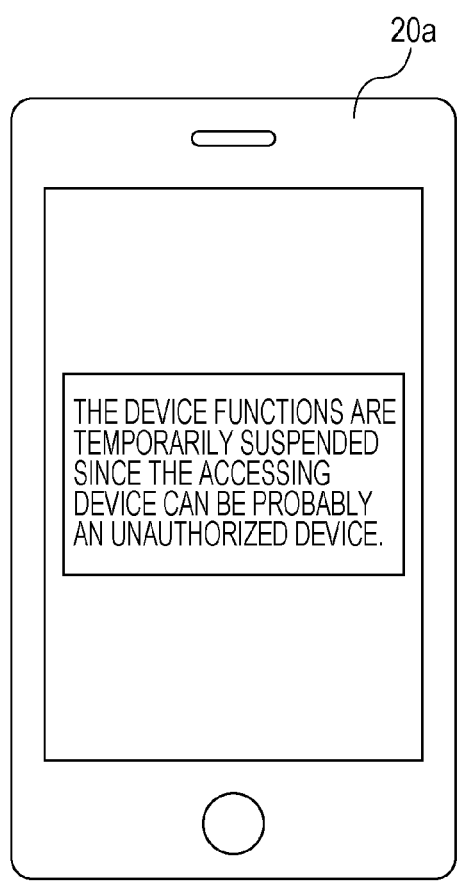
FIG. 73 is a schematic diagram of a mobile terminal on which Message 2 is displayed.

Upon receipt of the response signal, the beacon communication unit 73 displays Message 2 on the display unit in accordance with the instructions for Action 4 included in the response signal (S371). FIG. 73 is a schematic diagram of the mobile terminal 20$a$ on which Message 2 is displayed.

As illustrated in FIG. 73, in Message 2, a message indicating that the functions of a device are temporarily suspended.

Meanwhile, after transmitting the response signal in step S344, the beacon device 50$a$ temporarily suspends the functions in accordance with the instructions for Action 4 (S372). Specifically, the beacon device 50$a$ stops the transmission of the beacon signal. In this case, the beacon device 50$a$ can be reactivated by the manager or the like of the beacon device 50$a$ performing a predetermined recovery procedure. After the manager has performed the recovery procedure, the beacon control unit 83 resets the false flag, corresponding to the device ID of the beacon device 50$a$, in the beacon ID information 161 to "NO".

In the way described above, if the calculated probability of abnormal condition is greater than or equal to a predetermined value (here, 0.6), the beacon control unit 83 performs a process for transmitting information for temporarily suspending the functions of the beacon device 50*a* to the beacon device 50*a* via the mobile terminal 20*a*. This may suppress unauthorized use of the beacon device 50*a*.

Process for Completely Stopping Functions of Beacon Device (Action 5)

Figure 74:
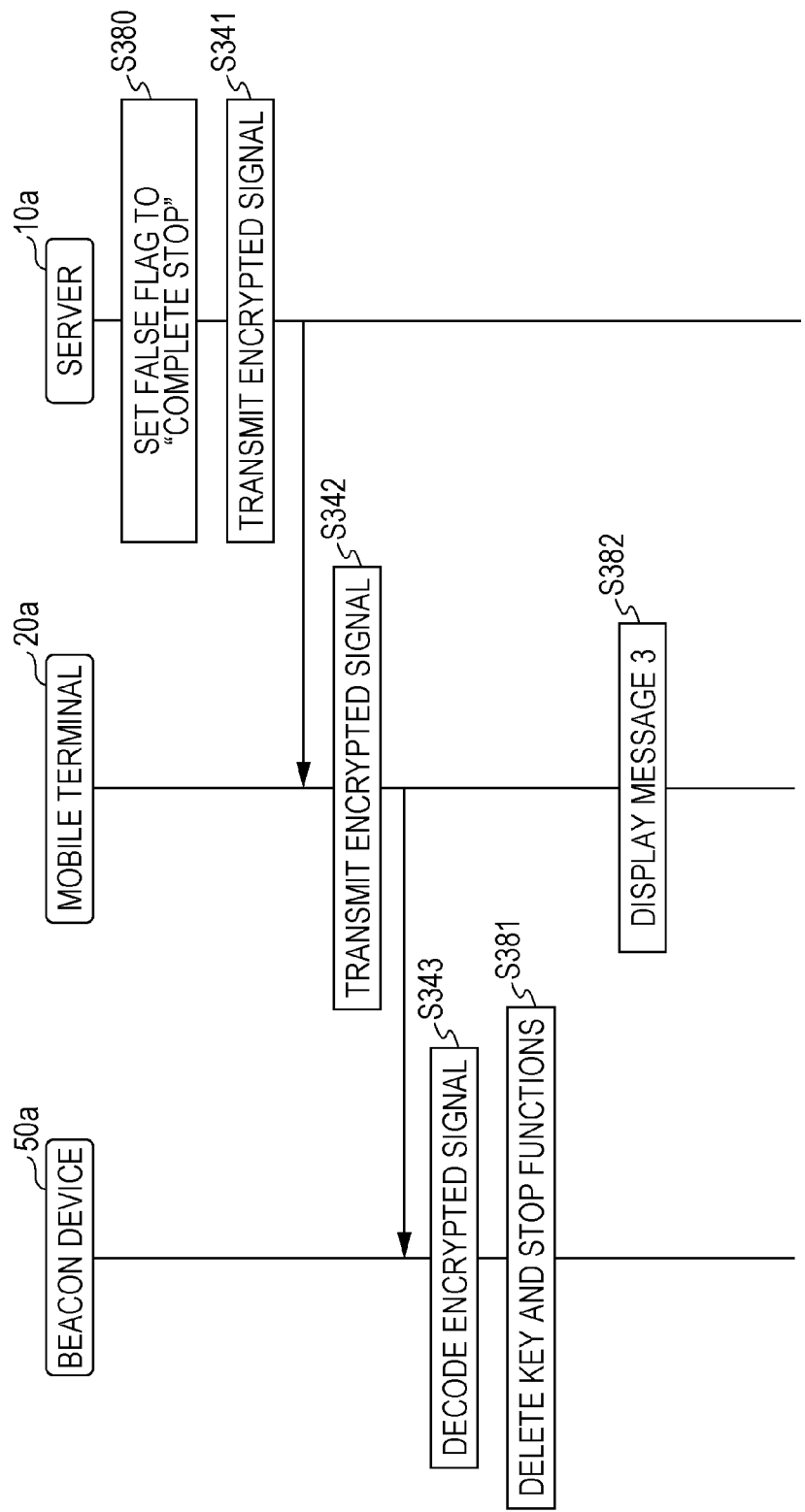
FIG. 74 is a sequence diagram of a process for completely stopping the function of a beacon device.

Next, the process for completely stopping the functions of the beacon device 50*a* (Action 5) will be described in detail. FIG. 74 is a sequence diagram of the process for completely stopping the functions of the beacon device 50*a*. In FIG. 74, steps substantially identical to those in FIG. 68 are denoted by numerals similar to those in FIG. 68, and the description thereof is simplified.

The process for completely stopping the functions of the beacon device 50*a* is performed when the probability of abnormal condition is significantly high.

First, the beacon control unit 83 of the server 10*a* sets the false flag, corresponding to the device ID of the beacon device 50*a*, in the beacon ID information 161 to "complete stop" (S380), and then transmits to the beacon communication unit 73 an encrypted signal including a control signal for providing instructions for Action 5 (S341). The beacon communication unit 73 transmits the received encrypted signal to the beacon device 50*a* as is (S342).

The beacon device 50*a* decodes the received encrypted signal by using the key information 51*a* (S343), and obtains a control signal. Then, in accordance with the instructions for Action 5 indicated by the control signal, the beacon device 50*a* deletes the key information 51*a* held (or stored) in the beacon device 50*a* to completely stop the functions (S381). In this case, reactivation of the beacon device 50*a* is not possible.

Figure 75:
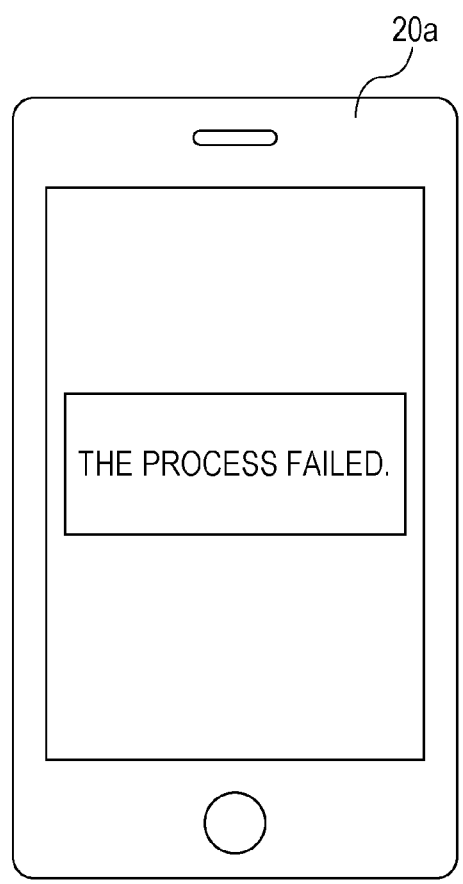
FIG. 75 is a schematic diagram of a mobile terminal on which Message 3 is displayed.

If the beacon communication unit 73 is not allowed to receive a response signal for a certain period or more after the encrypted signal is transmitted in step S342, the beacon communication unit 73 displays Message 3 on the display unit (S382). FIG. 75 is a schematic diagram of the mobile terminal 20*a* on which Message 3 is displayed.

As illustrated in FIG. 75, in Message 3, a message indicating that the process has failed is displayed.

In the way described above, if the calculated probability of abnormal condition is greater than or equal to a predetermined value (here, 0.8), the beacon control unit 83 performs a process for transmitting information for completely stopping the functions of the beacon device 50*a* to the beacon device 50*a* via the mobile terminal 20*a*. The information for stopping the functions of the beacon device 50*a* is encrypted information which is decodable by using the key information 51*a* held in the beacon device 50*a*. The information for stopping the functions of the beacon device 50*a* includes information for deleting the key information 51*a* held in the beacon device 50*a*.

This may reduce the probability of the outflow of the key information 51*a*, and may suppress unauthorized use of the game reward allocation system 100*a*.

Conclusion

An information processing method that uses the game reward allocation system 100*a* according to the second embodiment has been described. In the information processing method according to the second embodiment, the server 10*a* obtains current position information indicating the current position of the mobile terminal 20*a* from the mobile terminal 20*a* that has received a beacon signal from the beacon device 50*a*. Further, the server 10*a* compares the obtained current position information with installation position information (beacon ID information) indicating the installation position of the beacon device 50*a*, which is managed in advance by the server 10*a*, to calculate the probability of abnormal condition of the beacon device 50*a*. Then, the server 10*a* performs a process corresponding to the calculated probability of abnormal condition.

In the information processing method described above, the probability of abnormal condition of the beacon device 50*a* is calculated using the GPS unit 21*a* included in the mobile terminal 20*a*. The beacon device 50*a* for which the probability of abnormal condition is to be calculated is not necessarily provided with a GPS module, which may make the beacon device 50*a* simplified (reduced in power consumption).

In the information processing method described above, furthermore, it may be possible to perform a process for suppressing or reducing unauthorized use of a beacon device in accordance with the probability of abnormal condition of the beacon device.

Modifications to Second Embodiment

In the second embodiment, the beacon ID information 161 (installation position information) is stored in the server storage unit 16 included in the server 10*a*. However, the beacon ID information 161 may be obtained from a storage device located outside the server 10*a*. The beacon ID information 161 is not information transmitted from the beacon devices 50*a* to 50*n* but is information registered in advance in the server storage unit 16 by the manager of the server 10*a* or by the managers of the beacon devices 50*a* to 50*n*.

The technique of the second embodiment may be implemented as the game reward allocation system 100*a* or the server 10*a*. Alternatively, the technique of the second embodiment may be implemented as an application applicable to the mobile terminal 20*a* or an SDK (the SDK unit 24*a*) applicable to a game app (the game unit 23).

The information processing method according to the second embodiment is also applicable to a system other than the game reward allocation system 100*a* (for example, any other non-game-related system).

Other Embodiments

As described above, the first and the second embodiments have been described as illustrative examples of the technique disclosed herein. However, the technique of the present disclosure is not limited to these embodiments, and is also applicable to other embodiments including modifications, replacements, additions, omissions, and others as desired. In addition, the constituent elements described in the first and second embodiments described above may be used in combination to construct different embodiments.

For example, in the foregoing embodiments, each constituent element may be constituted by dedicated hardware, or may be implemented by executing a software program suitable for the corresponding constituent element. Each constituent element may be implemented by a program execution unit such as a central processing unit (CPU) or a processor reading and executing a software program recorded on a recording medium such as a hard disk or a semiconductor memory.

In the foregoing embodiments, furthermore, a process performed by a specific processing unit may be performed by another processing unit. In addition, the order of a plurality of processes may be changed, or a plurality of processes may be performed in parallel.

While an information providing method and an information processing method according to one or more aspects of the present disclosure have been described with reference to embodiments, the present disclosure is not limited to these embodiments. Various modifications conceivable by a person skilled in the art to the embodiments described above and embodiments constituted by a combination of constituent elements in different embodiments, which are made without departing from the gist of the present disclosure, may also fall within the scope of one or more aspects of the present disclosure.

The technique of the present disclosure is applicable to an information processing method for suppressing or reducing unauthorized use of a beacon device. The technique of the present disclosure is further applicable to a game reward allocation system and others configured to perform a process for suppressing or reducing unauthorized use of a beacon device in accordance with the probability of abnormal condition of the beacon device and configured to allocate a game reward used in a game app through communication with a beacon device.

What is claimed is:

1. An information processing method executable by a server device, comprising:
obtaining first position information from a first portable terminal that has received a beacon signal from a first beacon device, the first position information being information indicating a current position of the first portable terminal;
calculating a probability of abnormal condition of the first beacon device by comparing the obtained first position information with second position information indicating an installation position of the first beacon device, the second position information being managed in advance by the server device; and
performing a process corresponding to the calculated probability of abnormal condition,
wherein the first portable terminal has installed thereon an application for which data is managed by the server device,
wherein, the performing of a process includes performing a predetermined process for the first portable terminal in a case where the calculated probability of abnormal condition is lower than a predetermined value, and suspending the predetermined process in a case where the calculated probability of abnormal condition is greater than or equal to the predetermined value, and
wherein, the predetermined process comprises a process for allocating a reward used in the application over the data.

2. The information processing method according to claim 1, wherein
the calculating includes calculating the probability of abnormal condition so that the larger a difference between the current position indicated by the first position information and the installation position indicated by the second position information, the higher the probability of abnormal condition.

3. The information processing method according to claim 1,
further comprising managing, as a first check-in history, a date and time of reception of a first ID transmitted from each of the plurality of second portable terminals, the first ID being included in a beacon signal that each of the plurality of second portable terminals receives from the first beacon device, wherein
the calculating includes calculating the probability of abnormal condition by further using the first check-in history.

4. The information processing method according to claim 3, wherein
the calculating includes calculating the probability of abnormal condition by comparing a first check-in history obtained when the first position information is obtained with a first check-in history obtained before the first position information is obtained.

5. The information processing method according to claim 3, wherein
the managing includes managing the date and time of reception of the first ID transmitted from each of the plurality of second portable terminals, as the first check-in history, in association with a user ID of a user of the corresponding one of the second portable terminals which has transmitted the first ID, the user ID of the user being transmitted from the one of the second portable terminals and
the calculating includes calculating the probability of abnormal condition in accordance with the number of identical user IDs included in the first check-in history.

6. The information processing method according to claim 3, wherein
the information processing method further comprises managing, as a second check-in history, a date and time of reception of a second ID transmitted from each of a plurality of third portable terminals, the second ID being included in a beacon signal that each of the plurality of third portable terminals received from a second beacon device different from the first beacon device and
the calculating includes calculating the probability of abnormal condition by comparing the first check-in history with the second check-in history.

7. The information processing method according to claim 1, wherein
the performing of a process includes performing, as the process, a process for instructing the first portable terminal to obtain a beacon signal from a third beacon device different from the first beacon device, in a case where the calculated probability of abnormal condition is greater than or equal to a predetermined value.

8. The information processing method according to claim 1, wherein
the performing of a process includes performing, as the process, a process for transmitting information to the first beacon device via the first portable terminal, the information being information for stopping a function of the first beacon device, in a case where the calculated probability of abnormal condition is greater than or equal to a predetermined value.

9. The information processing method according to claim 8, wherein
the information for stopping the function of the first beacon device comprises encrypted information decodable by using the key information that the first beacon device holds.

10. The information processing method according to claim 9, wherein
the information for stopping the function of the first beacon device includes information for deleting the key information held in the first beacon device.

11. The information processing method according to claim 1, wherein
   the second position information is stored in a storage unit included in the server device.

12. The information processing method according to claim 1, wherein
   at least one of the obtaining, the calculating, and the performing of a process is executed by a processor included in the server device.

* * * * *